United States Patent [19]

Ogata

[11] Patent Number: 5,663,836

[45] Date of Patent: Sep. 2, 1997

[54] COMPACT ZOOM LENS SYSTEM COMPRISING TWO LENS UNITS

[75] Inventor: Yasuji Ogata, Tokyo-to, Japan

[73] Assignee: Olympus Optical Co., Ltd., Tokyo-to, Japan

[21] Appl. No.: 583,670

[22] Filed: Jan. 15, 1996

Related U.S. Application Data

[63] Continuation of Ser. No. 104,595, Aug. 10, 1993, abandoned.

[51] Int. Cl.⁶ .............................. G02B 15/14; G02B 3/02
[52] U.S. Cl. .......................... 359/691; 359/715; 359/714
[58] Field of Search .................................. 359/691, 689, 359/684, 690, 717, 716, 715, 714

[56] References Cited

U.S. PATENT DOCUMENTS

| | | | |
|---|---|---|---|
| 5,076,677 | 12/1991 | Sato | 359/691 |
| 5,182,673 | 1/1993 | Kikuchi et al. | 359/691 |
| 5,283,693 | 2/1994 | Kohno et al. | 359/691 |
| 5,381,268 | 1/1995 | Sato | 359/691 |
| 5,381,269 | 1/1995 | Estelle | 359/691 |

FOREIGN PATENT DOCUMENTS

| | | |
|---|---|---|
| 59-64811 | 4/1984 | Japan . |
| 62-50718 | 3/1987 | Japan . |
| 446308 | 2/1992 | Japan . |

*Primary Examiner*—Scott J. Sugarman
*Assistant Examiner*—Jordan M. Schwartz
*Attorney, Agent, or Firm*—Cushman, Darby & Cushman IP Group of Pillsbury Madison & Sutro LLP

[57] ABSTRACT

A zoom lens system comprising a front lens unit having a negative refractive power and a rear lens unit having a positive refractive power, and configured so as to perform a change of a magnification thereof by varying an airspace reserved between these two lens units. The rear lens unit consists, in order from the object side, of a positive lens component, a positive lens component and a negative lens component which has at least one aspherical surface. The zoom lens system is composed of a small number of lens elements, sufficiently compact, and has high optical performance, a wide field angle and a high vari-focal ratio.

10 Claims, 45 Drawing Sheets

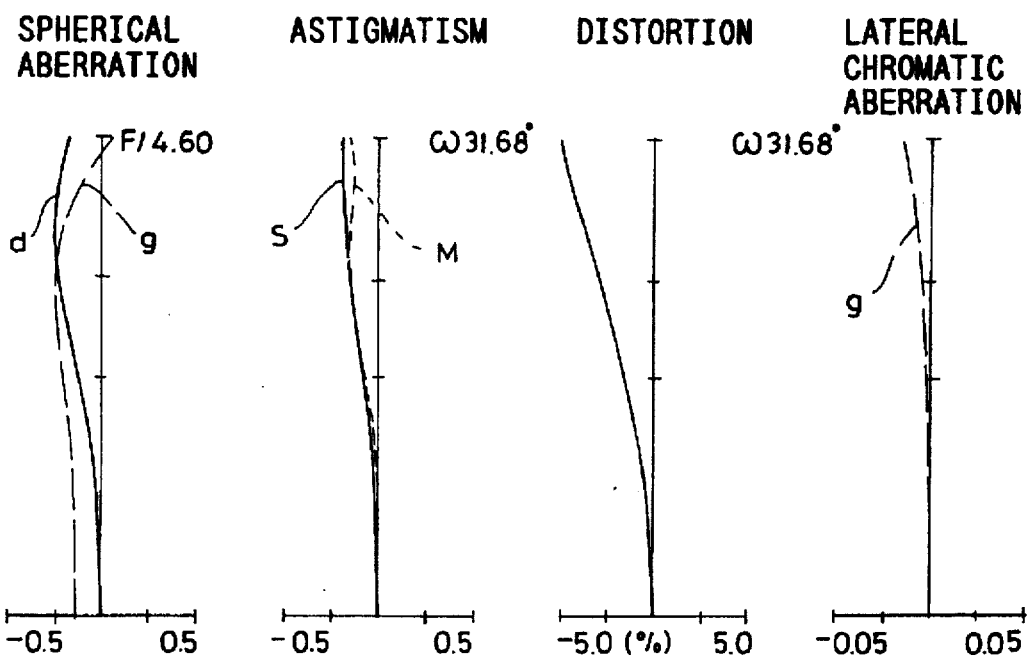
FIG. 19(a) SPHERICAL ABERRATION
FIG. 19(b) ASTIGMATISM
FIG. 19(c) DISTORTION
FIG. 19(d) LATERAL CHROMATIC ABERRATION
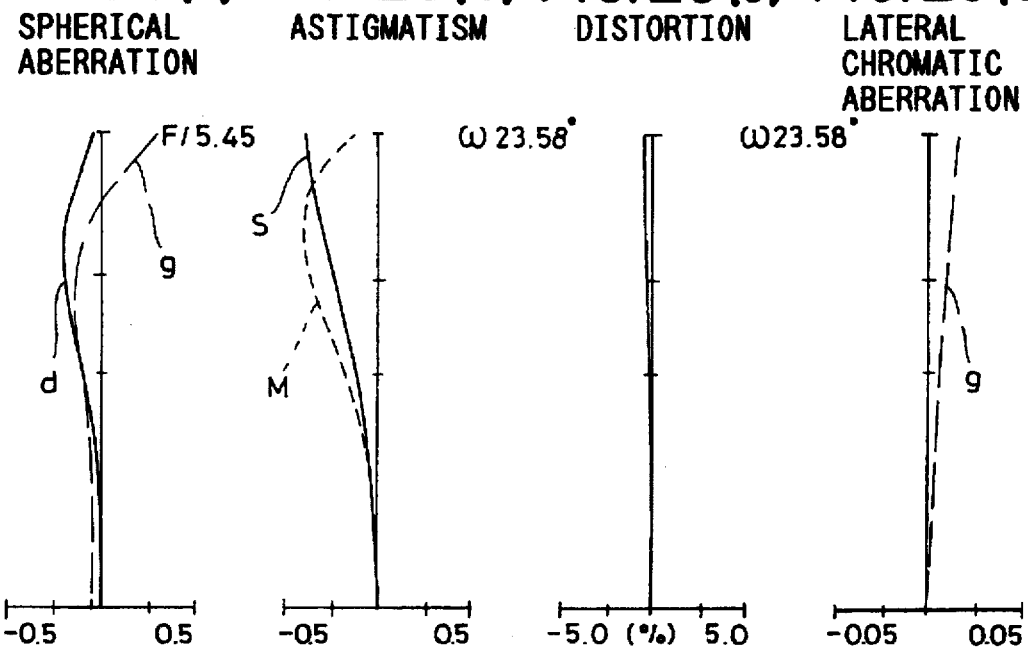
FIG. 20(a) SPHERICAL ABERRATION
FIG. 20(b) ASTIGMATISM
FIG. 20(c) DISTORTION
FIG. 20(d) LATERAL CHROMATIC ABERRATION

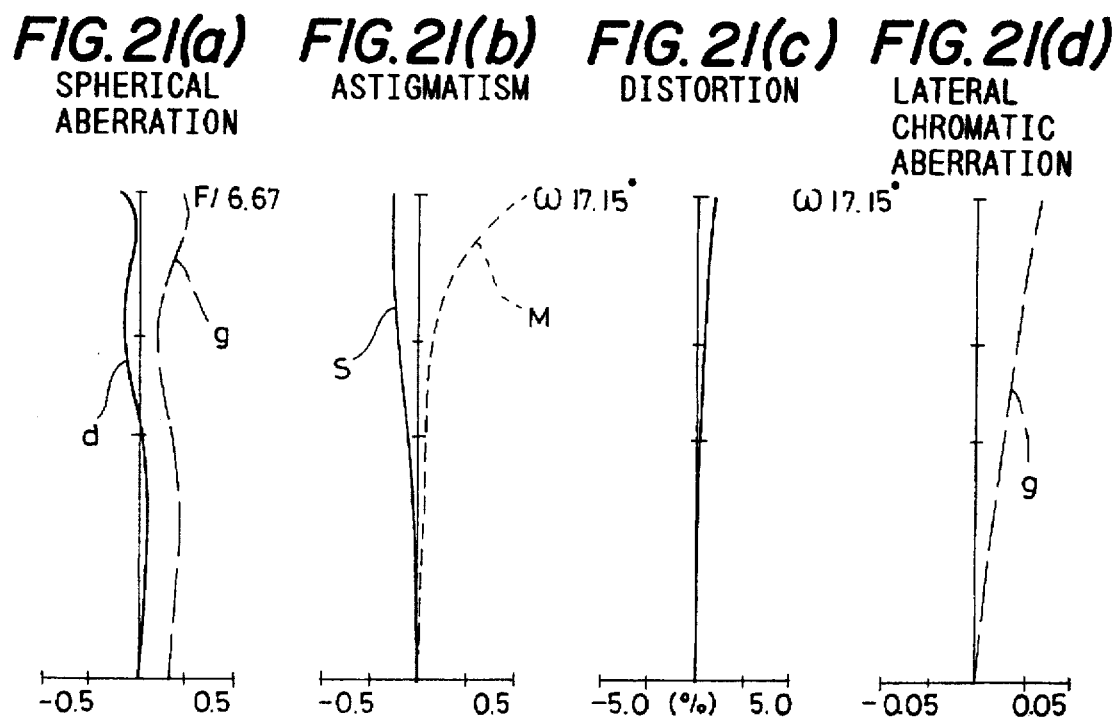
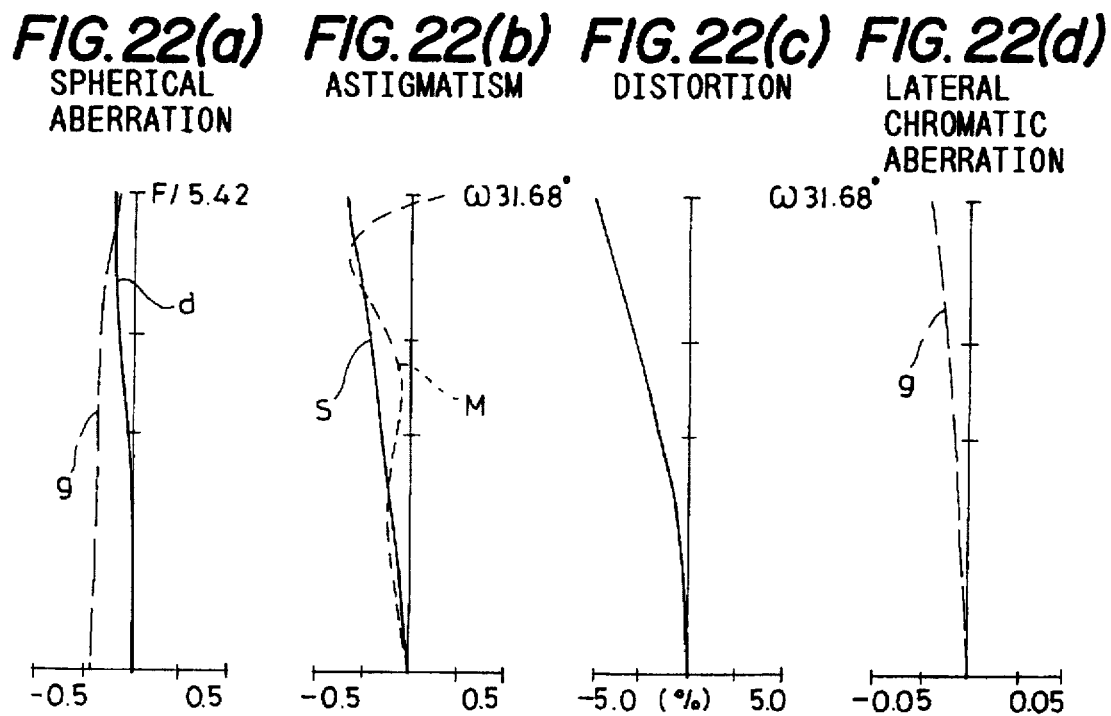

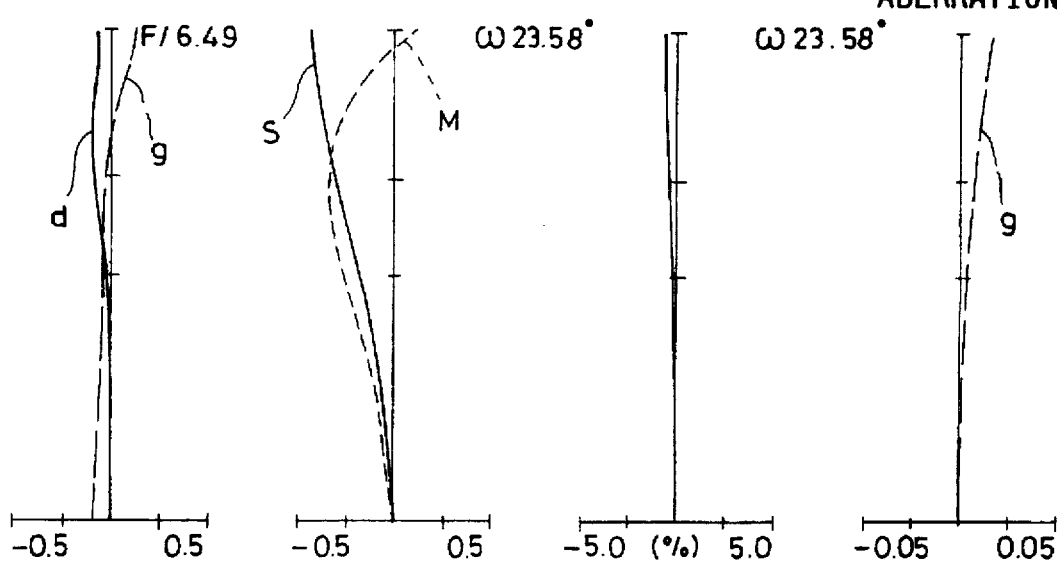
FIG. 23(a) SPHERICAL ABERRATION
FIG. 23(b) ASTIGMATISM
FIG. 23(c) DISTORTION
FIG. 23(d) LATERAL CHROMATIC ABERRATION
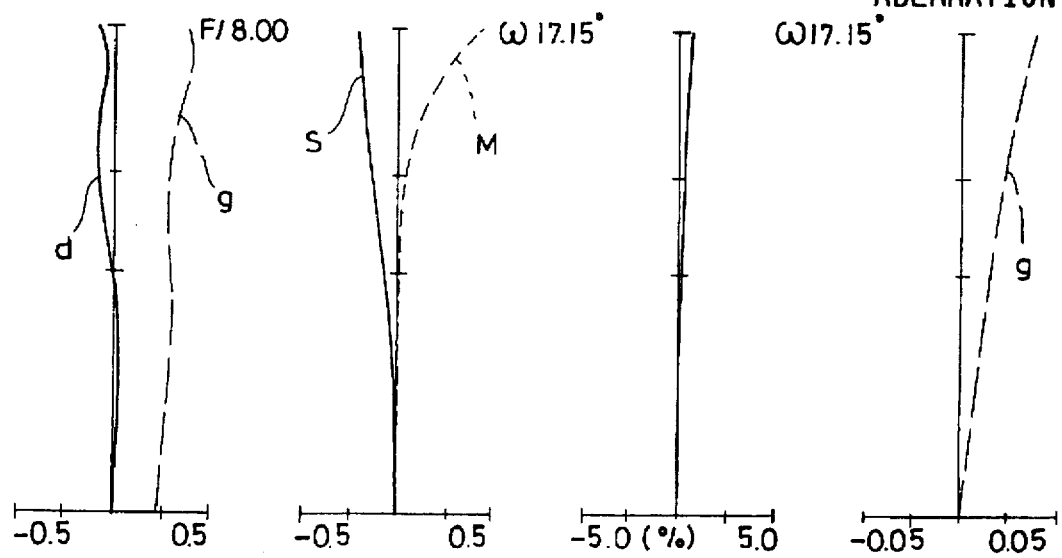
FIG. 24(a) SPHERICAL ABERRATION
FIG. 24(b) ASTIGMATISM
FIG. 24(c) DISTORTION
FIG. 24(d) LATERAL CHROMATIC ABERRATION

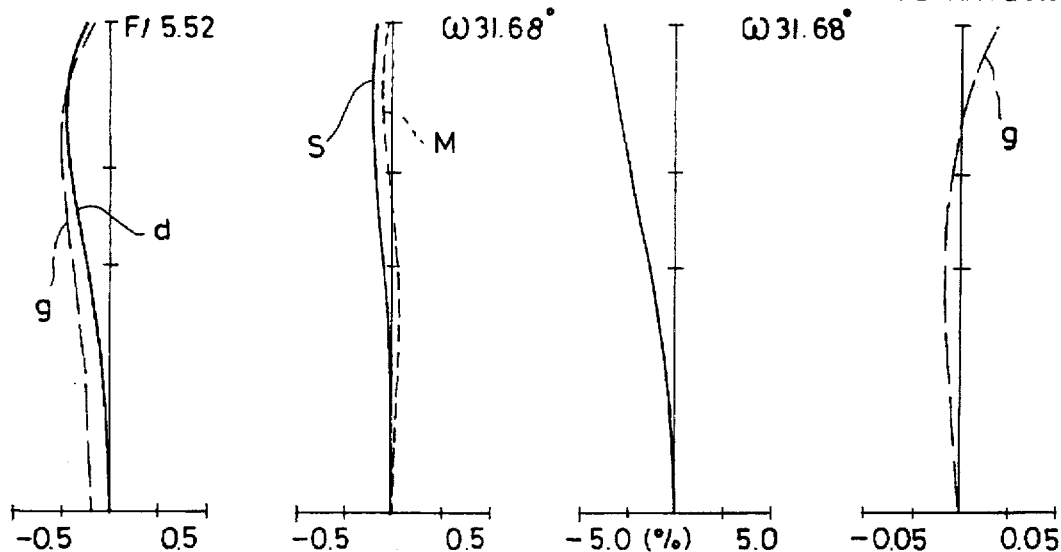
FIG.25(a) SPHERICAL ABERRATION
FIG.25(b) ASTIGMATISM
FIG.25(c) DISTORTION
FIG.25(d) LATERAL CHROMATIC ABERRATION
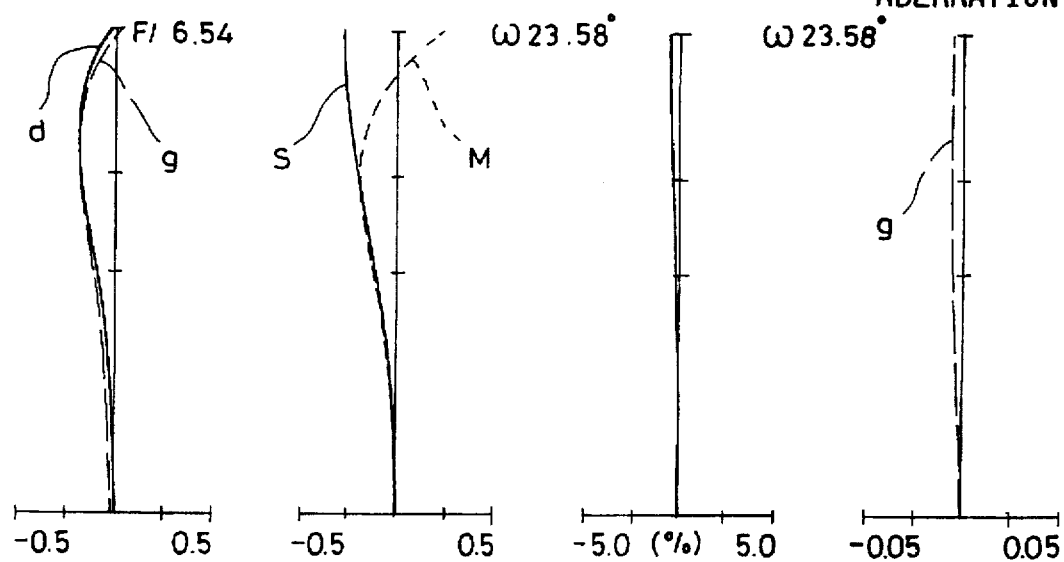
FIG.26(a) SPHERICAL ABERRATION
FIG.26(b) ASTIGMATISM
FIG.26(c) DISTORTION
FIG.26(d) LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

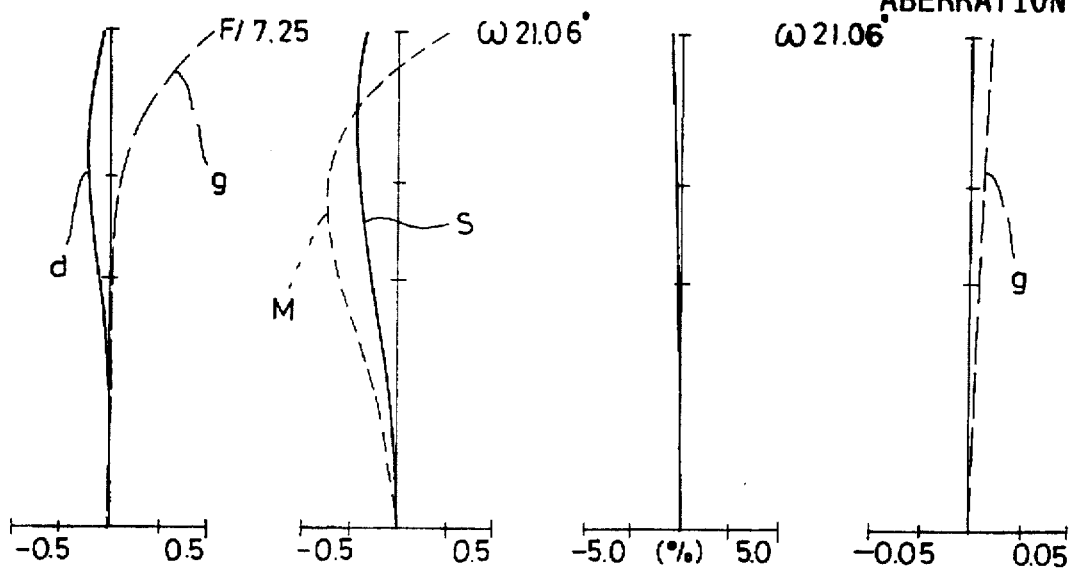
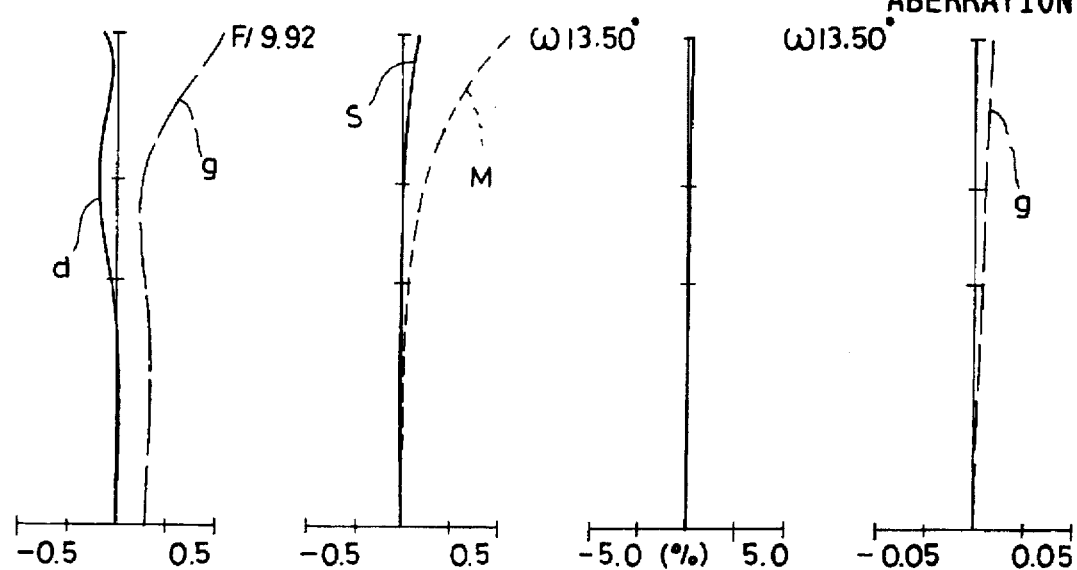

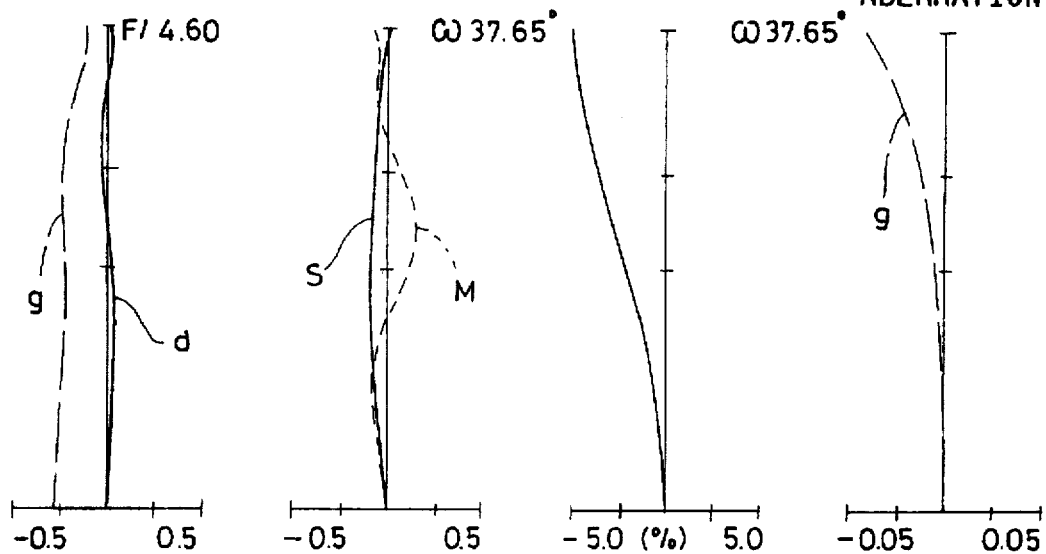
FIG. 31(a) SPHERICAL ABERRATION
FIG. 31(b) ASTIGMATISM
FIG. 31(c) DISTORTION
FIG. 31(d) LATERAL CHROMATIC ABERRATION
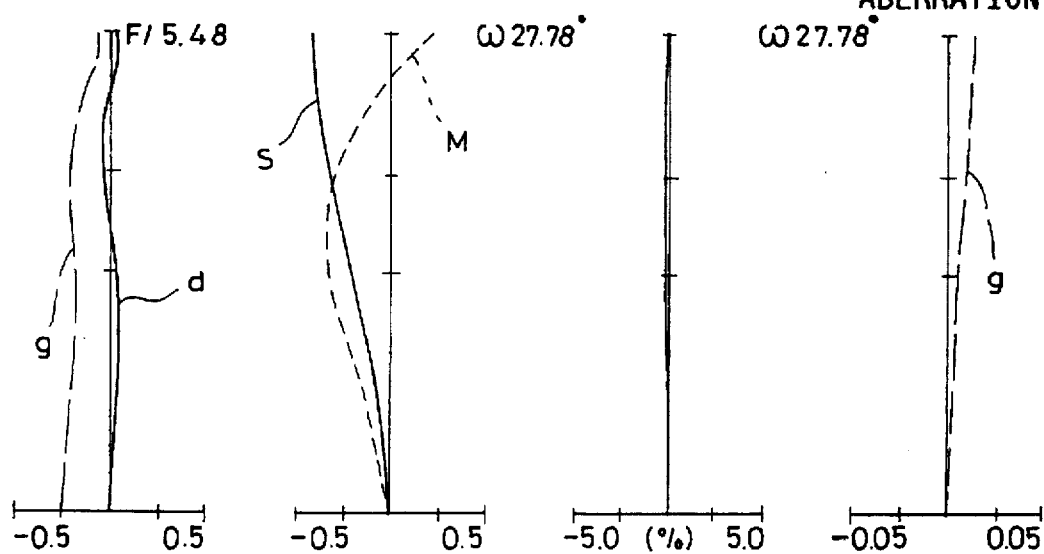
FIG. 32(a) SPHERICAL ABERRATION
FIG. 32(b) ASTIGMATISM
FIG. 32(c) DISTORTION
FIG. 32(d) LATERAL CHROMATIC ABERRATION

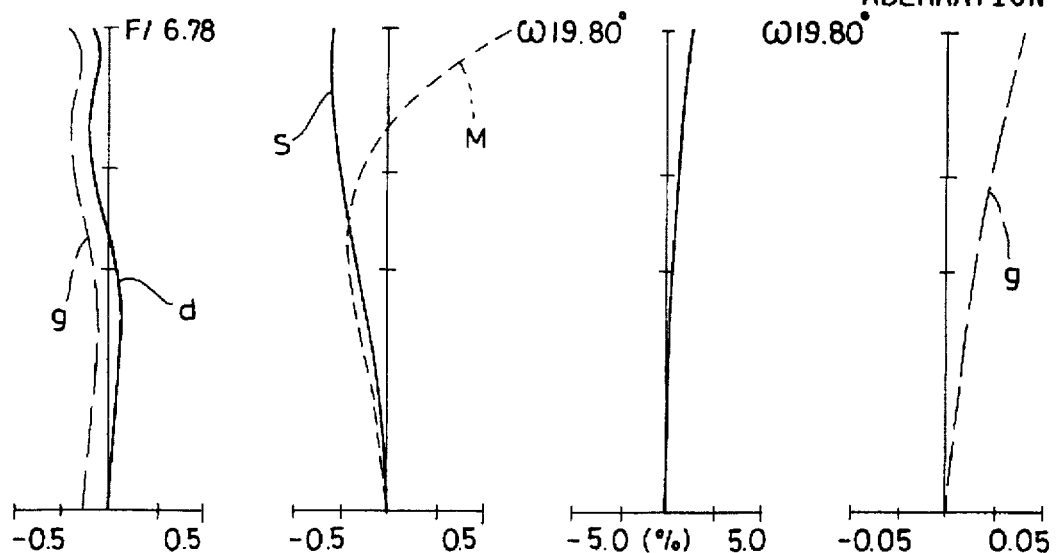
FIG.33(a) SPHERICAL ABERRATION
FIG.33(b) ASTIGMATISM
FIG.33(c) DISTORTION
FIG.33(d) LATERAL CHROMATIC ABERRATION
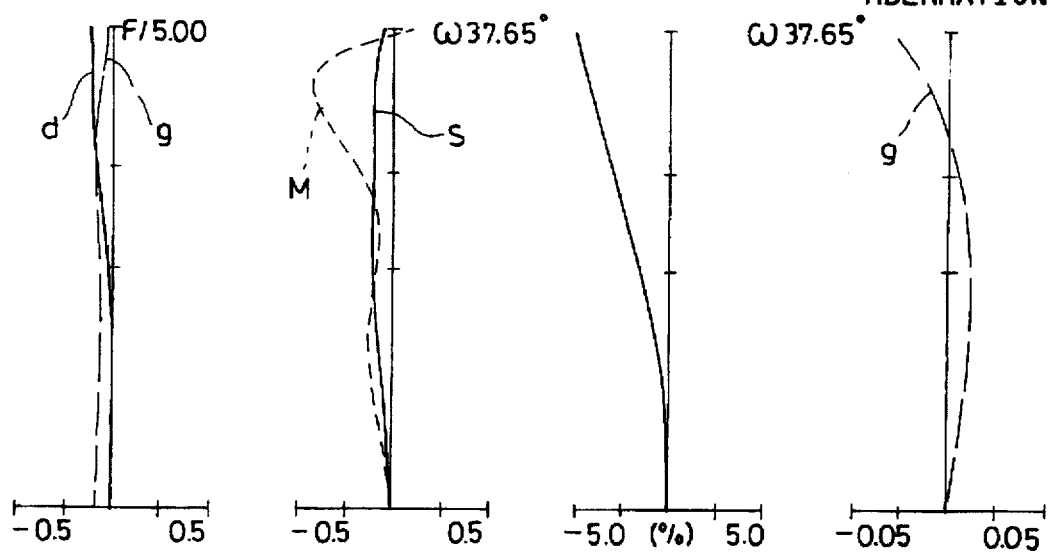
FIG.34(a) SPHERICAL ABERRATION
FIG.34(b) ASTIGMATISM
FIG.34(c) DISTORTION
FIG.34(d) LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

FIG.37(a) SPHERICAL ABERRATION
FIG.37(b) ASTIGMATISM
FIG.37(c) DISTORTION
FIG.37(d) LATERAL CHROMATIC ABERRATION
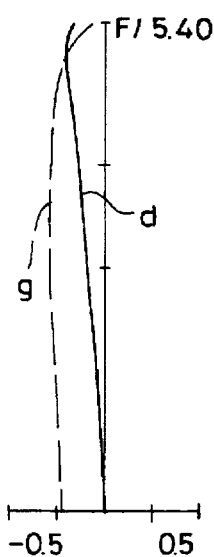
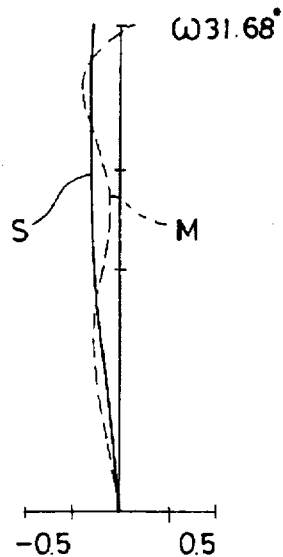
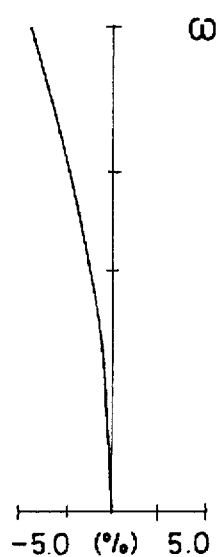
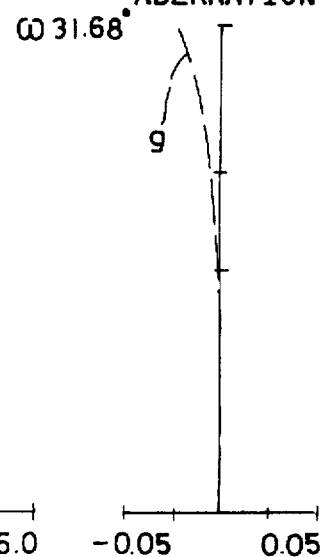
FIG.38(a) SPHERICAL ABERRATION
FIG.38(b) ASTIGMATISM
FIG.38(c) DISTORTION
FIG.38(d) LATERAL CHROMATIC ABERRATION
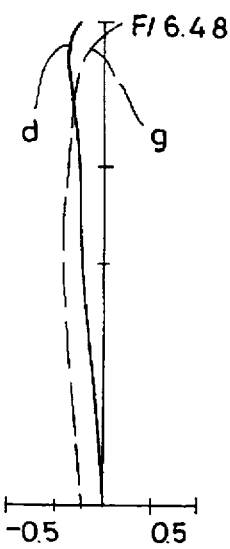
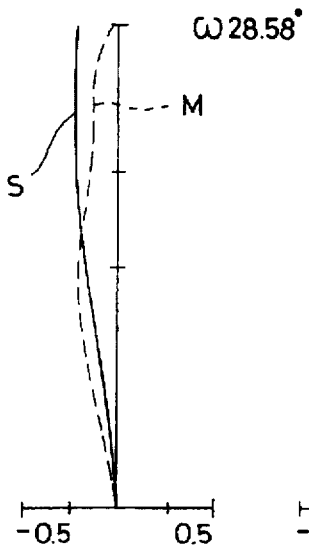
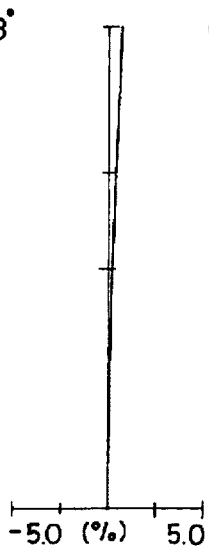
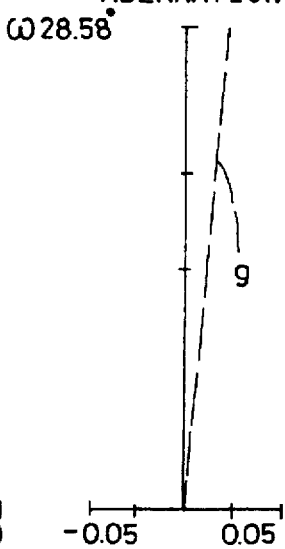

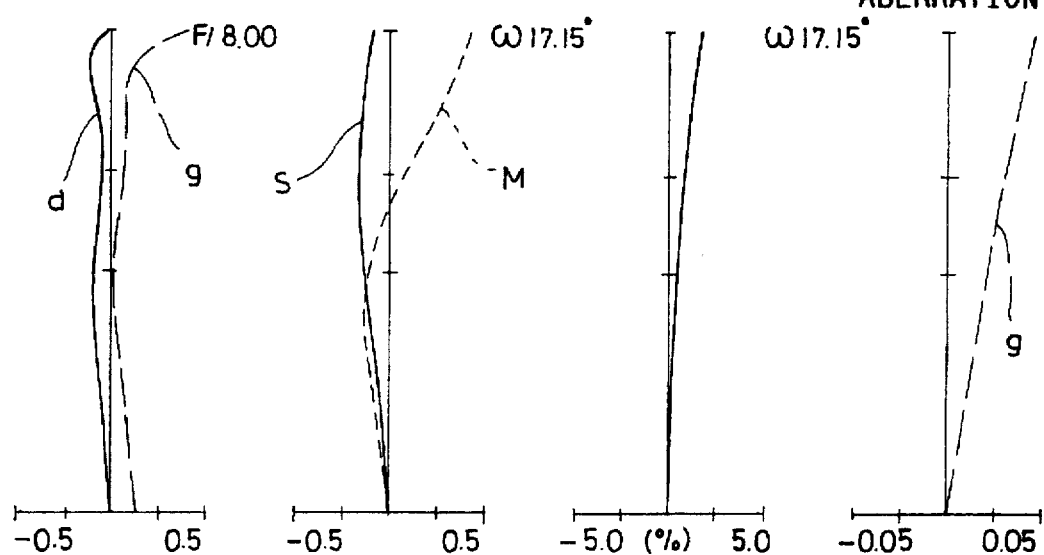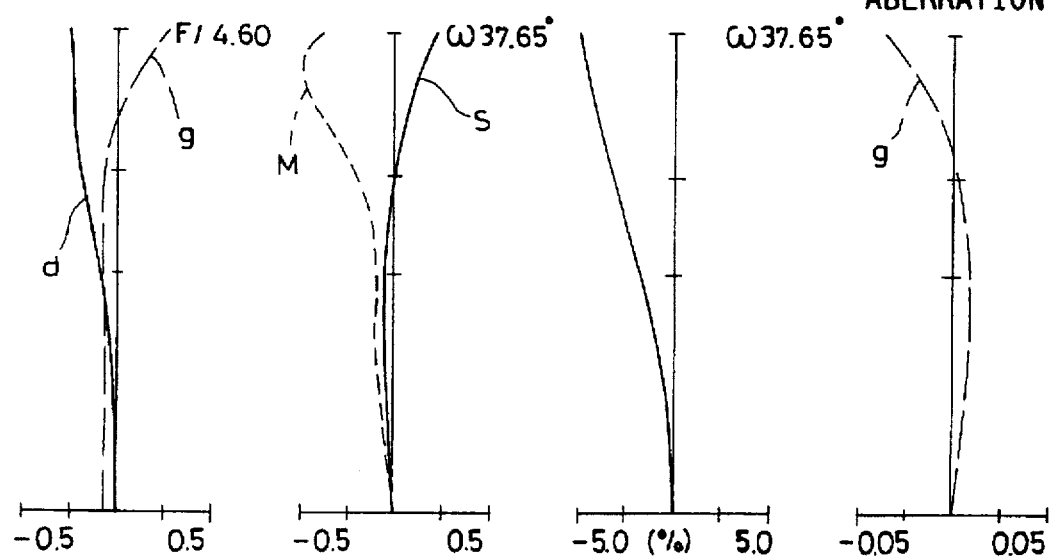

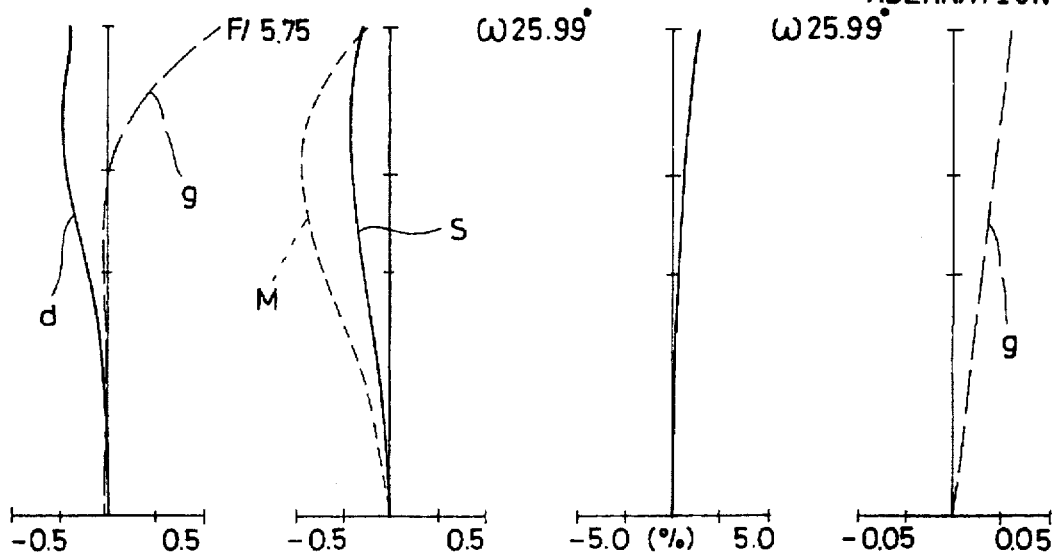
FIG. 41(a) SPHERICAL ABERRATION
FIG. 41(b) ASTIGMATISM
FIG. 41(c) DISTORTION
FIG. 41(d) LATERAL CHROMATIC ABERRATION
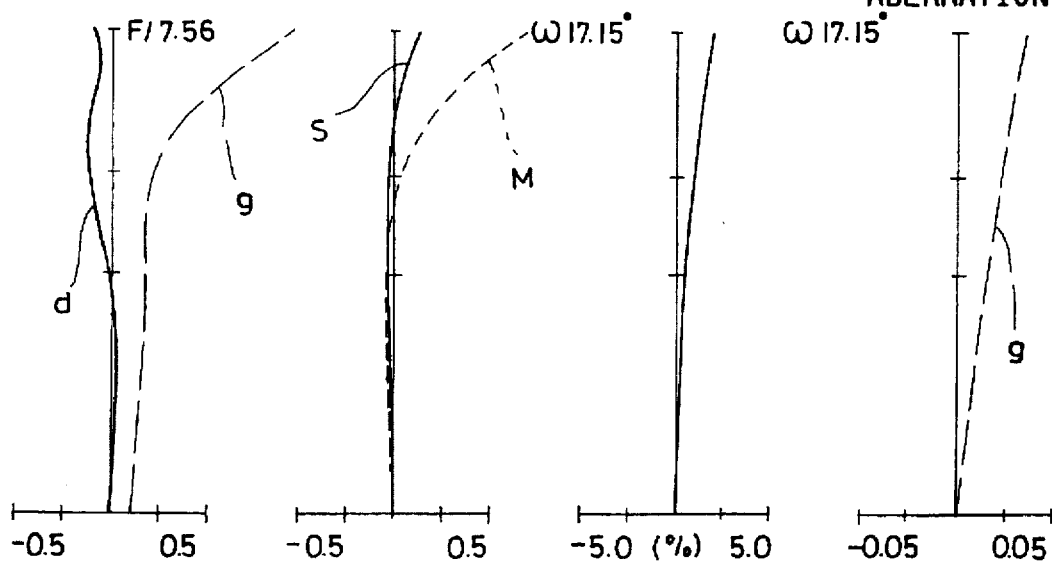
FIG. 42(a) SPHERICAL ABERRATION
FIG. 42(b) ASTIGMATISM
FIG. 42(c) DISTORTION
FIG. 42(d) LATERAL CHROMATIC ABERRATION

FIG. 43(a) SPHERICAL ABERRATION
FIG. 43(b) ASTIGMATISM
FIG. 43(c) DISTORTION
FIG. 43(d) LATERAL CHROMATIC ABERRATION
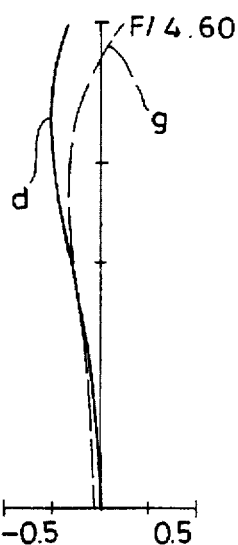 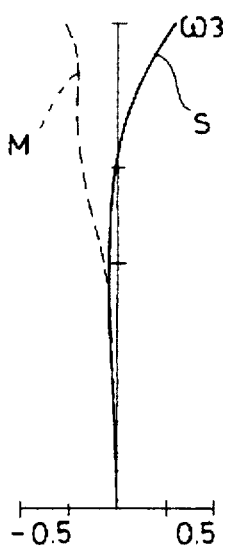 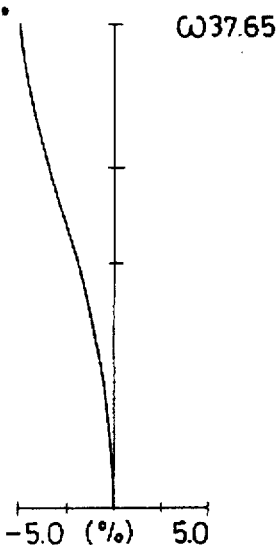 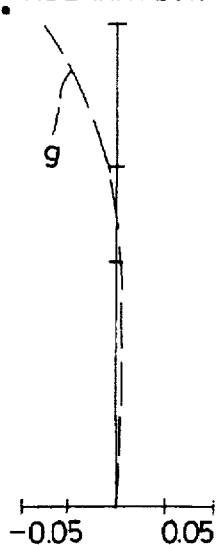
FIG. 44(a) SPHERICAL ABERRATION
FIG. 44(b) ASTIGMATISM
FIG. 44(c) DISTORTION
FIG. 44(d) LATERAL CHROMATIC ABERRATION
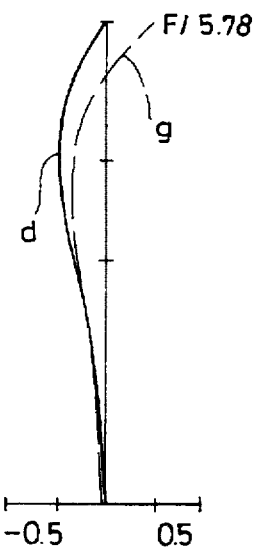 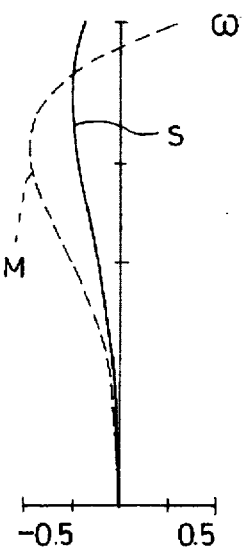 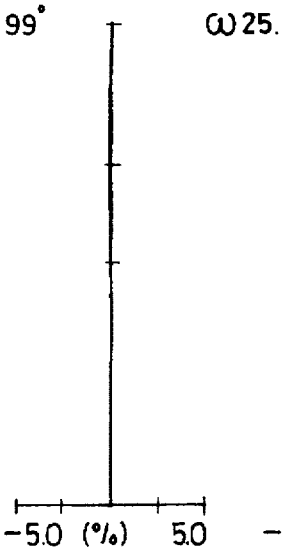 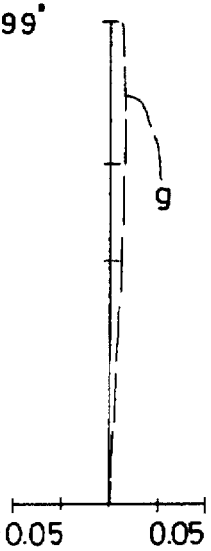

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

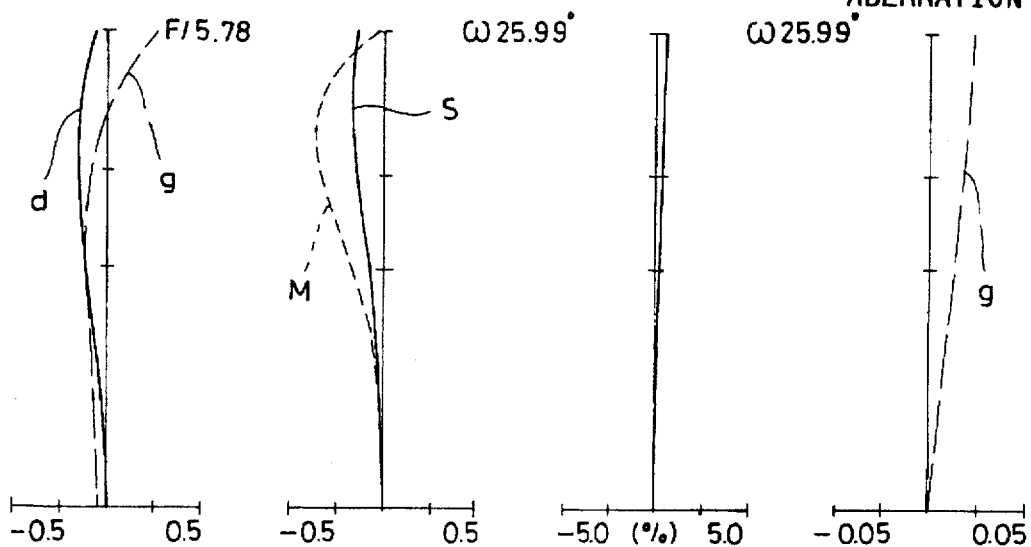
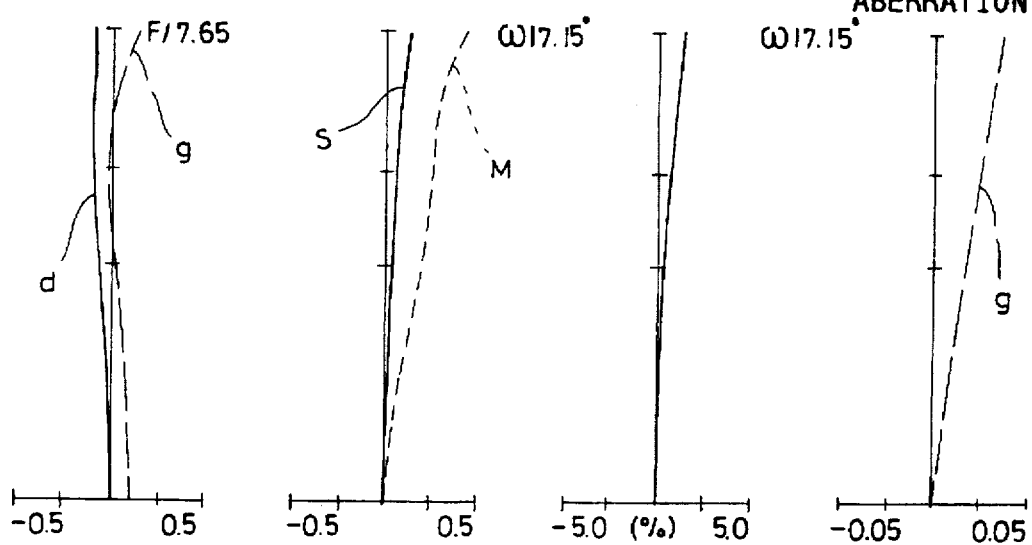

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

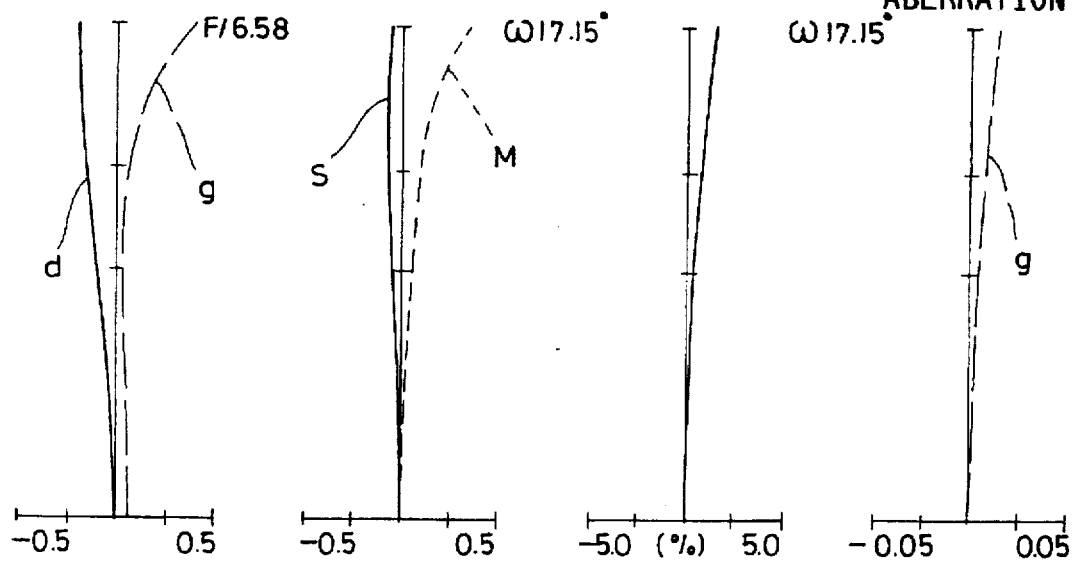
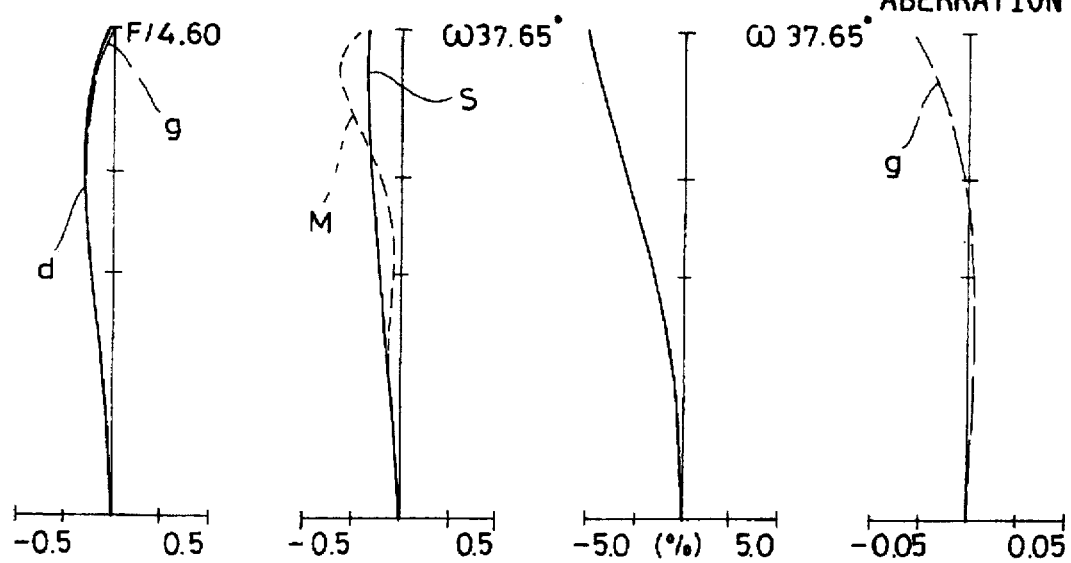

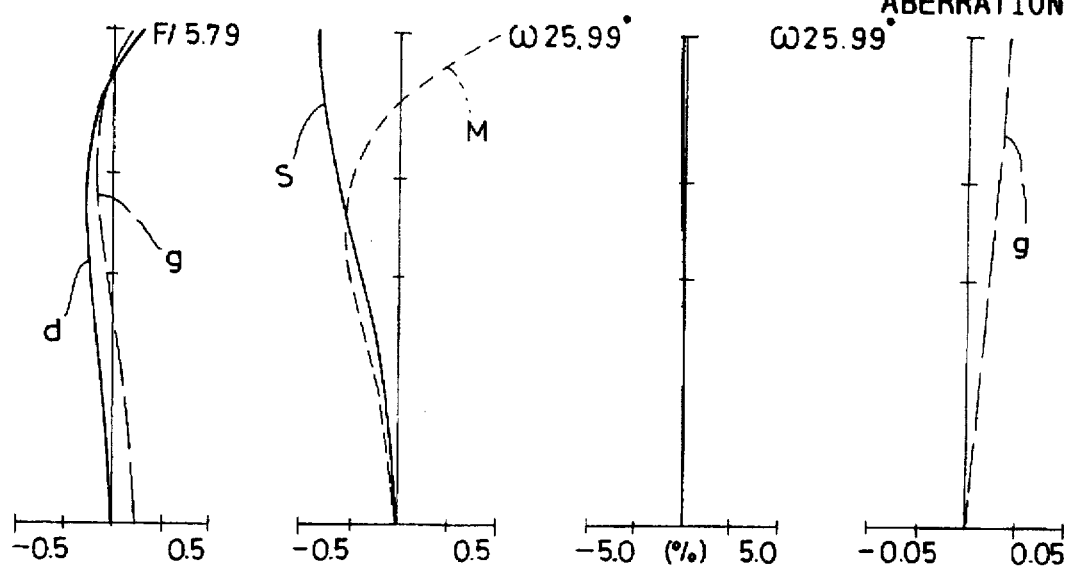
FIG.53(a) SPHERICAL ABERRATION
FIG.53(b) ASTIGMATISM
FIG.53(c) DISTORTION
FIG.53(d) LATERAL CHROMATIC ABERRATION
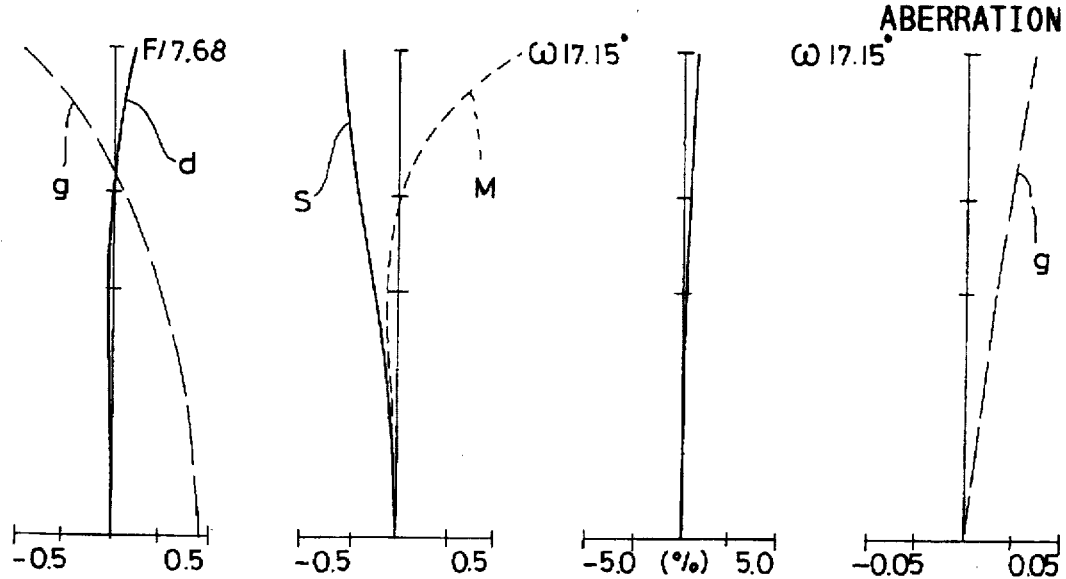
FIG.54(a) SPHERICAL ABERRATION
FIG.54(b) ASTIGMATISM
FIG.54(c) DISTORTION
FIG.54(d) LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

FIG. 59(a) SPHERICAL ABERRATION
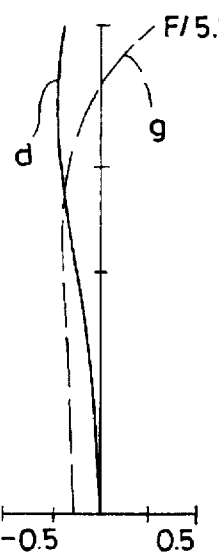
FIG. 59(b) ASTIGMATISM
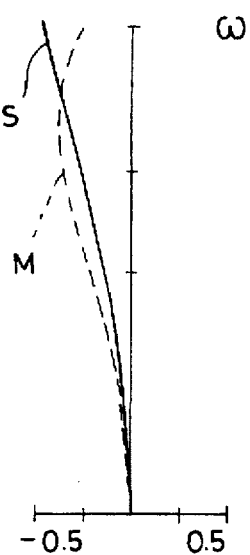
FIG. 59(c) DISTORTION
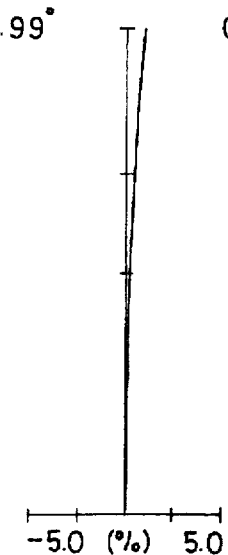
FIG. 59(d) LATERAL CHROMATIC ABERRATION
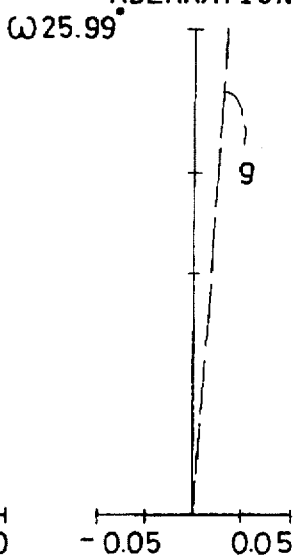
FIG. 60(a) SPHERICAL ABERRATION
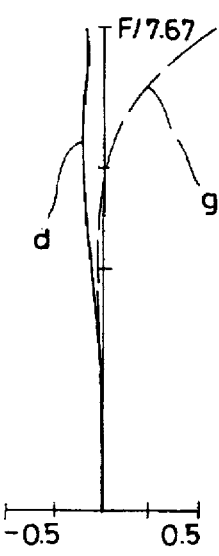
FIG. 60(b) ASTIGMATISM
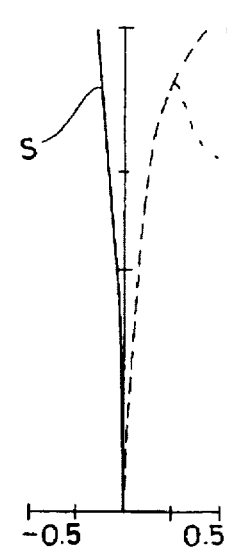
FIG. 60(c) DISTORTION
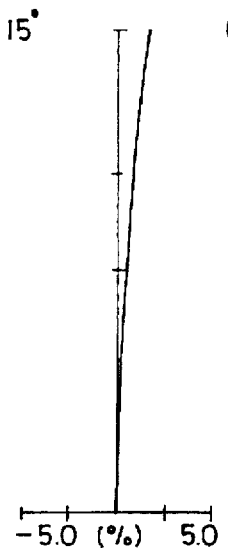
FIG. 60(d) LATERAL CHROMATIC ABERRATION
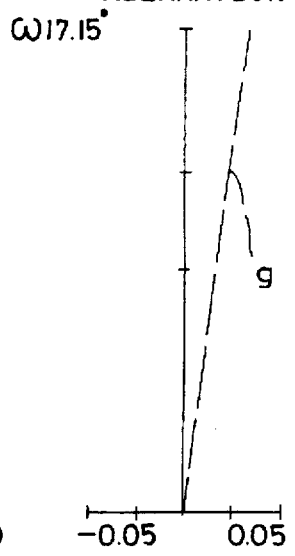

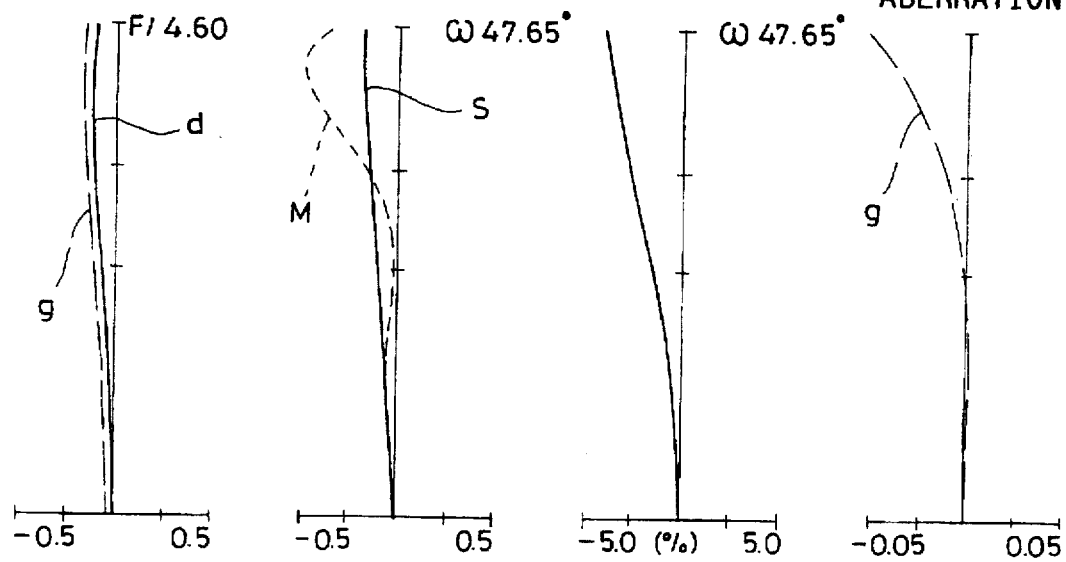
FIG. 61(a) SPHERICAL ABERRATION
FIG. 61(b) ASTIGMATISM
FIG. 61(c) DISTORTION
FIG. 61(d) LATERAL CHROMATIC ABERRATION
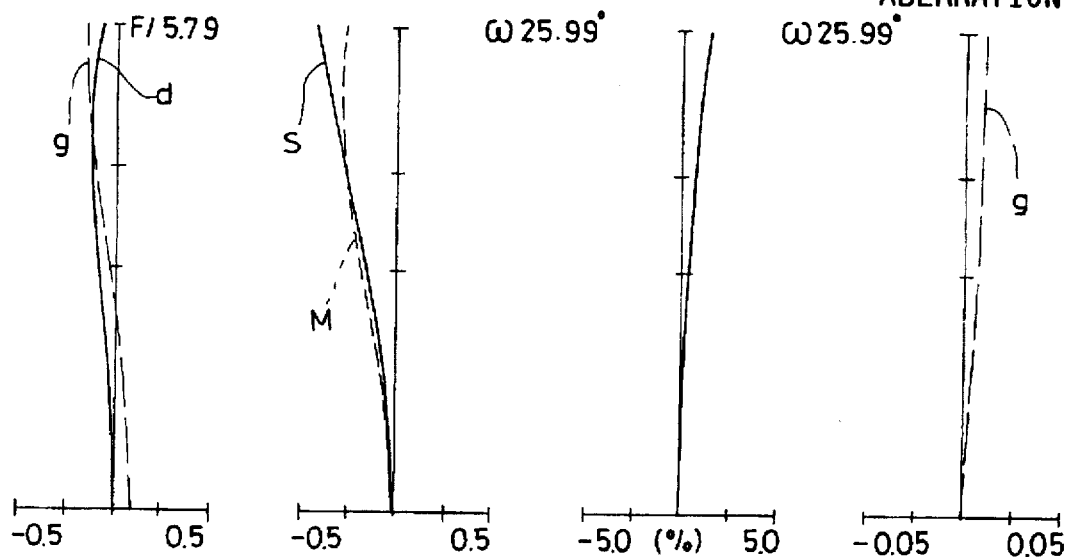
FIG. 62(a) SPHERICAL ABERRATION
FIG. 62(b) ASTIGMATISM
FIG. 62(c) DISTORTION
FIG. 62(d) LATERAL CHROMATIC ABERRATION

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

FIG. 65(a)
SPHERICAL ABERRATION
FIG. 65(b)
ASTIGMATISM
FIG. 65(c)
DISTORTION
FIG. 65(d)
LATERAL CHROMATIC ABERRATION
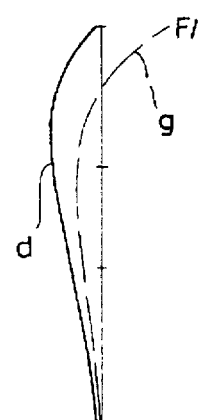
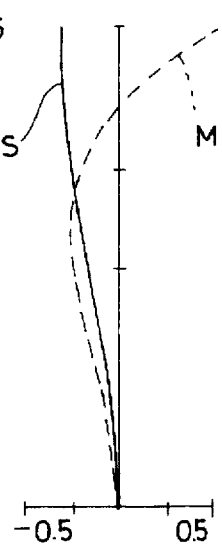
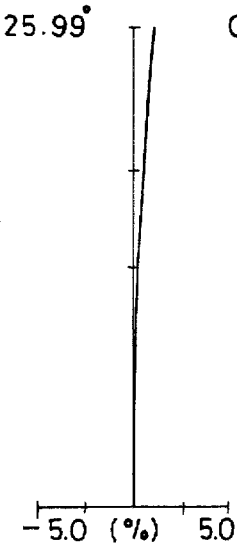
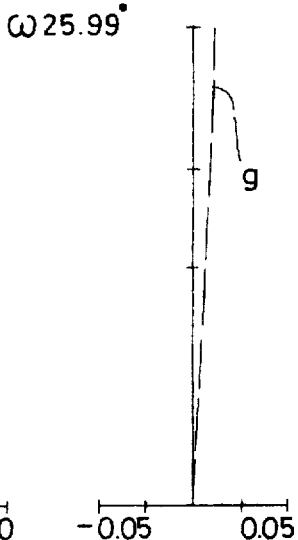
FIG. 66(a)
SPHERICAL ABERRATION
FIG. 66(b)
ASTIGMATISM
FIG. 66(c)
DISTORTION
FIG. 66(d)
LATERAL CHROMATIC ABERRATION
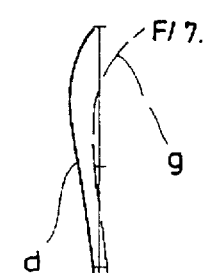
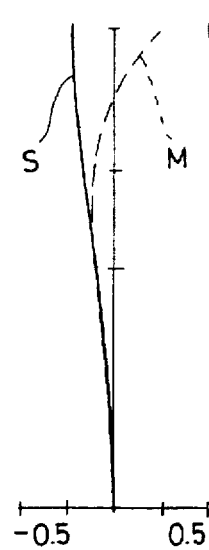
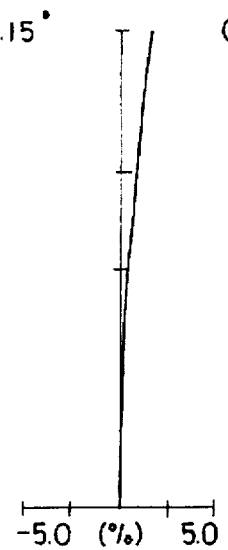
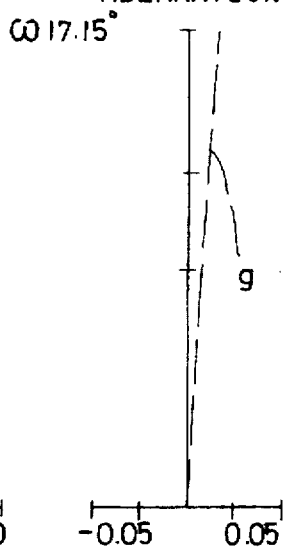

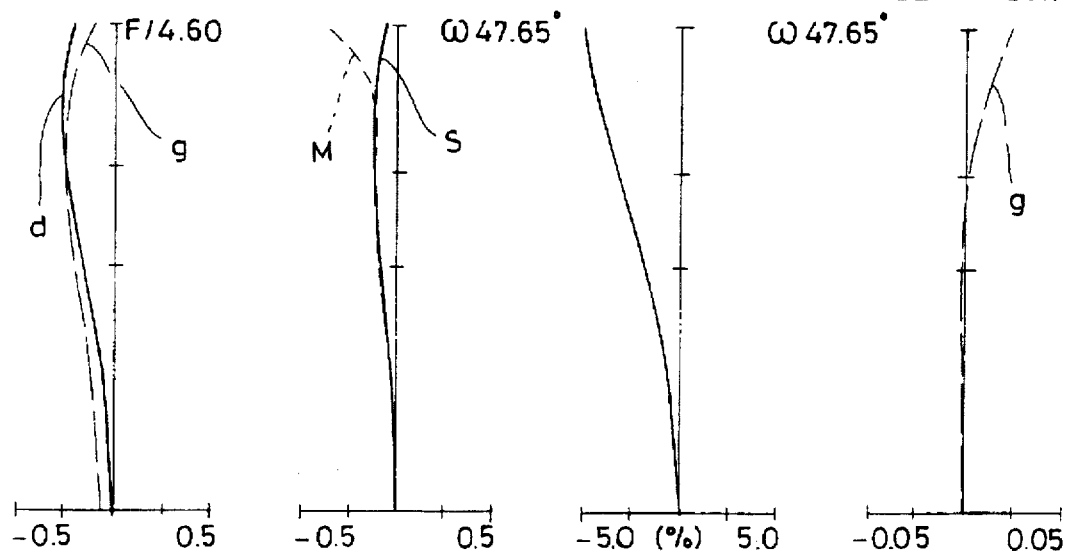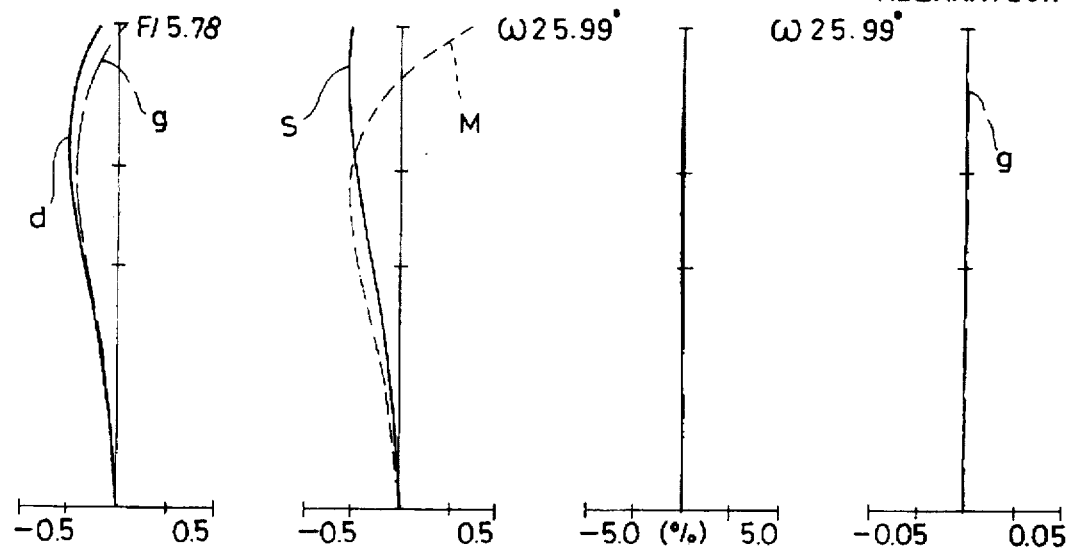

FIG. 69(a)
SPHERICAL ABERRATION
FIG. 69(b)
ASTIGMATISM
FIG. 69(c)
DISTORTION
FIG. 69(d)
LATERAL CHROMATIC ABERRATION
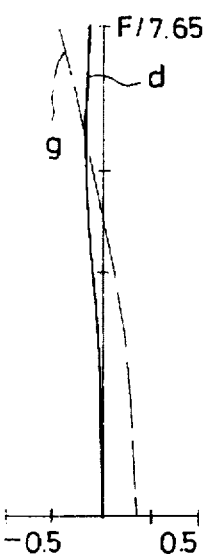
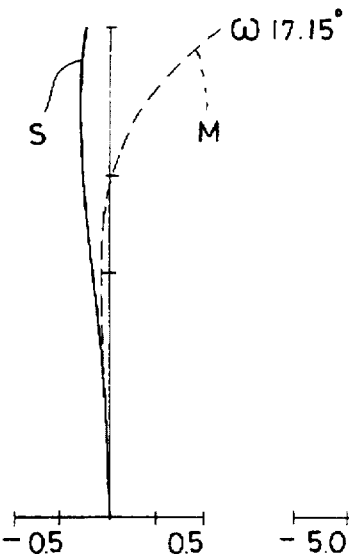
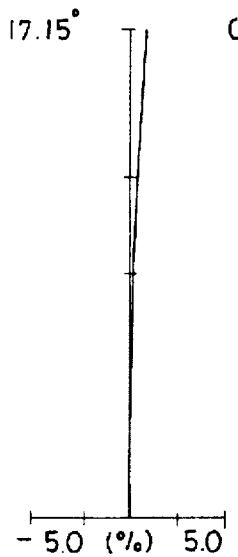
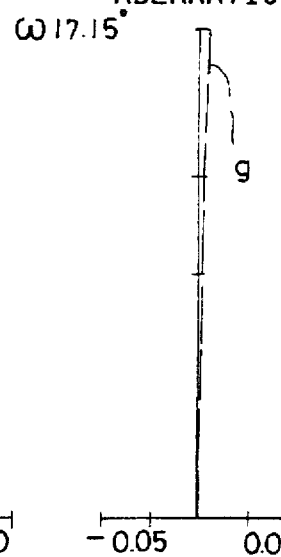
FIG. 70(a)
SPHERICAL ABERRATION
FIG. 70(b)
ASTIGMATISM
FIG. 70(c)
DISTORTION
FIG. 70(d)
LATERAL CHROMATIC ABERRATION
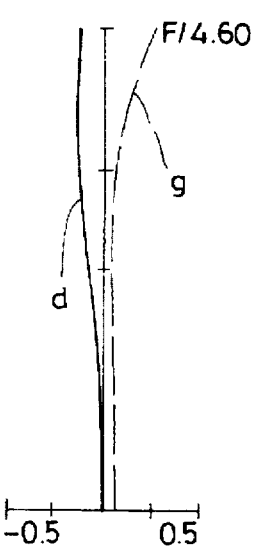
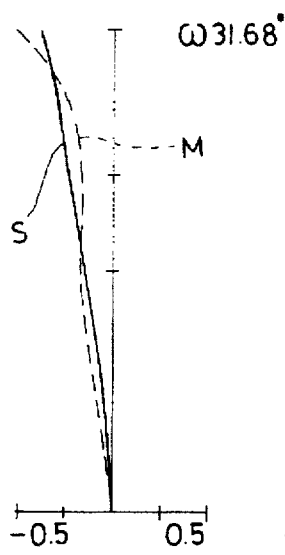
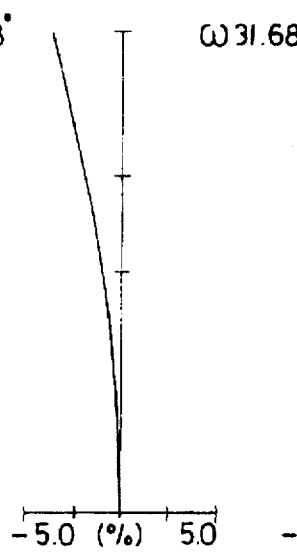
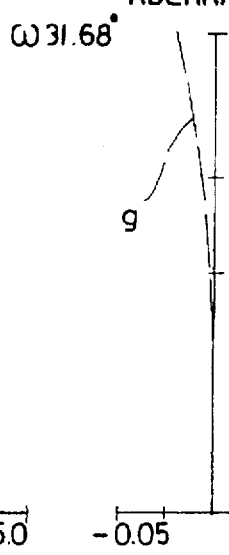

SPHERICAL ABERRATION

ASTIGMATISM

DISTORTION

LATERAL CHROMATIC ABERRATION

SPHERICAL ABERRATION

ASTIGMATISM

DISTORTION

LATERAL CHROMATIC ABERRATION

COMPACT ZOOM LENS SYSTEM COMPRISING TWO LENS UNITS

This is a continuation of application Ser. No. 08/104,595, filed on Aug. 10, 1993, which was abandoned upon the filing hereof.

BACKGROUND OF THE INVENTION a) Field of the Invention

The present invention relates to a zoom lens system which comprises a front lens unit having a negative refractive power and a rear lens unit having a positive refractive power, and more specifically to a zoom lens which consists of a small number of lens elements.

b) Description of the Prior Art

Zoom lens systems of the type described above have conventionally been widely used as the so-called standard zoom lens system which cover standard field angles among exchange lens systems for use with single-lens reflex cameras. A zoom lens system of this type is configured so as to have the retrofocus type paraxial refractive power distribution by disposing a front lens unit having a negative refractive power apart from a rear lens unit having a positive refractive power, easily permits reserving a long back focal length which is required for disposing quick return mirrors in single-lens reflex cameras, has a compact size as a whole and features favorable optical performance.

As a conventional example of a zoom lens system which consists of two lens units i.e., a negative lens unit and a positive lens unit, and comprises a reduced number of lens elements, there is known a zoom lens system disclosed by Japanese Patent Kokai Publication No. Sho 59-64,811. This zoom lens system has a focal length of approximately 35 to 70 mm. The front lens unit consists of two lens components of two lens elements, whereas the rear lens unit consists of four lens components of four lens elements; the front lens unit using an aspherical surfaces for correcting aberrations in the zoom lens system.

Further, a zoom lens system disclosed by Japanese Patent Kokai Publication No. Hei 4-46,308 is known as another example of a zoom lens system which consists of a reduced number of lens elements. This zoom lens system also has a focal length of approximately 35 to 70 mm. This zoom lens system uses a front lens unit composed of two lens components of two lens elements, a rear lens unit composed of two lens components of two lens elements or three lens components of three lens elements and four or more aspherical surfaces for correcting aberrations in the zoom lens system.

As a conventional example of a zoom lens system which is of the type described above and to be used with lens shutter cameras, there is known a zoom lens system disclosed by Japanese Patent Kokai Publication No. Sho 62-50, 718. Since zoom lens systems which are to be used with lens shutter cameras need not have long back focal lengths, these lens systems can have shortened total lengths (lengths as measured from first surfaces of the lens systems to film surfaces). In case of this conventional example, a total length thereof is shortened by composing a rear lens unit thereof, in order from the object side, of a subunit having a positive refractive power and another subunit having a negative refractive power, and disposing these subunits apart from each other so as to obtain the so-called telephoto type refractive power distribution. This zoom lens system has a focal length of approximately 35 to 70 mm, and uses three lens components of three lens elements to compose the front lens unit and four lens components of six lens elements for composing the rear lens unit as well as aspherical surfaces disposed in these lens units for correcting aberrations in the zoom lens system.

The zoom lens system disclosed by the above-mentioned Japanese Patent Kokai Publication No. Sho 59-64,811 comprises as a whole lens elements in a number as small as six. However, due to the refractive power distribution selected for this zoom lens system, the front lens unit thereof has a large effective diameter which is undesirable for configuring the lens system compact. In addition, the two lens elements disposed in the front lens unit have large effective diameters, thereby undesirably enhancing costs of materials and manufacturing of the zoom lens system. The effective diameters are further prolonged in particular when the zoom lens system is configured so that it has a short focal length and a large field angle at a wide position thereof.

The zoom lens system disclosed by Japanese Patent Kokai Publication No. Hei 4-46,308 consists of four or five lens elements as a whole, but has aberrations which are not corrected sufficiently favorably for practical use of the zoom lens system.

The zoom lens system disclosed by Japanese Patent Kokai Publication No. Sho 62-50,718 has a shortened total length and a shortened effective diameter, but is undesirable from a viewpoint of manufacturing cost thereof since the lens system uses nine lens elements as a whole.

SUMMARY OF THE INVENTION

A primary object of the present invention is to provide a zoom lens system which comprises two lens units, i.e., a front lens unit having a negative refractive power and a rear lens unit having a positive refractive power, comprises a small number of lens elements, and has a sufficiently compact size, high optical performance, a wide field angle and a high vari-focal ratio.

The zoom lens system according to the present invention comprises the front lens unit having the negative refractive power and the rear lens unit having the positive refractive power, and is configured so as to perform a change of a magnification thereof by varying an airspace reserved between these two lens units. The rear lens unit comprises a positive lens component at an object side location and a negative lens component at an image side location, and uses at least one aspherical surface. The zoom lens system according to the present invention satisfies the following conditions (1), (2) and (3):

(1) $1.0 < |f_1|/f_W < 2.0$ (2) $0.7 < f_2/f_W < 1.4$ (3) $75 < \bar{\nu}_{RP}$ wherein the reference symbol $f_W$ represents a focal length of the zoom lens system as a whole at a wide position thereof, the reference symbols $f_1$ and $f_2$ designate focal lengths of the front lens unit and the rear lens unit respectively, and the reference symbol $\bar{\nu}_{RP}$ denotes a total sum of Abbe's numbers of all lens elements comprised in the positive lens component disposed in the rear lens unit.

The primary object of the present invention lies in reducing a number of lens elements to be disposed in a zoom lens system. However, a simple reduction of a number of lens elements to be disposed in a zoom lens system will pose problems of aggravation of aberrations, lowering in freedom for correction of aberrations and impossibility to maintain high optical performance.

The present invention has succeeded in solving these problems by disposing the positive lens component at the object side location and the negative lens component at the image side location in the rear lens unit. The positive lens component disposed at the object side location in the rear lens unit functions to converge a diverging light bundle which is incident on the rear lens unit and serves for favorably correcting aberrations in cooperation with the negative lens component disposed at the image side location in the rear lens unit. For correcting offaxial aberrations, astigmatism in particular, however, it is necessary to use at least one aspherical surface in the rear lens unit. From a viewpoint of a manufacturing cost of the zoom lens system according to the present invention, it is desirable that the rear lens unit is composed of the positive lens component and the negative lens component as described above. For more favorable correction of aberrations in the zoom lens system according to the present invention, however, it is desirable that the rear lens unit is composed of three lens components, i.e., a positive lens component, a positive lens component and a negative lens component or a positive lens component, a negative lens component and a negative lens component.

Even when the zoom lens system is composed of a reduced number of lens elements for lowering a manufacturing cost thereof, however, it is undesirable that the lens system has a large size. For obtaining a zoom lens system which has a sufficiently compact size and high optical performance while selecting the composition described above, it is necessary that the zoom lens system satisfies the above-mentioned conditions (1) and (2).

In case of a zoom lens system which consists of a negative lens unit and a positive lens unit, the front lens unit is moved for a shortest distance for changing a magnification of the lens system when the rear lens unit images rays at a magnification of $-1\times$ at an intermediate focal length $f_s$ of the zoom lens system which is given by the following formula:

$$f_s = (f_W f_T)^{1/2}$$

wherein the reference symbols $f_W$ and $f_T$ represent focal lengths of the zoom lens system as a whole at the wide position and tele position respectively thereof.

In order to shorten the moving distance of the front lens unit and correct aberrations favorably in the zoom lens system, the present invention adopts the condition (1) so that the rear lens unit images rays at a point located within a range from a vicinity of the intermediate focal length $f_s$ to the wide position of the zoom lens system. If the upper limit of the condition (1) is exceeded, it will be required to move the front lens unit for a prolonged distance for changing magnification, and the airspace reserved between the front lens unit and the rear lens unit will be widened, whereby the front lens unit will undesirably have a larger effective diameter. If the lower limit of the condition (1) is exceeded, in contrast, it will be impossible to correct aberrations sufficiently favorably with a small number of lens elements.

The condition (2) has been adopted for correcting chromatic aberration. In order to correct chromatic aberration favorably in the rear lens unit which has the positive refractive power, it is desirable that chromatic aberration produced by the positive lens component is cancelled with that produced by the negative lens component. However, since the negative lens component need not necessarily have a strong refractive power as described later with reference to embodiments of the present invention, it is desirable to reduce chromatic aberration which is to be produced by the positive lens component for reducing variations of chromatic aberration to be caused by changing a magnification of the zoom lens system. The condition (3) has been adopted for this reason. So far as the condition (3) is satisfied, chromatic aberration can be corrected favorably even when the negative lens component has a strong refractive power.

The zoom lens system according to the present invention uses a single aspherical surface or a plurality of aspherical surfaces in the rear lens unit thereof as described above. It is desirable to dispose the aspherical surfaces on negative lens elements. Further, it is desirable that at least one of the aspherical surfaces satisfies the following condition (4) or (5):

(4) $1 < \Delta_{RN}/\phi_{RN}$ (5) $0 < \Delta_{RN}/\phi_{RN}$ $$\phi_{RN} = (n_{RN}' - n_{RN})/r_{RN}$$

wherein the reference symbol $r_{RN}$ represents a paraxial radius of curvature on the aspherical surface, the reference symbols $n_{RN}$ and $n_{RN}'$ designate refractive indices of media located before and after respectively the aspherical surface, and the reference symbol $\Delta_{RN}$ denotes a deviation (or displacement) of the aspherical surface from a reference sphere thereof as measured in a direction parallel to an optical axis on the most outer point of a clear aperture thereof.

These conditions define such a shape of the aspherical surface as to progressively weaken a negative refractive power as portions of the aspherical surface are farther from an optical axis thereof. When the rear lens unit consists of the positive lens component and the negative lens component, it is desirable that the aspherical surface satisfies the condition (4). If the condition (4) is not satisfied, it will be impossible to correct astigmatism and distortion sufficiently favorably at the wide position of the zoom lens system. When the rear lens unit consists of the three lens components, it is desirable that the aspherical surface satisfies the condition (5). If the condition (5) is not satisfied in this case, it will be similarily impossible to correct astigmatism and distortion at the wide position of the zoom lens system.

Further, it is desirable that the front lens unit of the zoom lens system according to the present invention is composed, in order from the object side, of a negative lens component and a positive lens component, and comprises at least one aspherical surface which is shaped so as to satisfy the following condition (6):

(6) $0 < \Delta_F/\phi_F$ $$\phi_F = (n_F' - n_F)/r_F$$

wherein the reference symbol $r_F$ represents a paraxial radius of curvature on the aspherical surface disposed in the front lens unit, the reference symbols $n_F'$ and $n_F$ designate refractive indices of media located before and after respectively the aspherical surface, and the reference symbol $\Delta_F$ denotes a deviation (or displacement) of the aspherical surface from a reference sphere thereof as measured in a direction parallel to an optical axis on the most outer point of a clear aperture.

The condition (6) defines a shape of the aspherical surface which is to be disposed in the front lens unit. The condition (6) means that the aspherical surface to be used in the front lens unit is to have such a shape as to progressively weaken a negative refractive power as portions of the aspherical surface are farther from the optical axis. When the condition (6) is satisfied, it is possible to correct astigmatism and distortion more favorably.

Furthermore, it is desirable that the positive lens component disposed at the object side location in the rear lens unit has a focal length $f_{R1}$ satisfying the following condition (7) or (8):

(7) $0.5 < f_{R1}/f_2 < 1.0$ (8) $0.5 < f_{R1}/f_2 < 1.5$

In the zoom lens system according to the present invention, a diverging light bundle emerges from the front lens unit and this diverging light bundle is converged by the rear lens unit onto an image surface. Accordingly, a converging function of the zoom lens system according to the present invention is imparted entirely to the positive lens components which are disposed in the rear lens unit. Out of these positive lens components, the one which is disposed on the image side in the rear lens unit should desirably be configured so as to satisfy the above-mentioned condition (7) or (8).

When the rear lens unit consists of the positive lens component and the negative lens component or the positive lens component, the negative lens component and the negative lens component, it is desirable that the positive lens component satisfies the condition (7). When the rear lens unit has the composition described above, the upper limit of the condition (7) cannot be exceeded since the rear lens unit comprises a single positive lens component. If the lower limit of the condition (7) is exceeded, the positive lens component disposed in the rear lens unit will have too strong a refractive power, thereby making it impossible to correct aberrations sufficiently favorably.

When the rear lens unit consists of the positive lens component, the positive lens component and the negative lens component, it is desirable that the positive lens component disposed at the object side location in the rear lens unit has a focal length satisfying the condition (8). Further, it is desirable that most of the positive refractive power of the rear lens unit is imparted to the positive lens component which is disposed at the object side location in the rear lens unit. If the upper limit of the condition (8) is exceeded, spherical aberration will be overcorrected or if the lower limit of the condition (8) is exceeded, spherical aberration will be undercorrected, whereby spherical aberration cannot be corrected sufficiently favorably in either case.

Furthermore, when the rear lens unit consists of the positive lens component and the negative lens component or the positive lens component, the negative lens component and the negative lens component, it is desirable that the following condition (9) is satisfied:

(9) $0.1 < d_{R1}/f_2 < 0.5$ wherein the reference symbol $d_{R1}$ represents thickness of the positive lens component disposed in the rear lens unit.

The condition (9) is required for correcting astigmatism. If the positive lens component is thin enough to exceed the lower limit of the condition (9), astigmatism will not be corrected sufficiently. If the positive lens component is thick enough to exceed the upper limit of the condition (9), an effect advantageous for correction of aberrations will be obtained but the zoom lens system will undesirably have a prolonged total length.

When the rear lens unit consists of the three lens components, i.e., the positive lens component, the negative lens component and the negative lens component or the positive lens component, the positive lens component and the negative lens component, it is desirable for shortening a total length of the zoom lens system to satisfy the following condition (10):

(10) $0.2 < f_{BW}/IH < 1.0$ wherein the reference symbol $f_{BW}$ represents a back focal length of the zoom lens system at the wide position thereof and the reference symbol IH designates a diagonal length of the image plane.

If the upper limit of the condition (10) is exceeded, the zoom lens system will have a prolonged back focal length and a prolonged total length accordingly. If the lower limit of the condition (10) is exceeded, in contrast, the zoom lens system will have a shortened back focal length and a shortened total length, but the rear lens unit will have a prolonged effective diameter which is undesirable from viewpoints of compactness and manufacturing cost of the zoom lens system.

BRIEF DESCRIPTION OF THE DRAWINGS

FIGS. 1(a) and 1(b) through FIGS. 18(a) and 18(b) show sectional views illustrating compositions of a first embodiment through an eighteenth embodiment of the zoom lens system according to the present invention;

FIGS. 19(a)–19(d) show graphs illustrating aberration characteristics at a wide position of the first embodiment of the present invention;

FIGS. 20(a)–20(d) show graphs illustrating aberration characteristics at an intermediate focal length of the first embodiment of the present invention;

FIGS. 21(a)–21(d) show graphs illustrating aberration characteristics at a tele position of the first embodiment of the present invention;

FIGS. 22(a)–22(d) show curves illustrating aberration characteristics at the wide position of the second embodiment of the present invention;

FIGS. 23(a)–23(d) show curves illustrating aberration characteristics at the intermediate focal length of the second embodiment of the present invention;

FIGS. 24(a)–24(d) show curves illustrating aberration characteristics at the tele position of the second embodiment of the present invention;

FIGS. 25(a)–25(d) show graphs visualizing aberration characteristics at the wide position of the third embodiment of the present invention;

FIGS. 26(a)–26(d) show graphs visualizing aberration characteristics at the intermediate focal length of the third embodiment of the present invention;

FIGS. 29(a)–29(d) show curves visualizing aberration characteristics at the intermediate focal length of the fourth embodiment of the present invention;

FIGS. 30(a)–30(d) show curves visualizing aberration characteristics at the tele position of the fourth embodiment of the present invention;

FIGS. 31(a)–31(d) show graphs illustrating aberration characteristics at the wide position of the fifth embodiment of the present invention;

FIGS. 32(a)–32(d) show graphs illustrating aberration characteristics at the intermediate focal length of the fifth embodiment of the present invention;

FIGS. 33(a)–33(d) show graphs illustrating aberration characteristics at the tele position of the fifth embodiment of the present invention;

FIGS. 34(a)-34(d) show curves illustrating aberration characteristics at the wide position of the sixth embodiment of the present invention;

FIGS. 37(a)-37(d) show graphs visualizing aberration characteristics at the wide position of the seventh embodiment of the present invention;

FIGS. 38(a)-38(d) show graphs visualizing aberration characteristics at the intermediate focal length of the seventh embodiment of the present invention;

FIGS. 39(a)-39(d) show graphs visualizing aberration characteristics at the tele position of the seventh embodiment of the present invention;

FIGS. 40(a)-40(d) show curves visualizing aberration characteristics at the wide position of the eighth embodiment of the present invention;

FIGS. 41(a)-41(d) show curves visualizing aberration characteristics at the intermediate focal length of the eighth embodiment of the present invention;

FIGS. 42(a)-42(d) show curves visualizing aberration characteristics at the tele position of the eighth embodiment of the present invention;

FIGS. 43(a)-43(d) show graphs illustrating aberration characteristics at the wide position of the ninth embodiment of the present invention;

FIGS. 44(a)-44(d) show curves illustrating aberration characteristics at the intermediate focal length of the ninth embodiment of the present invention;

FIGS. 47(a)-47(d) show graphs visualizing aberration characteristics at the intermediate focal length of the tenth embodiment of the present invention;

FIGS. 48(a)-48(d) show graphs visualizing aberration characteristics at the tele position of the tenth embodiment of the present invention;

FIGS. 51(a)-51(d) show curves visualizing aberration characteristics at the tele position of the eleventh embodiment of the present invention;

FIGS. 52(a)-52(d) show graphs visualizing aberration characteristics at the wide position of the twelfth embodiment of the present invention;

FIGS. 53(a)-53(d) show graphs visualizing aberration characteristics at the intermediate focal length of the twelfth embodiment of the present invention;

FIGS. 54(a)-54(d) show graphs visualizing aberration characteristics at the tele position of the twelfth embodiment of the present invention;

FIGS. 59(a)-59(d) show graphs illustrating aberration characteristics at the intermediate focal length of the fourteenth embodiment of the present invention;

FIGS. 60(a)-60(d) show graphs illustrating aberration characteristics at the tele position of the fourteenth embodiment of the present invention;

FIGS. 61(a)-61(d) show curves visualizing aberration characteristics at the wide position of the fifteenth embodiment of the present invention;

FIGS. 62(a)-62(d) show curves visualizing aberration characteristics at the intermediate focal length of the fifteenth embodiment of the present invention;

FIGS. 65(a)-65(d) show graphs visualizing aberration characteristics at the intermediate focal length of the sixteenth embodiment of the present invention;

FIGS. 66(a)-66(d) show graphs visualizing aberration characteristics at the tele position of the sixteenth embodiment of the present invention;

FIGS. 67(a)-67(d) show curves illustrating aberration characteristics at the wide position of the seventeenth embodiemnt of the present invention;

FIGS. 68(a)-68(d) show curves illustrating aberration characteristics at the intermediate focal length of the seventeenth embodiment of the present invention;

FIGS. 69(a)-69(d) show curves illustrating aberration characteristics at the tele position of the seventeenth embodiment of the present invention;

FIGS. 70(a)-70(d) show graphs visualizing aberration characteristics at the wide position of the eighteenth embodiment of the present invention;

DETAILED DESCRIPTION OF THE PREFERRED EMBODIMENTS

Figure 1A:
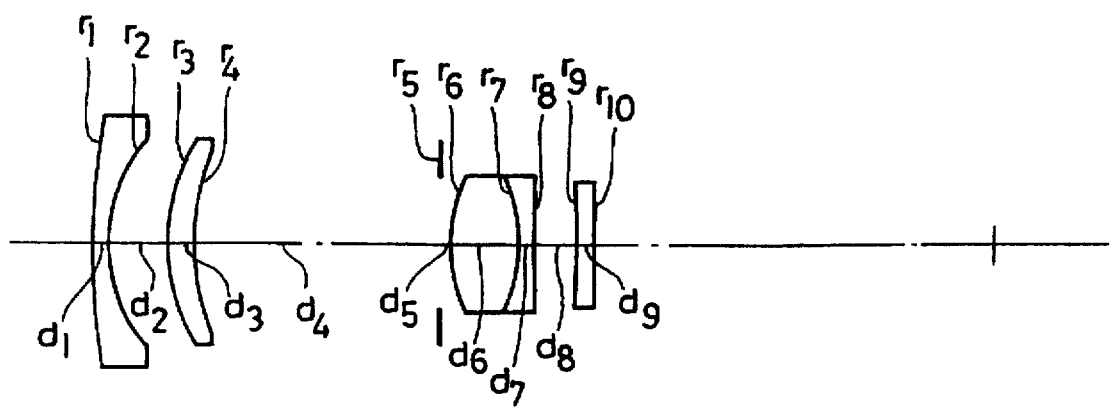
Figure 1B:
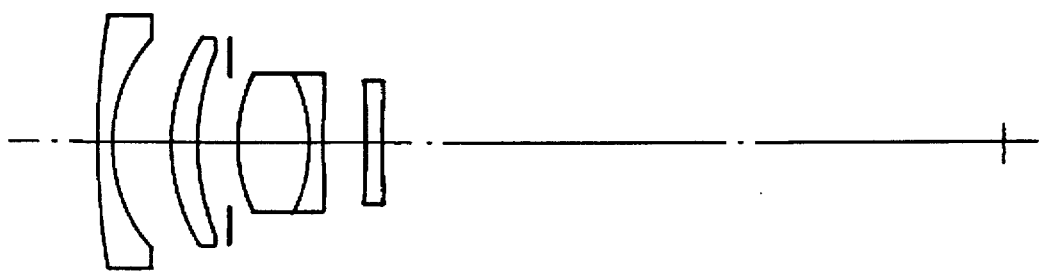
Figure 2A:
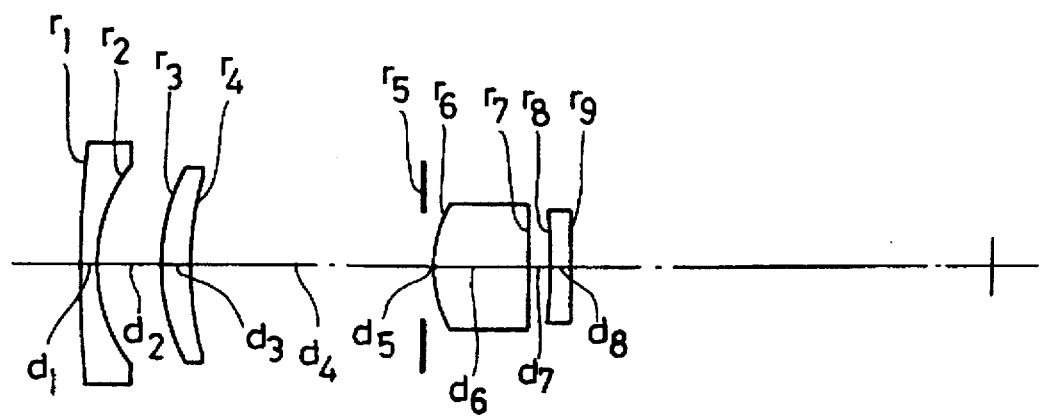
Figure 2B:
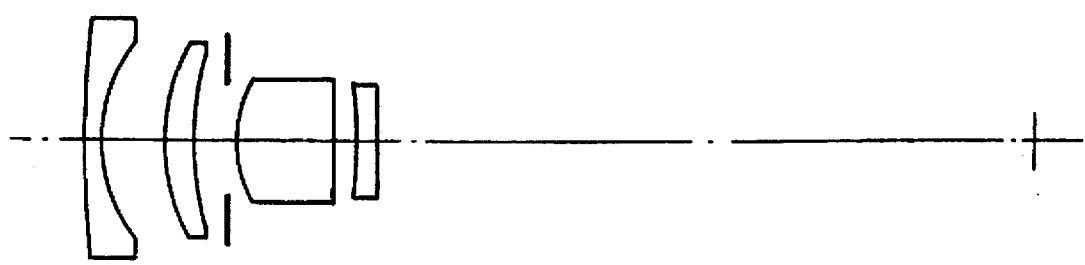
Figure 3A:
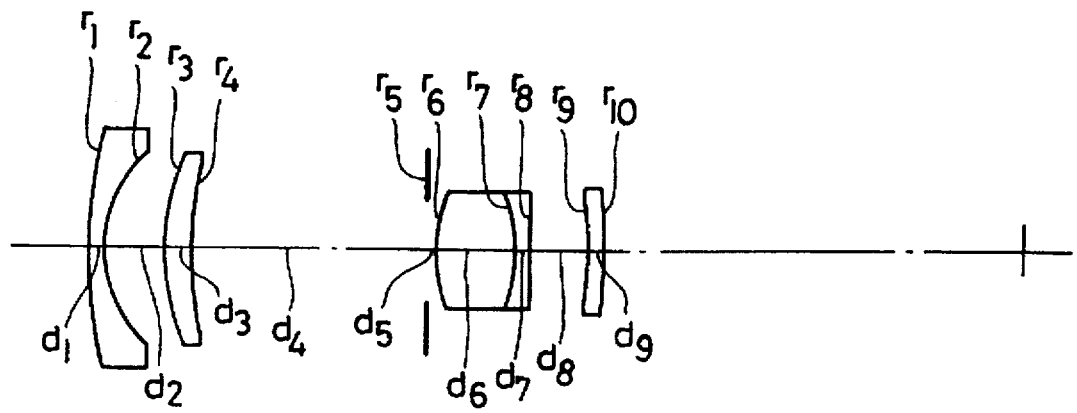
Figure 3B:
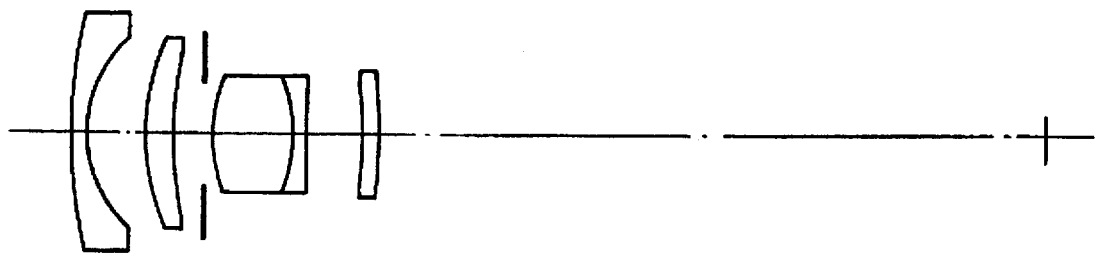
Figure 4A:
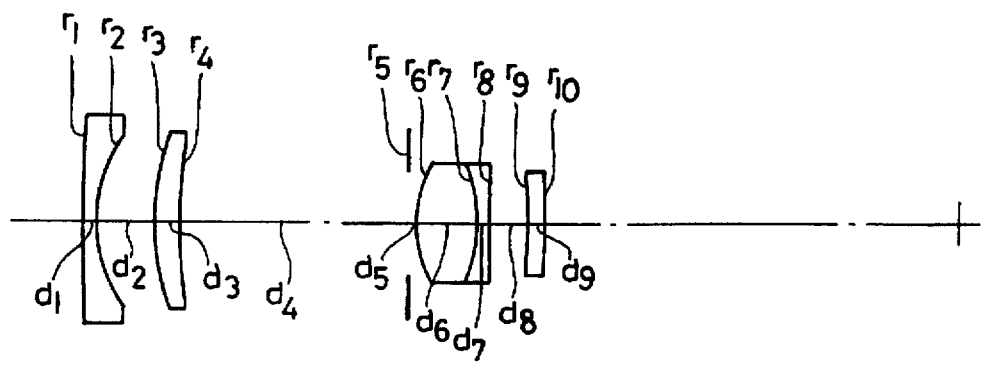
Figure 4B:
Figure 5A:
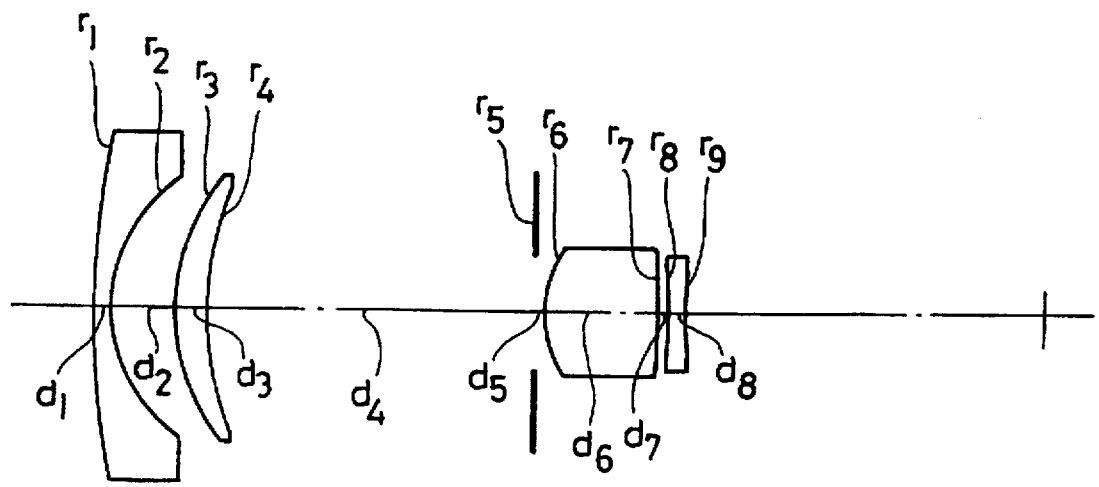
Figure 5B:
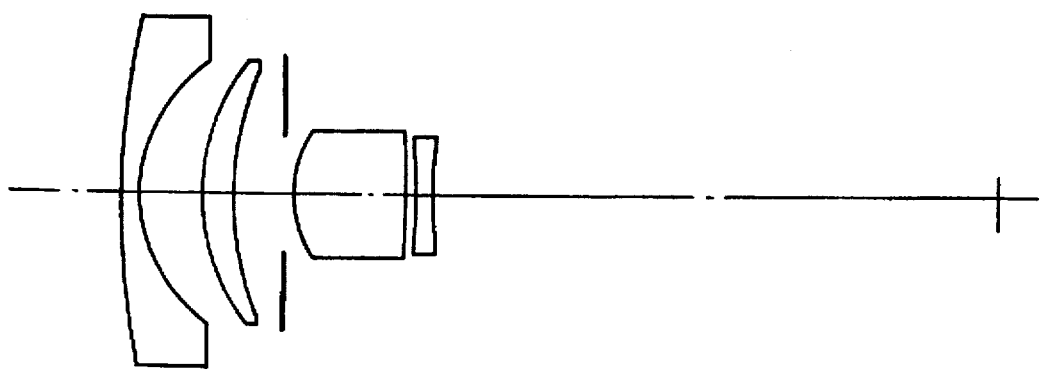
Figure 6A:
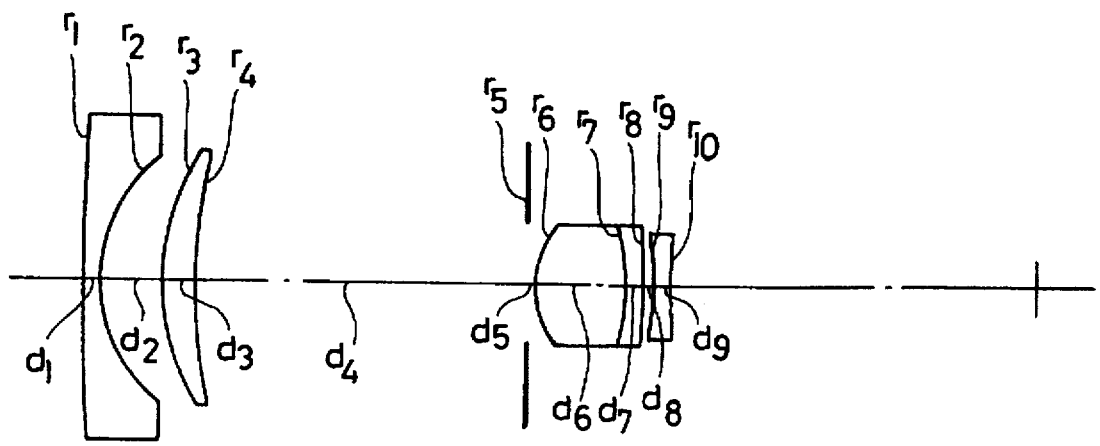
Figure 6B:
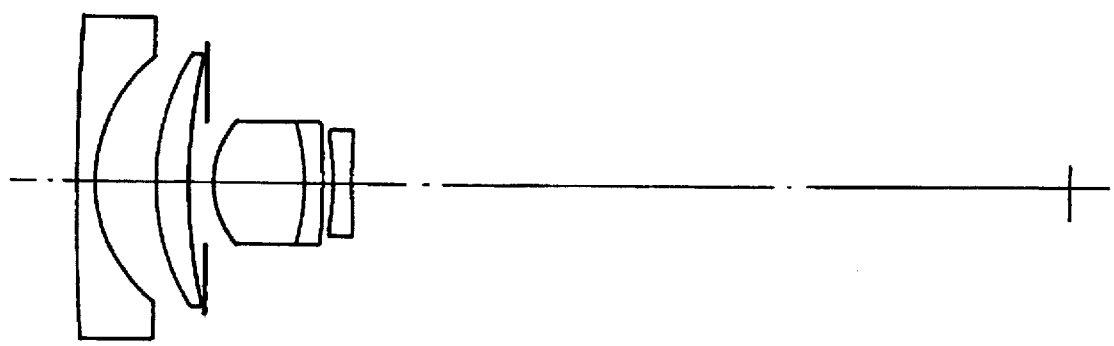
Figure 7A:
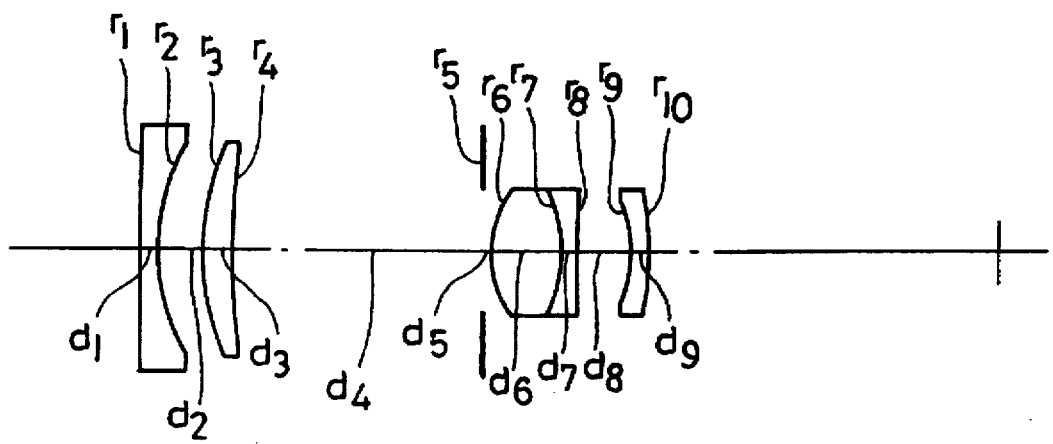
Figure 7B:
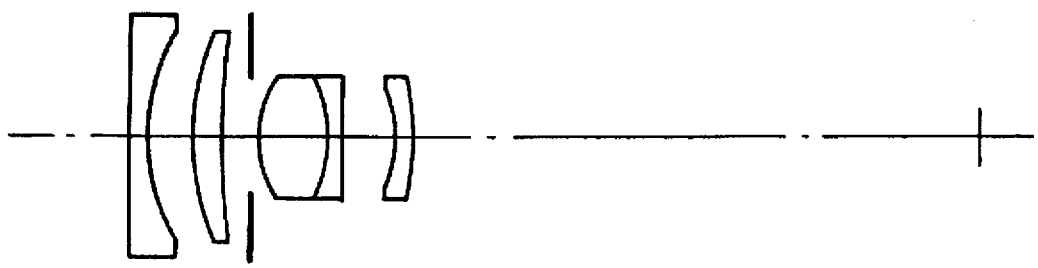
Figure 8A:
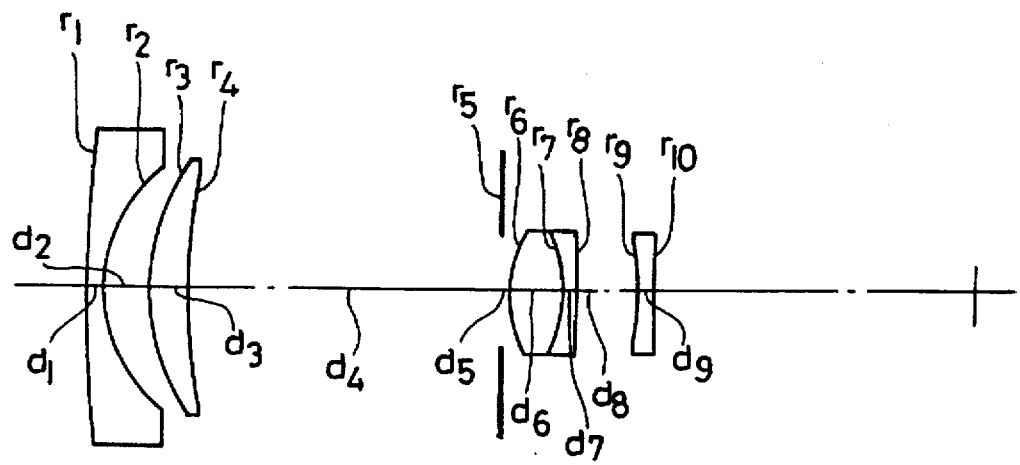
Figure 8B:
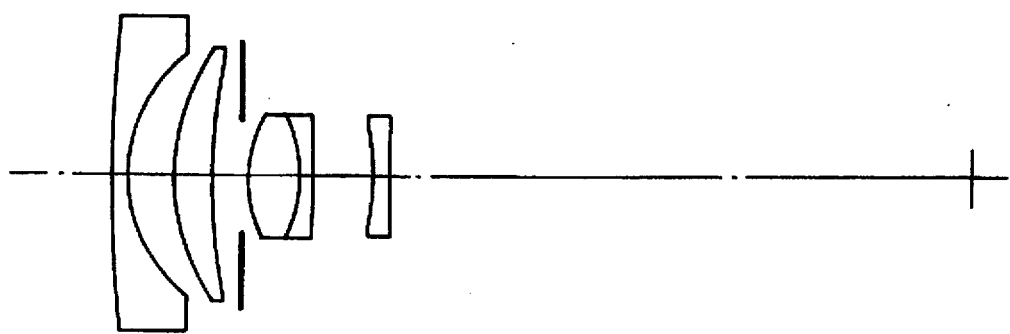
Figure 9A:
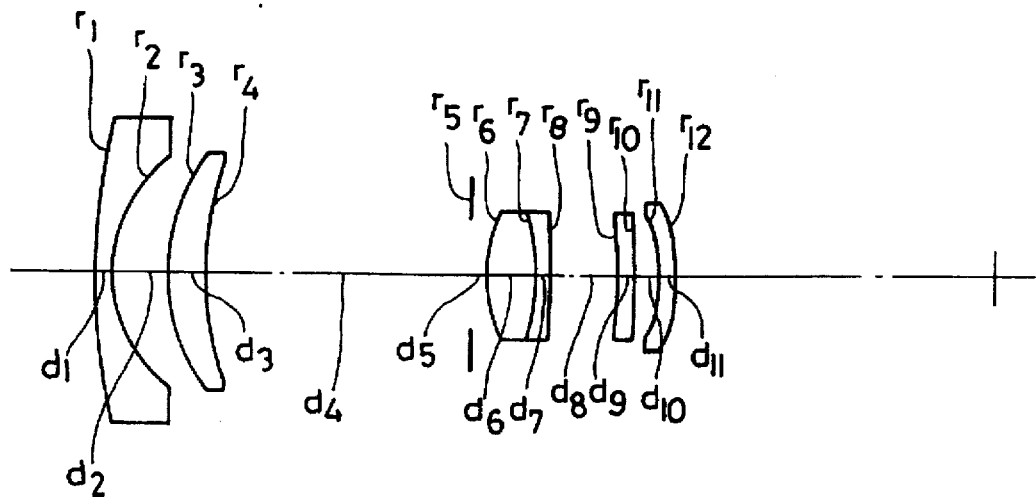
Figure 9B:
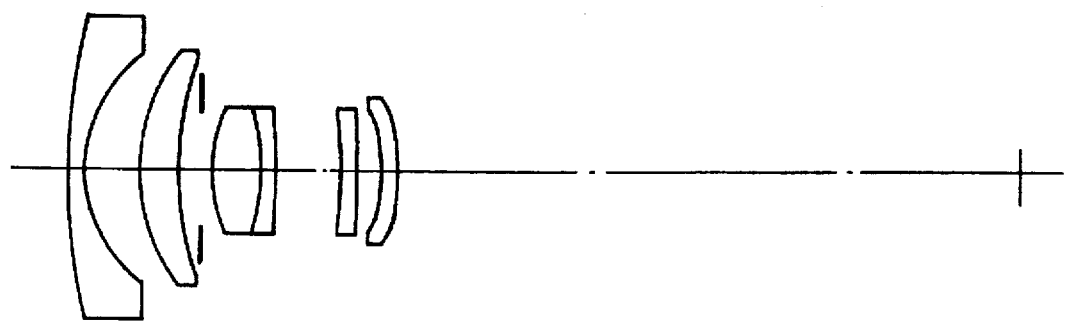
Figure 10A:
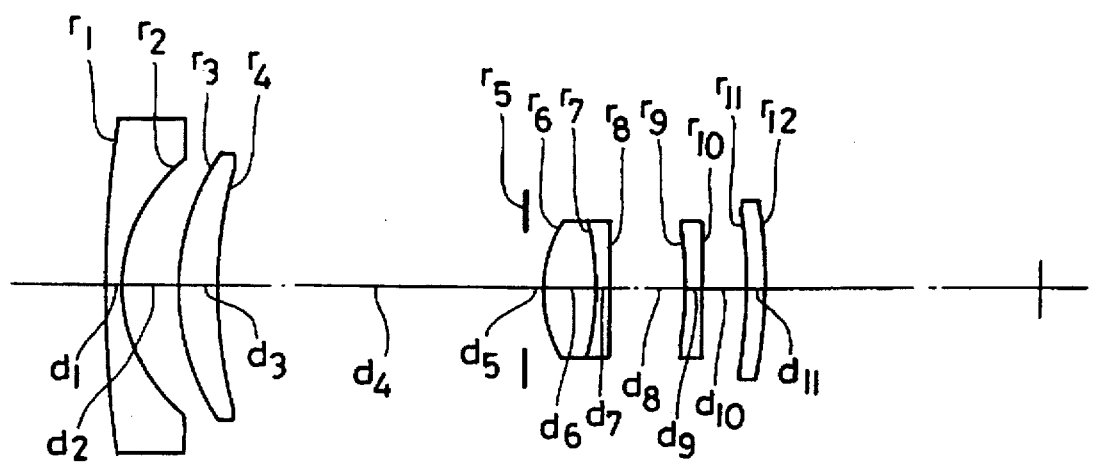
Figure 10B:
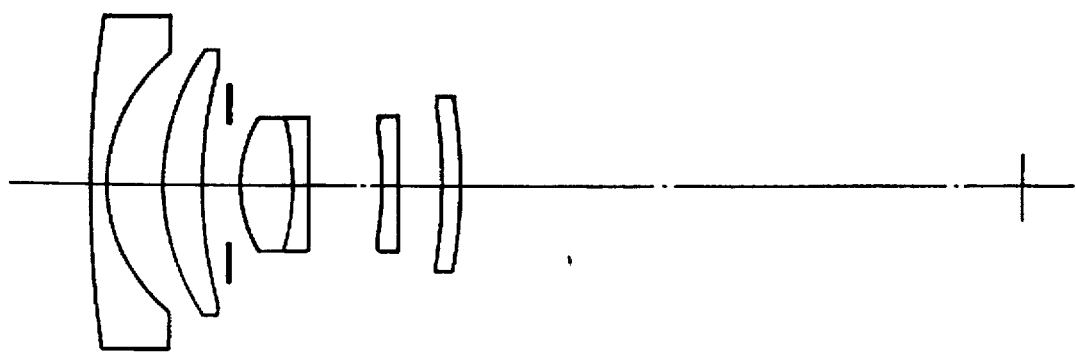
Figure 11A:
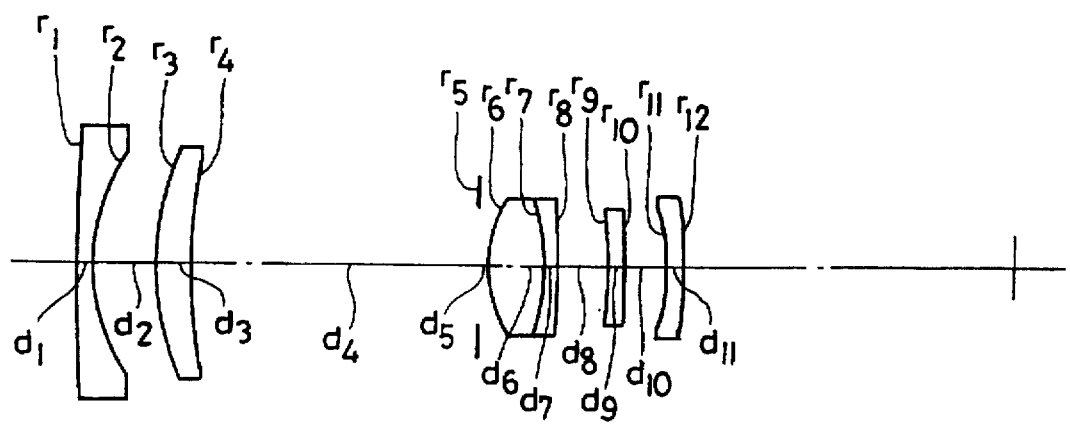
Figure 11B:
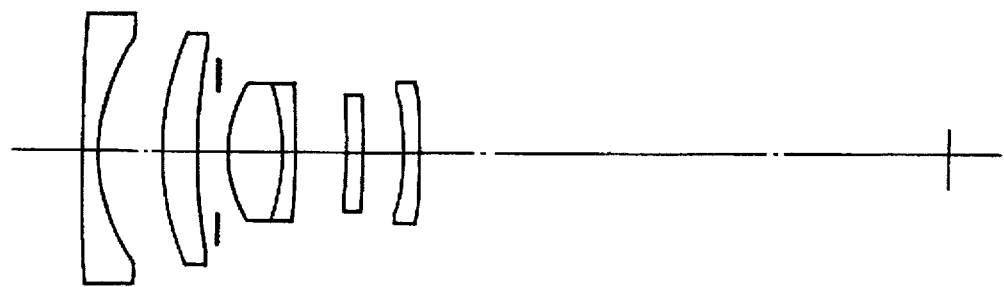
Figure 12A:
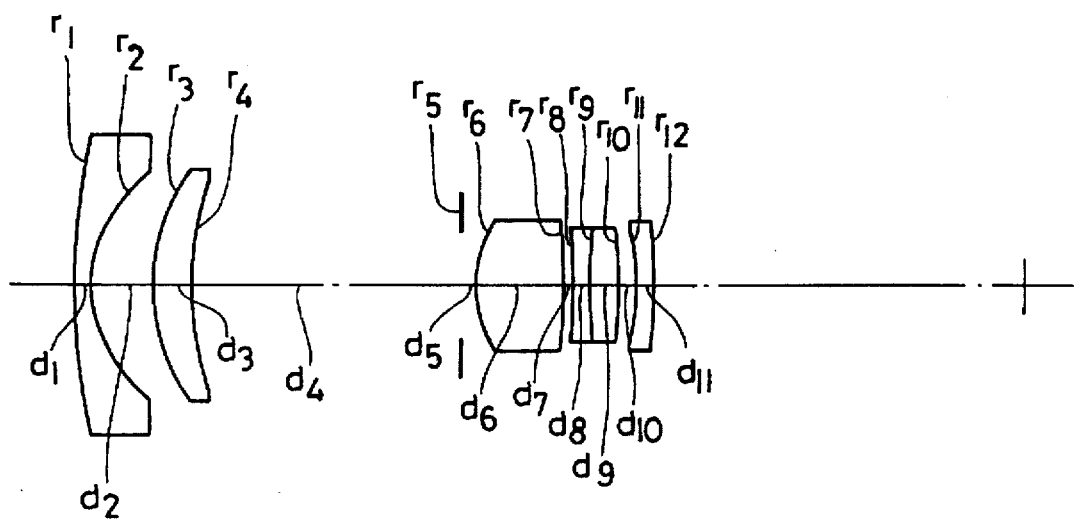
Figure 12B:
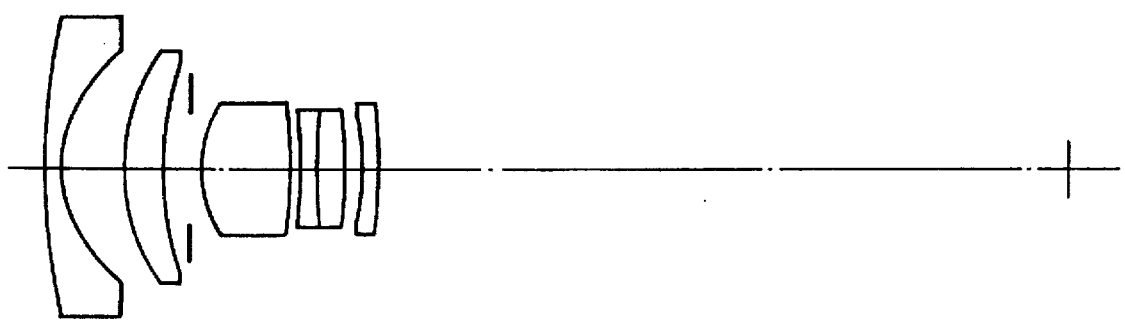
Figure 13A:
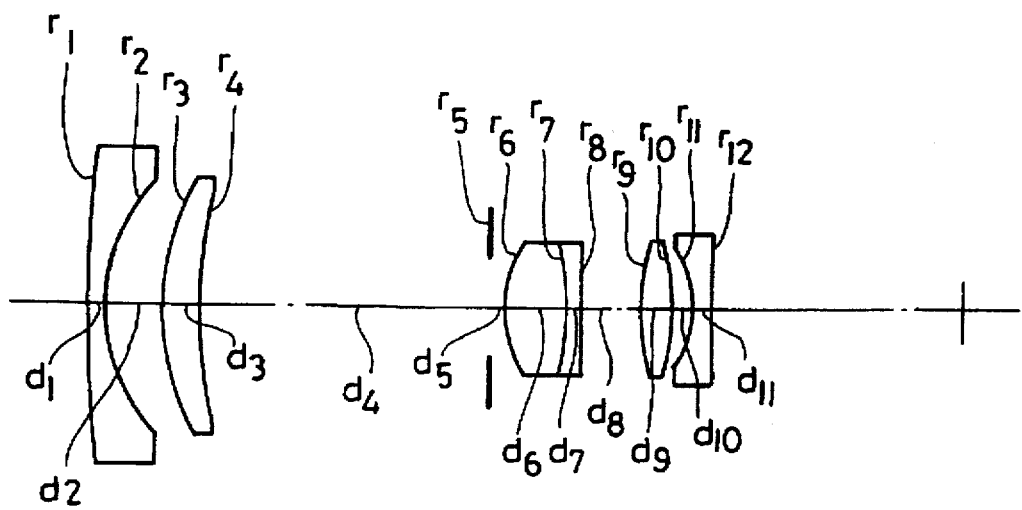
Figure 13B:
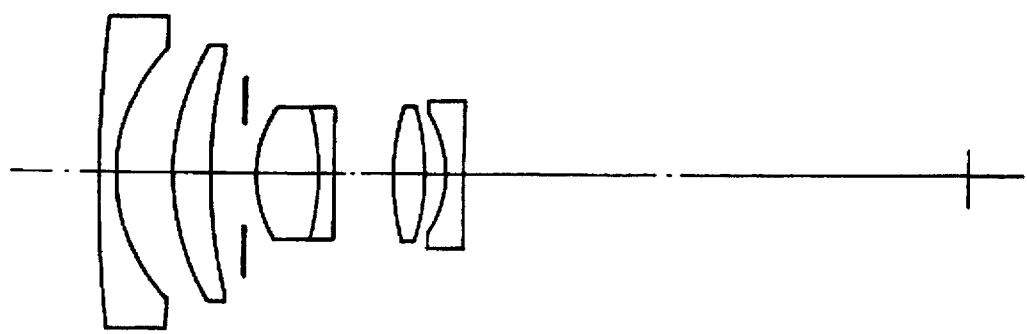
Figure 14A:
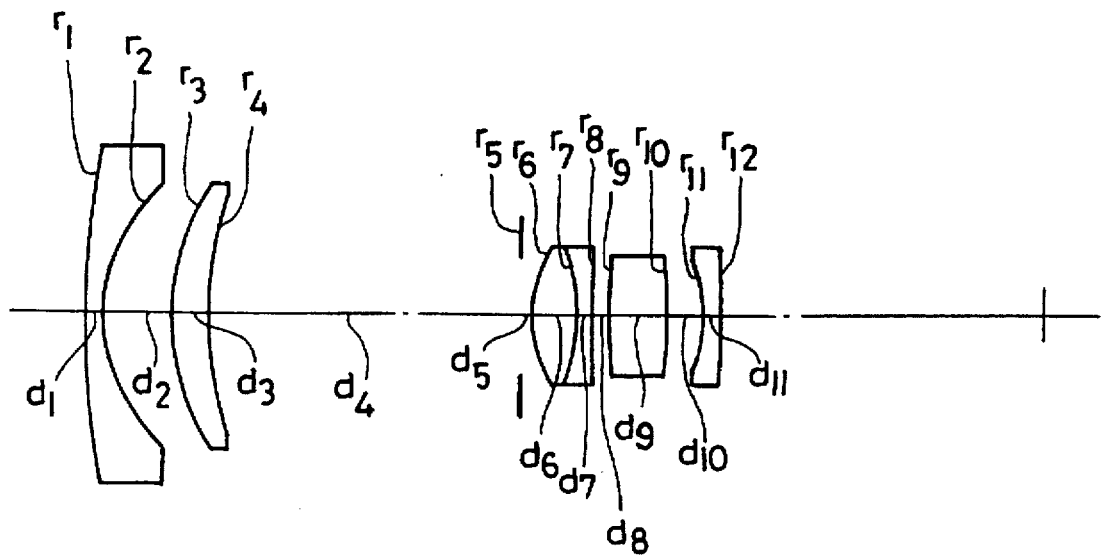
Figure 14B:
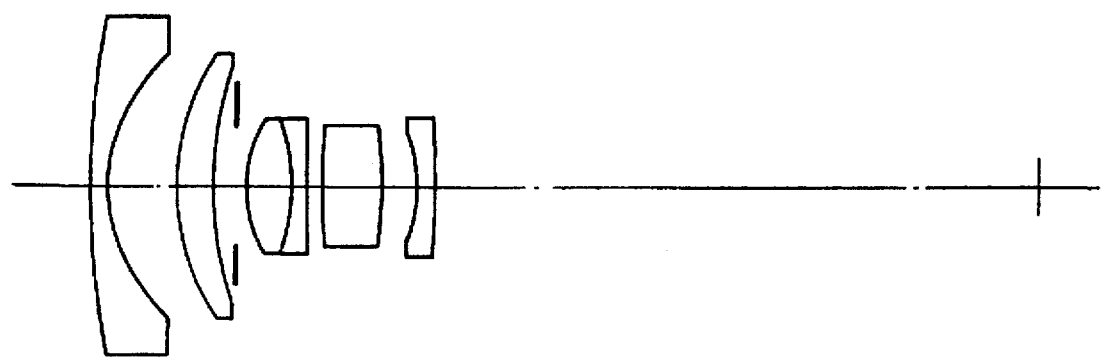
Figure 15A:
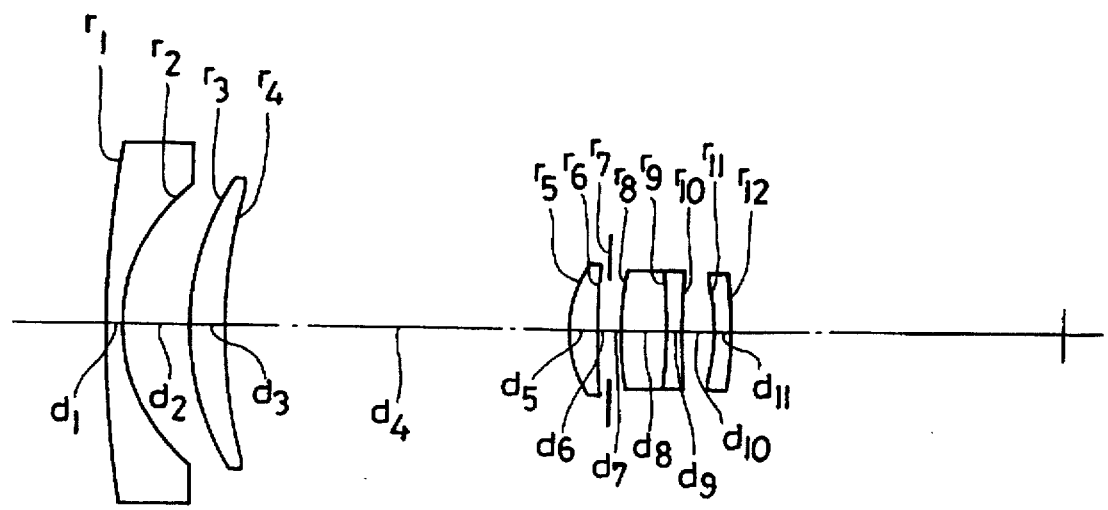
Figure 15B:
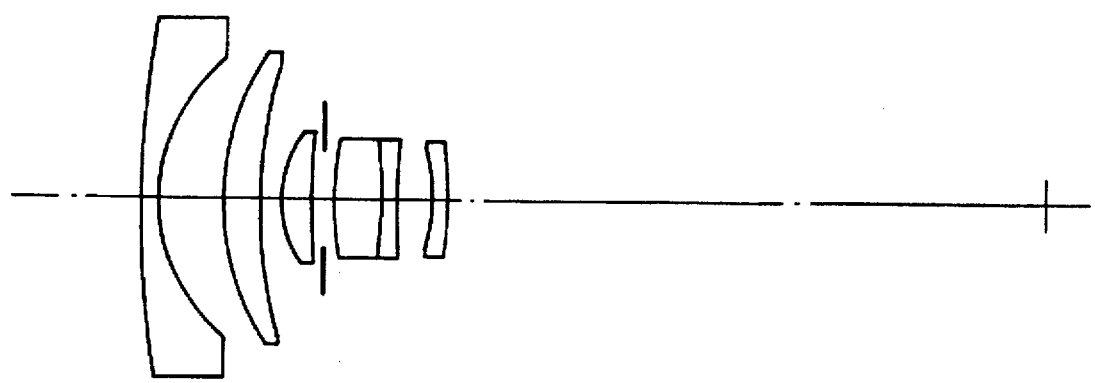
Figure 16A:
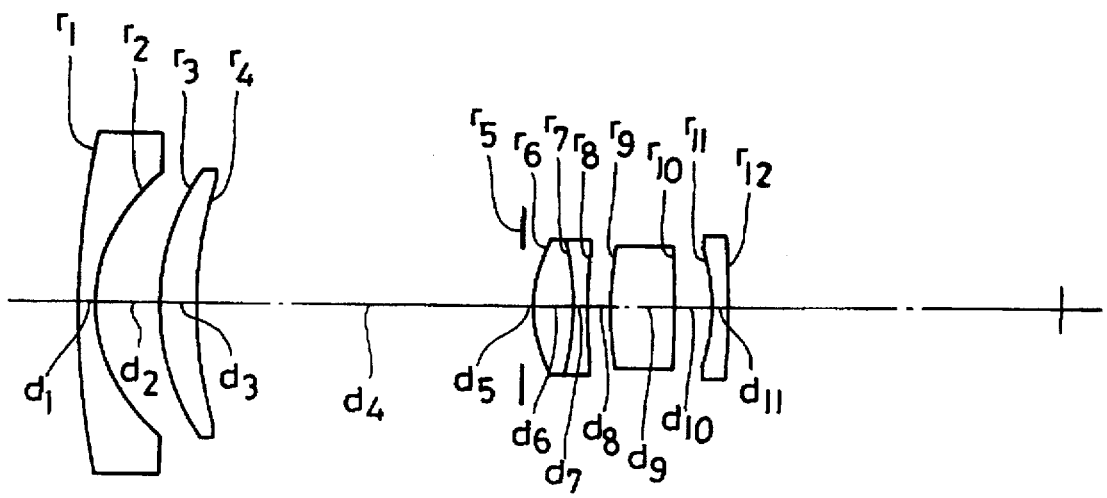
Figure 16B:
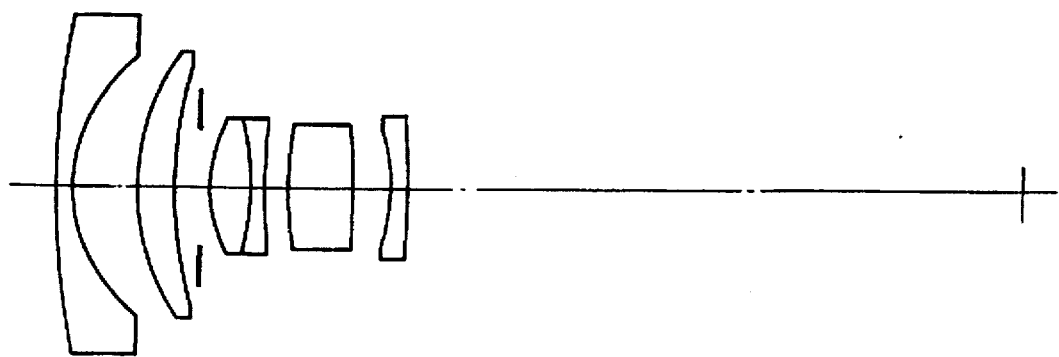
Figure 17A:
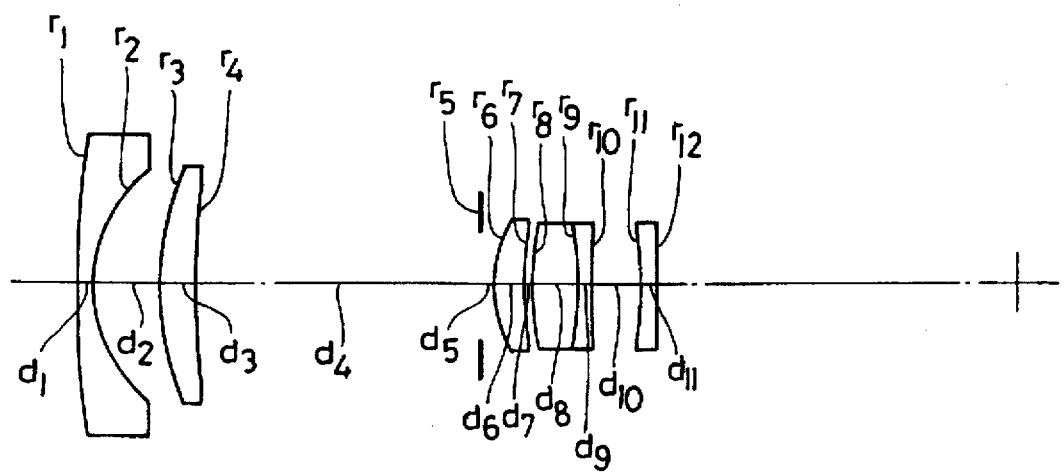
Figure 17B:
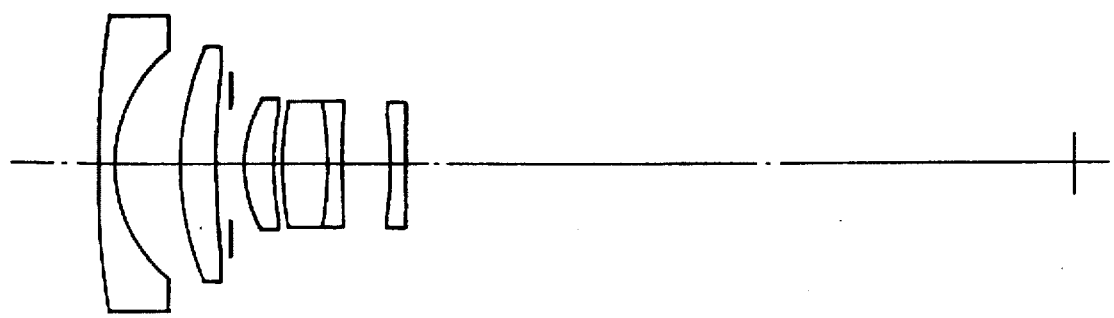
Figure 18A:
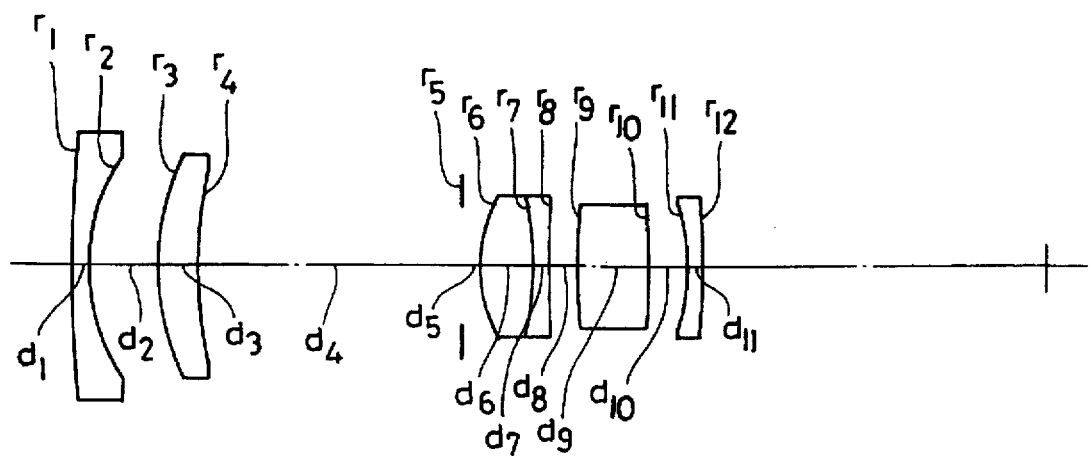
Figure 18B:
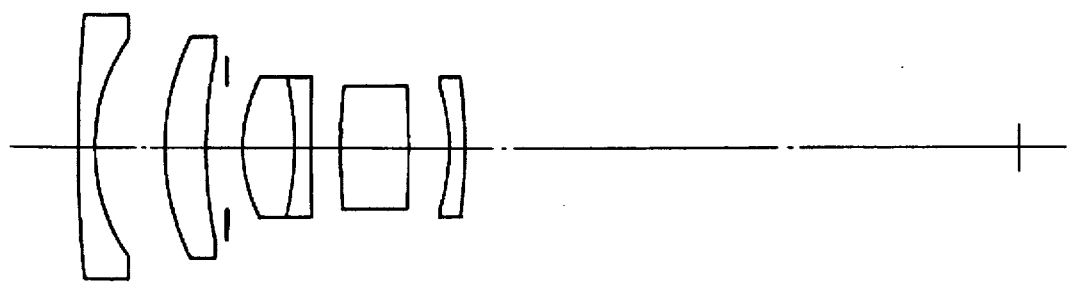
Figure 27A:
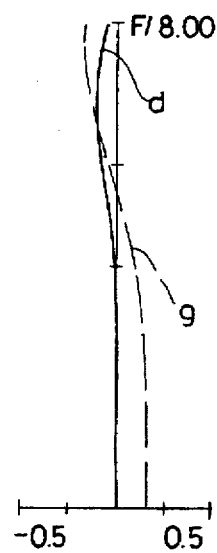
FIGS. 27(a)–27(d) show graphs visualizing aberration characteristics at the tele position of the third embodiment of the present invention.
Figure 27B:
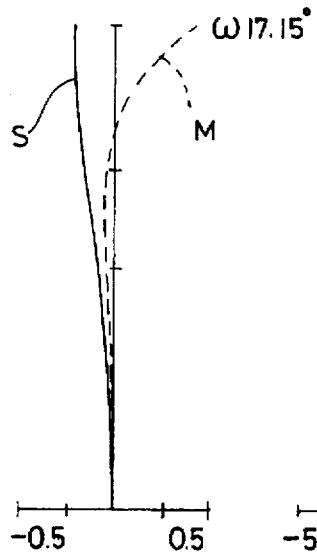
Figure 27C:
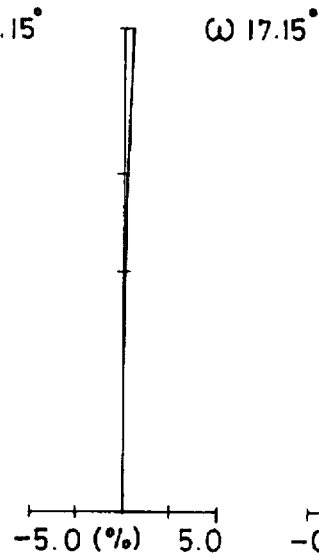
Figure 27D:
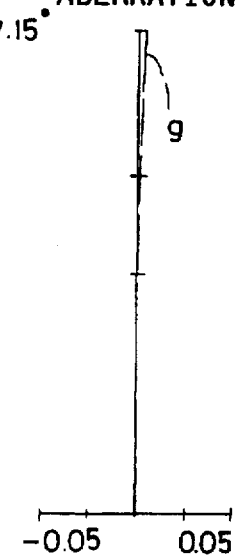
Figure 28A:
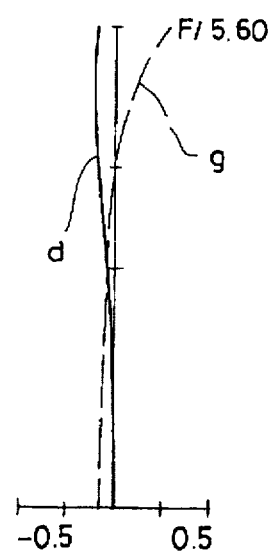
FIGS. 28(a)–28(d) show curves visualizing aberration characteristics at the wide position of the fourth embodiment of the present invention.
Figure 28B:
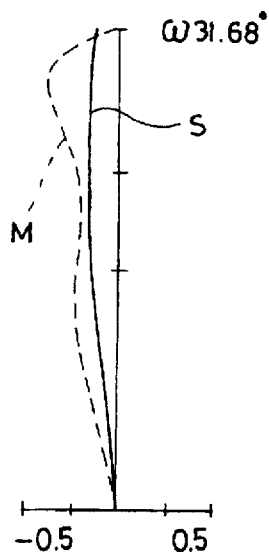
Figure 28C:
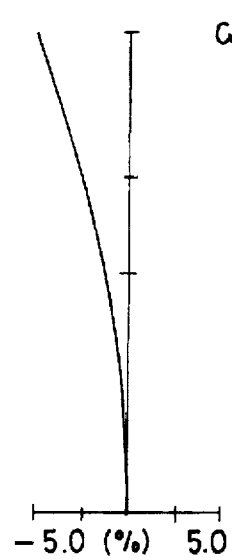
Figure 28D:
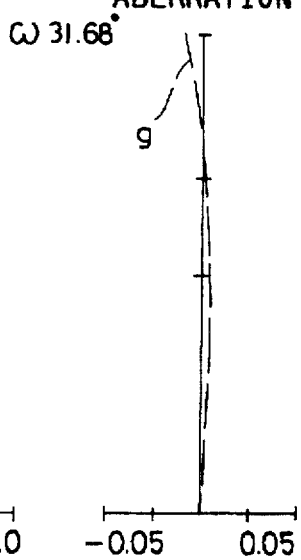
Figure 35A:
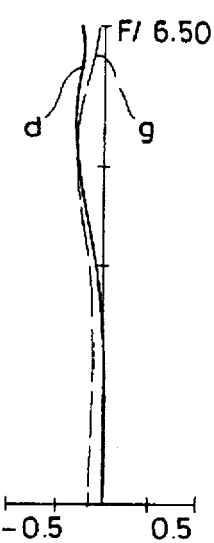
FIGS. 35(a)-35(d) show curves illustrating aberration characteristics at the intermediate focal length of the sixth embodiment of the present invention.
Figure 35B:
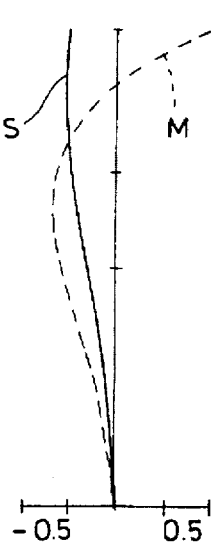
Figure 35C:
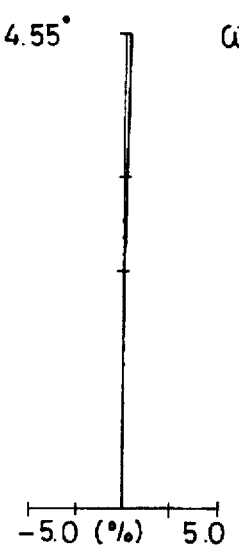
Figure 35D:
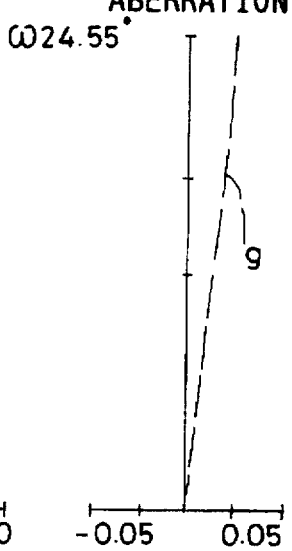
Figure 36A:
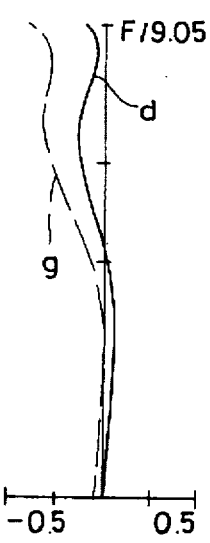
FIGS. 36(a)-36(d) show curves illustrating aberration characteristics at the tele position of the sixth embodiment of the present invention.
Figure 36B:
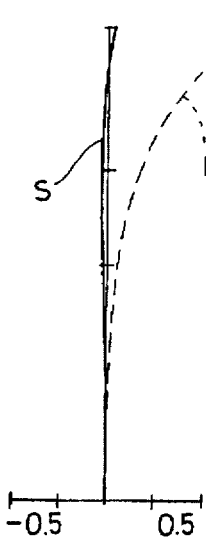
Figure 36C:
Figure 36D:
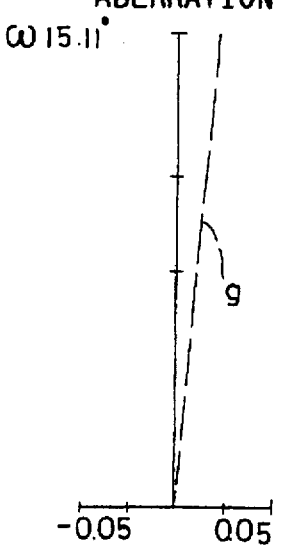
Figure 45A:
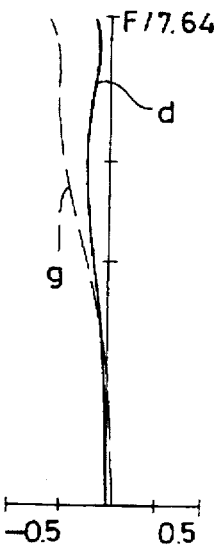
FIGS. 45(a)-45(d) show curves illustrating aberration characteristics at the tele position of the ninth embodiment of the present invention.
Figure 45B:
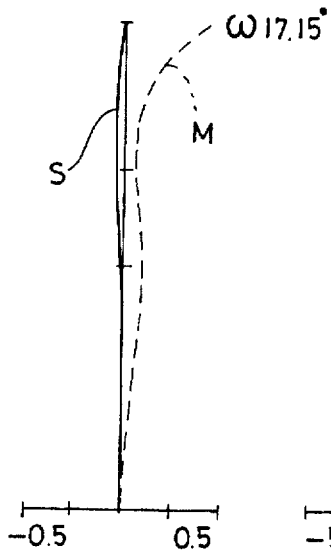
Figure 45C:
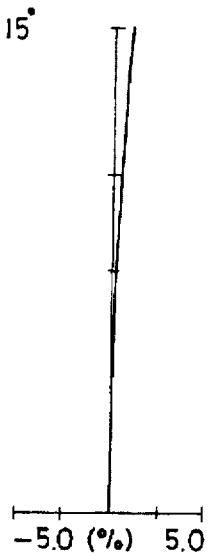
Figure 45D:
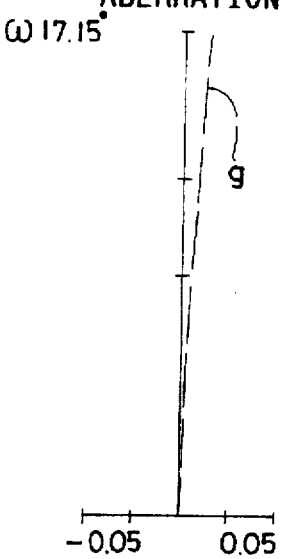
Figure 46A:
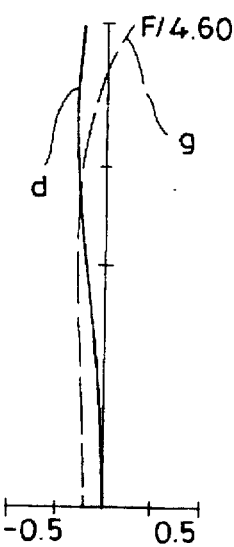
FIGS. 46(a)-46(d) show graphs visualizing aberration characteristics at the wide position of the tenth embodiment of the present invention.
Figure 46B:
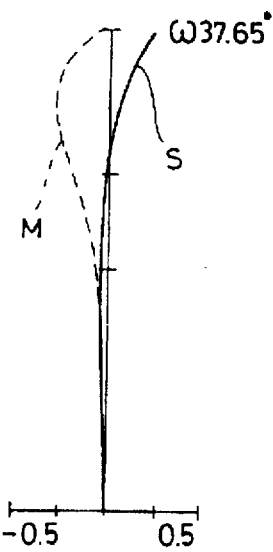
Figure 46C:
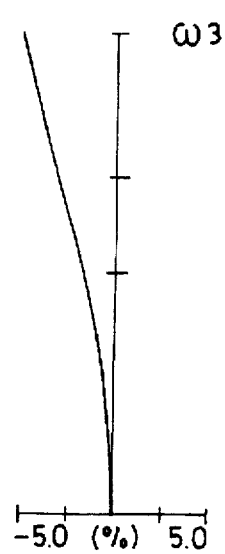
Figure 46D:
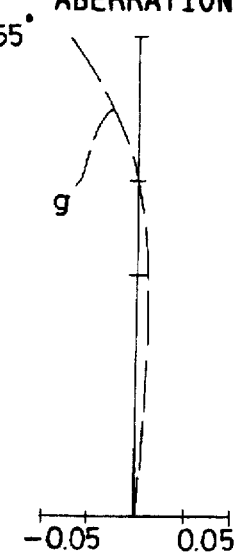
Figure 49A:
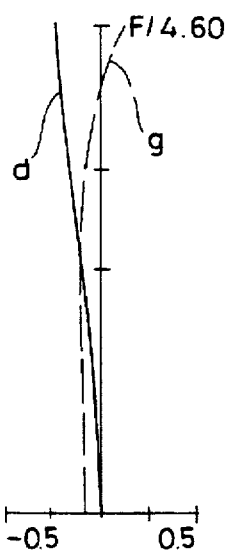
FIGS. 49(a)-49(d) show curves visualizing aberration characteristics at the wide position of the eleventh embodiment of the present invention.
Figure 49B:
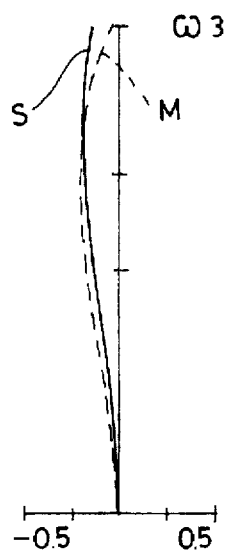
Figure 49C:
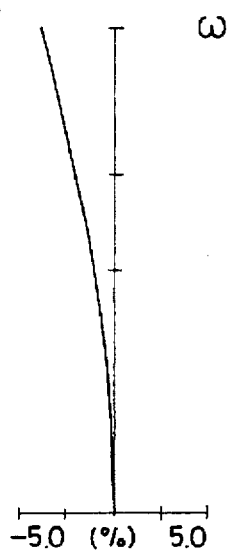
Figure 49D:
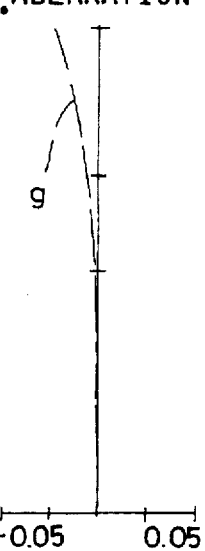
Figure 50A:
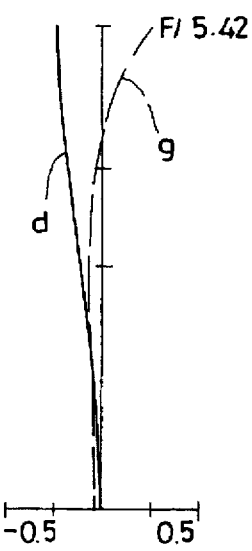
FIGS. 50(a)-50(d) show curves visualizing aberration characteristics at the intermediate focal length of the eleventh embodiment of the present invention.
Figure 50B:
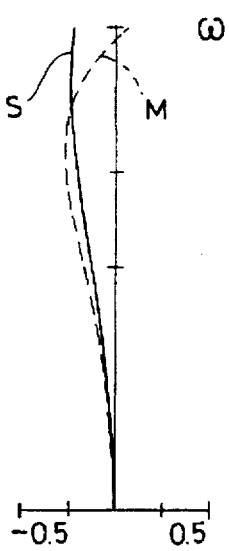
Figure 50C:
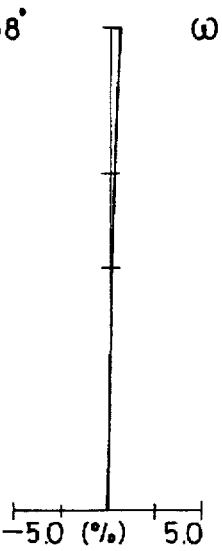
Figure 50D:
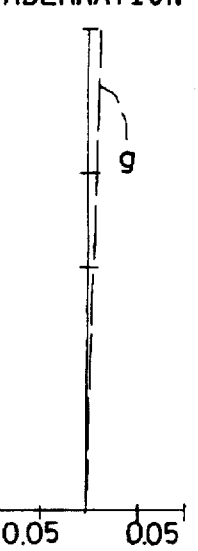
Figure 55A:
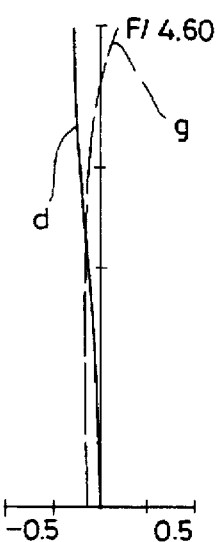
FIGS. 55(a)-55(d) show curves illustrating aberration characteristics at the wide position of the thirteenth embodiment of the present invention.
Figure 55B:
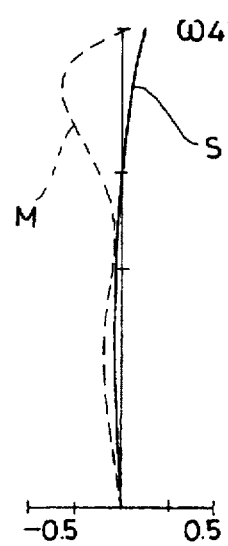
Figure 55C:
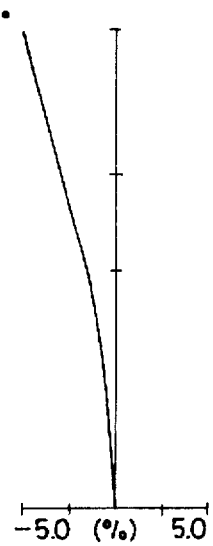
Figure 55D:
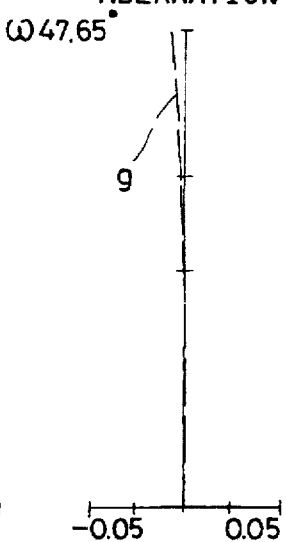
Figure 56A:
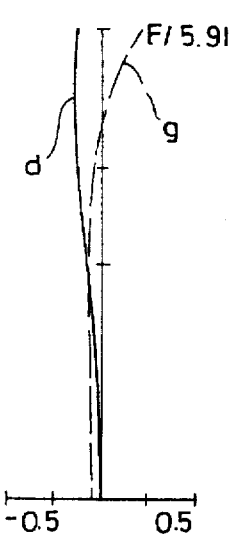
FIGS. 56(a)-56(d) show curves illustrating aberration characteristics at the intermediate focal length of the thirteenth embodiment of the present invention.
Figure 56B:
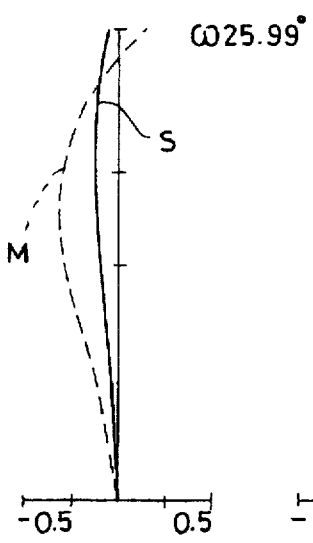
Figure 56C:
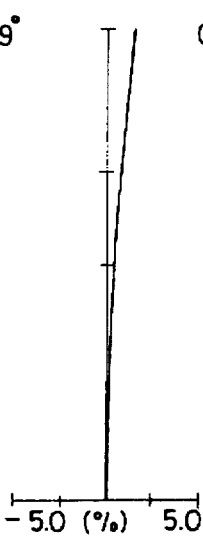
Figure 56D:
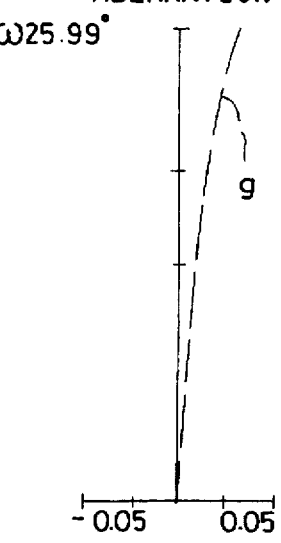
Figure 57A:
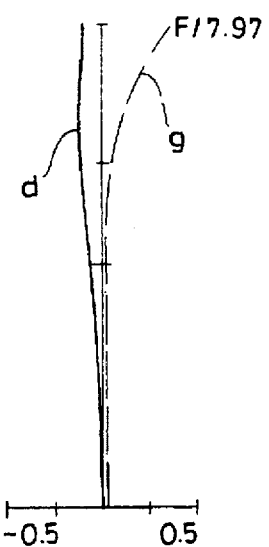
FIGS. 57(a)-57(d) show curves illustrating aberration characteristics at the tele position of the thirteenth embodiment of the present invention.
Figure 57B:
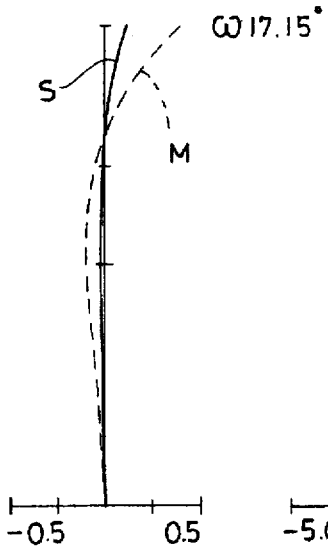
Figure 57C:
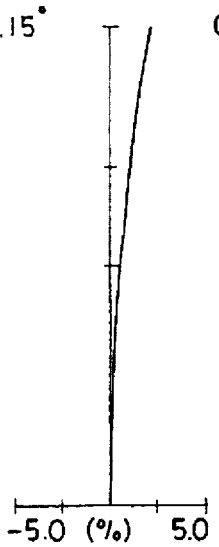
Figure 57D:
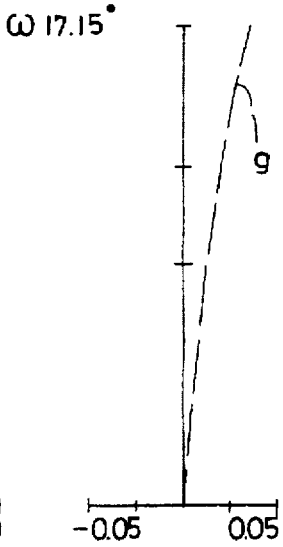
Figure 58A:
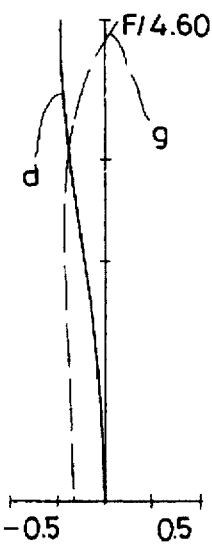
FIGS. 58(a)-58(d) show graphs illustrating aberration characteristics at the wide position of the fourteenth embodiment of the present invention.
Figure 58B:
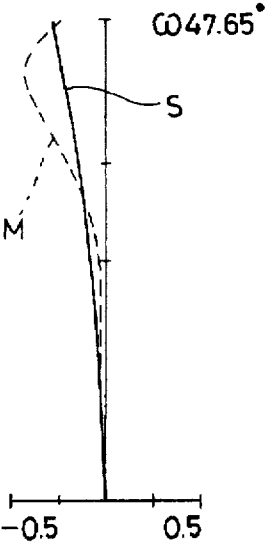
Figure 58C:
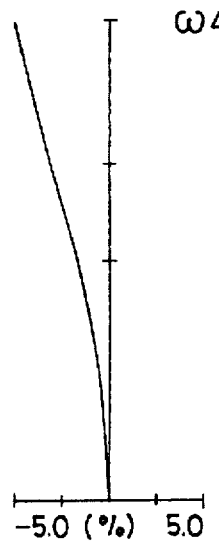
Figure 58D:
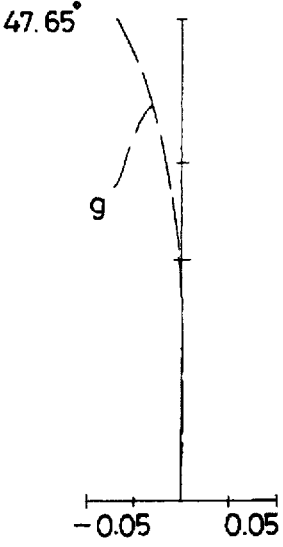
Figure 63A:
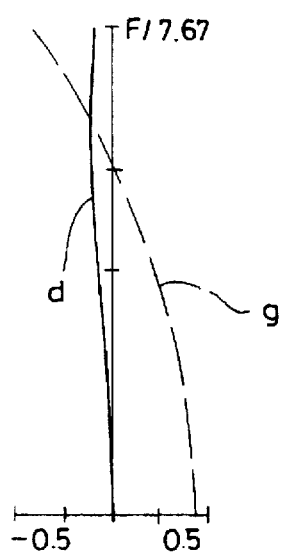
FIGS. 63(a)-63(d) show curves visualizing aberration characteristics at the tele position of the fifteenth embodiment of the present invention.
Figure 63B:
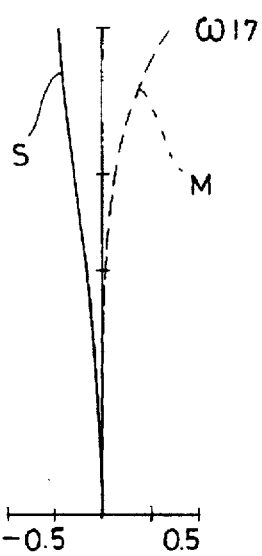
Figure 63C:
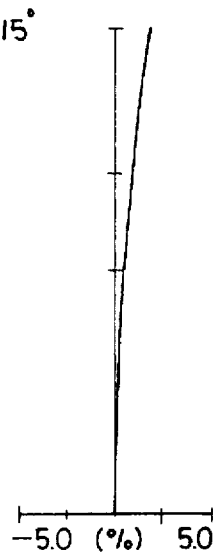
Figure 63D:
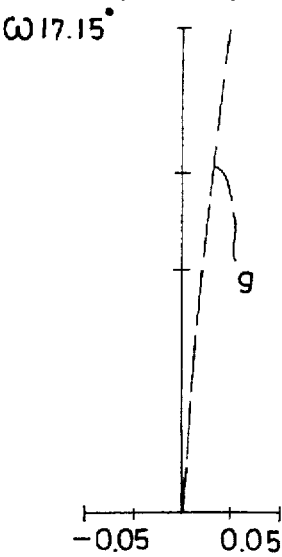
Figure 64A:
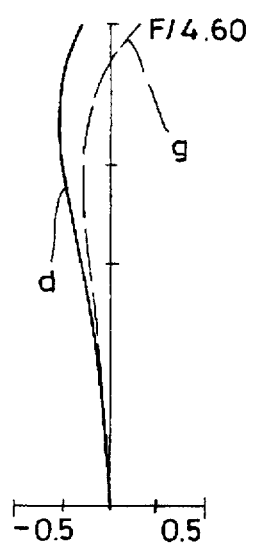
FIGS. 64(a)-64(d) show graphs visualizing aberration characteristics at the wide position of the sixteenth embodiment of the present inveniton.
Figure 64B:
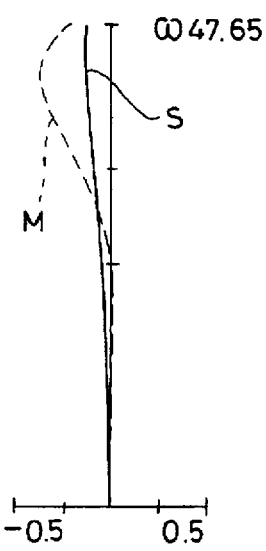
Figure 64C:
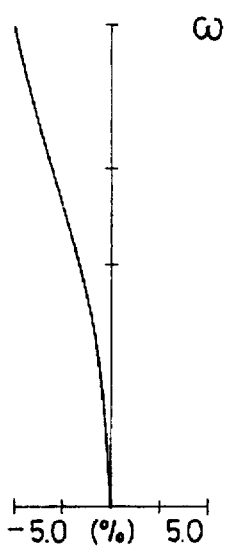
Figure 64D:
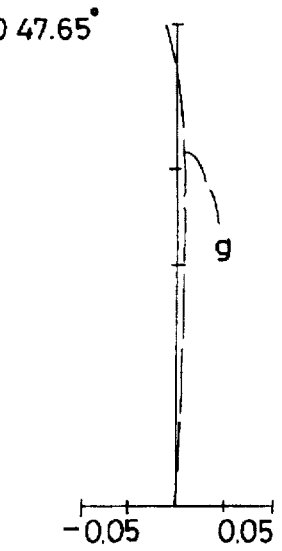
Figure 71A:
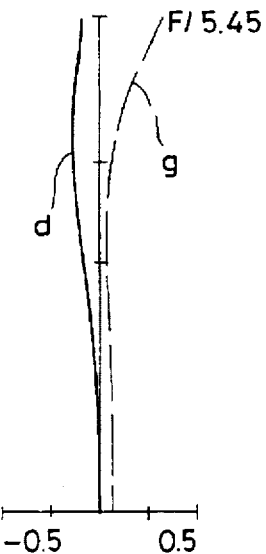
FIGS. 71(a)-71(d) show graphs visualizing aberration characteristics at the intermediate focal length of the eighteenth embodiment of the present invention.
Figure 71B:
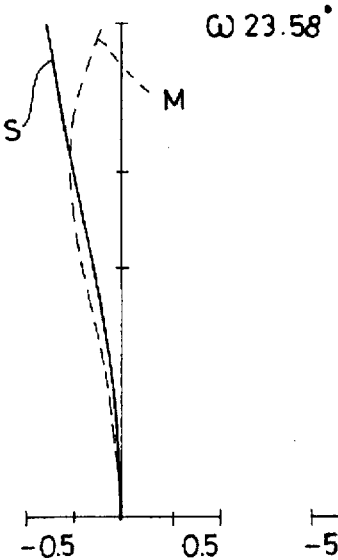
Figure 71C:
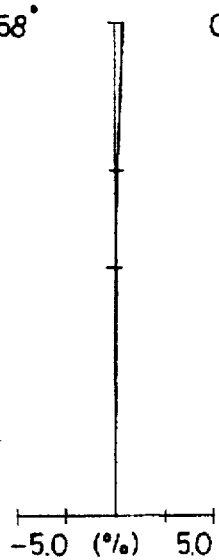
Figure 71D:
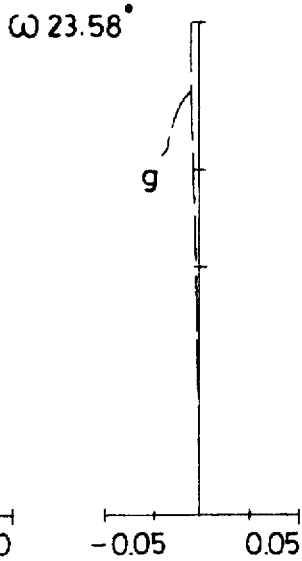
Figure 72A:
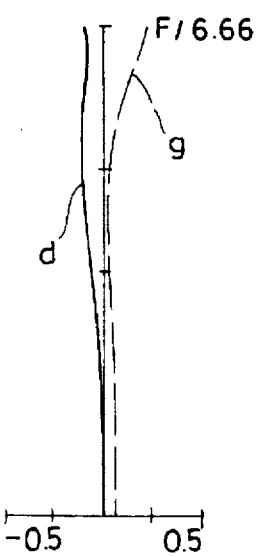
FIGS. 72(a)-72(d) show graphs visualizing aberration characteristics at the tele position of the eighteenth embodiment of the present invention.
Figure 72B:
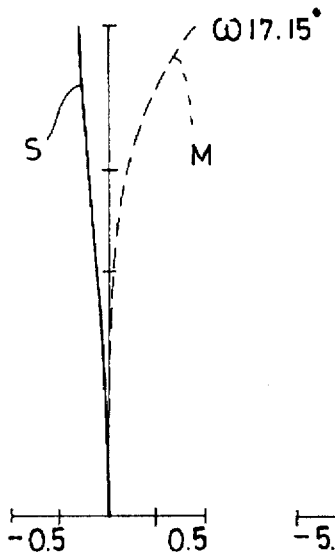
Figure 72C:
Figure 72D:
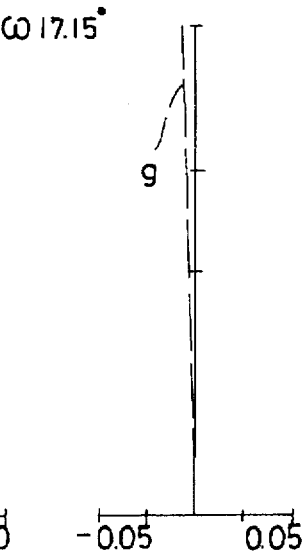

Now, the zoom lens system according to the present invention will be described more detailedly below with reference to the preferred embodiments illustrated in the accompanying drawings and given in a form of the following numerical data:

Embodiment 1

$f = 35 \sim 49.5 \sim 70$ mm, F/4.6~F/5.45~F/6.67
$2\omega = 63.36° \sim 47.15° \sim 34.30°$, $f_B = 43.3 \sim 53.3 \sim 67.4$ mm
$r_1 = 83.3070$ (aspherical surface)
$\quad d_1 = 1.8000 \quad n_1 = 1.72000 \quad \nu_1 = 46.03$
$r_2 = 17.0980$
$\quad d_2 = 6.3600$
$r_3 = 20.2750$
$\quad d_3 = 3.0000 \quad n_2 = 1.78472 \quad \nu_2 = 25.68$
$r_4 = 27.2690$
$\quad d_4 = D$ (variable)
$r_5 = \infty$ (stop)
$\quad d_5 = 1.0000$
$r_6 = 15.1410$ (aspherical surface)
$\quad d_6 = 7.7700 \quad n_3 = 1.58913 \quad \nu_3 = 61.18$
$r_7 = -16.6450$
$\quad d_7 = 1.5000 \quad n_4 = 1.59270 \quad \nu_4 = 35.29$
$r_8 = 150.1760$
$\quad d_8 = 4.6600$
$r_9 = -196.3710$ (aspherical surface)
$\quad d_9 = 1.8000 \quad n_5 = 1.67790 \quad \nu_5 = 50.72$
$r_{10} = 101.1350$ aspherical surface coefficients ($r_1$ surface) $\quad P = 0.9806, A_4 = 0.12526 \times 10^{-5}$,
$\quad A_6 = 0.19987 \times 10^{-8}, A_8 = 0.65313 \times 10^{-11}, A_{10} = 0$
($r_6$ surface) $\quad P = 0.9397, A_4 = 0.40635 \times 10^{-5}$,
$\quad A_6 = 0.20012 \times 10^{-8}, A_8 = 0.50181 \times 10^{-9}$,
$\quad A_{10} = 0.16818 \times 10^{-11}$
($r_9$ surface) $\quad P = 1.6594, A_4 = -0.85593 \times 10^{-4}$,
$\quad A_6 = 0.90250 \times 10^{-7}, A_8 = -0.23955 \times 10^{-7}$,
$\quad A_{10} = 0.25014 \times 10^{-9}$

| f | 35 | 49.5 | 70 |
|---|---|---|---|
| D | 26.615 | 12.905 | 3.214 |

$|f_1|/f_W = 1.39$, $f_2/f_W = 0.96$,
$\Delta_{RN}/\phi_{RN} = 34.18$ (y = 5.853) $r_9$ surface, $\nu_{RP} = 96.47$,
$\Delta_F/\phi_F = 6.48$ (y = 13.263) $r_1$ surface, $f_{R1}/f_2 = 0.83$

Embodiment 2

$f = 35 \sim 49.5 \sim 70$ mm, F/5.42~F/6.49~F/8.00
$2\omega = 63.36° \sim 47.15° \sim 34.30°$, $f_B = 44.4 \sim 54.9 \sim 69.7$ mm
$r_1 = 163.6670$ (aspherical surface)
$\quad d_1 = 1.7700 \quad n_1 = 1.69500 \quad \nu_1 = 42.16$
$r_2 = 16.9780$ (aspherical surface)
$\quad d_2 = 6.7000$
$r_3 = 22.0480$
$\quad d_3 = 3.0000 \quad n_2 = 1.80518 \quad \nu_2 = 25.43$
$r_4 = 31.9850$
$\quad d_4 = D$ (variable)
$r_5 = \infty$ (stop)
$\quad d_5 = 1.0000$
$r_6 = 11.9950$
(aspherical surface)
$\quad d_6 = 10.3000 \quad n_3 = 1.49700 \quad \nu_3 = 81.61$
$r_7 = -551.5680$
$\quad d_7 = 2.3400$
$r_8 = -55.1110$
(aspherical surface)
$\quad d_8 = 2.0000 \quad n_4 = 1.76182 \quad \nu_4 = 26.52$
$r_9 = 141.7500$ aspherical surface coefficients ($r_1$ surface) $\quad P = 0.9951, A_4 = 0.43429 \times 10^{-5}$,
$\quad A_6 = -0.13506 \times 10^{-9}, A_8 = -0.29536 \times 10^{-10}, A_{10} = 0$
($r_2$ surface) $\quad P = 1.1585, A_4 = -0.56237 \times 10^{-5}$,
$\quad A_6 = 0.38280 \times 10^{-7}, A_8 = -0.51975 \times 10^{-9}, A_{10} = 0$
($r_6$ surface) $\quad P = 0.9465, A_4 = 0.23840 \times 10^{-5}$,
$\quad A_6 = 0.56190 \times 10^{-7}, A_8 = 0.15830 \times 10^{-8}$,
$\quad A_{10} = 0.71618 \times 10^{-11}$
($r_8$ surface) $\quad P = 1.6434, A_4 = -0.12066 \times 10^{-3}$,
$\quad A_6 = -0.26085 \times 10^{-6}, A_8 = -0.39344 \times 10^{-7}$,
$\quad A_{10} = 0.43534 \times 10^{-9}$

| f | 35 | 49.5 | 70 |
|---|---|---|---|
| D | 24.654 | 12.199 | 3.395 |

$|f_1|/f_W = 1.29$, $f_2/f_W = 0.94$,
$\Delta_{RN}/\phi_{RN} = 6.66$ (y = 5.013) $r_8$ surface, $\nu_{RP} = 81.61$,
$\Delta_F/\phi_F = 19.31$ (y = 12.233) $r_1$ surface,
$0.24$ (y = 10.390) $r_2$ surface, $f_{R1}/f_2 = 0.72$

Embodiment 3

$f = 35 \sim 49.5 \sim 70$ mm, F/5.52~F/6.54~F/8.00
$2\omega = 63.36° \sim 47.15° \sim 34.30°$, $f_B = 45.6 \sim 56.6 \sim 72.2$ mm
$r_1 = 56.8690$
$\quad d_1 = 1.7600 \quad n_1 = 1.66672 \quad \nu_1 = 48.32$
$r_2 = 14.0300$
$\quad d_2 = 6.3500$
$r_3 = 25.4720$
$\quad d_3 = 3.0300 \quad n_2 = 1.80518 \quad \nu_2 = 25.43$
$r_4 = 38.5240$ (aspherical surface)
$\quad d_4 = D$ (variable)
$r_5 = \infty$ (stop)
$\quad d_5 = 1.0000$
$r_6 = 16.2750$
$\quad d_6 = 8.7600 \quad n_3 = 1.56907 \quad \nu_3 = 71.30$
$r_7 = -17.2510$
$\quad d_7 = 1.5000 \quad n_4 = 1.59551 \quad \nu_4 = 39.21$
$r_8 = 199.6540$
$\quad d_8 = 6.1800$
$r_9 = -50.7120$ (aspherical surface)
$\quad d_9 = 1.7600 \quad n_5 = 1.63854 \quad \nu_5 = 55.38$
$r_{10} = -71.0530$ aspherical surface coefficients ($r_4$ surface) $\quad P = 1.0000, A_4 = -0.13599 \times 10^{-4}$,
$\quad A_6 = -0.43293 \times 10^{-7}, A_8 = -0.18507 \times 10^{-9}, A_{10} = 0$
($r_9$ surface) $\quad P = 1.6364, A_4 = -0.62409 \times 10^{-4}$,
$\quad A_6 = -0.11008 \times 10^{-5}, A_8 = -0.94972 \times 10^{-8}$,
$\quad A_{10} = 0.88123 \times 10^{-10}$

| f | 35 | 49.5 | 70 |
|---|---|---|---|
| D | 25.379 | 12.385 | 3.200 |

$|f_1|/f_W = 1.29$, $f_2/f_W = 0.98$,
$\Delta_{RN}/\phi_{RN} = 7.47$ (y = 5.953) $r_9$ surface, $\nu_{RP} = 110.51$
$\Delta_F/\phi_F = 7.08$ (y = 9.403) $r_4$ surface, $f_{R1}/f_2 = 0.93$

Embodiment 4

$f = 35 \sim 56.1 \sim 90$ mm, F/5.6~F/7.25~F/9.92,
$2\omega = 63.36° \sim 42.12° \sim 26.99°$, $f_B = 49.4 \sim 67.1 \sim 95.5$ mm
$r_1 = 215.0200$
$\quad d_1 = 1.8300 \quad n_1 = 1.80400 \quad \nu_1 = 46.57$
$r_2 = 17.1590$ (aspherical surface)
$\quad d_2 = 6.7700$
$r_3 = 27.0920$
$\quad d_3 = 3.0000 \quad n_2 = 1.76182 \quad \nu_2 = 26.52$
$r_4 = 58.3920$
$\quad d_4 = D$ (variable)
$r_5 = \infty$ (stop)
$\quad d_5 = 1.0000$
$r_6 = 13.4650$ (aspherical surface)
$\quad d_6 = 7.5200 \quad n_3 = 1.56873 \quad \nu_3 = 63.16$
$r_7 = -17.6940$
$\quad d_7 = 1.5000 \quad n_4 = 1.63636 \quad \nu_4 = 35.37$
$r_8 = 114.7790$
$\quad d_8 = 4.7100$
$r_9 = -45.6040$ (aspherical surface)
$\quad d_9 = 1.8800 \quad n_5 = 1.77250 \quad \nu_5 = 49.66$
$r_{10} = -127.6830$ aspherical surface coefficients ($r_2$ surface) $\quad P = 1.2761, A_4 = -0.19169 \times 10^{-4}$,
$\quad A_6 = -0.12866 \times 10^{-7}, A_8 = -0.52470 \times 10^{-9}$,
$\quad A_{10} = 0$
($r_6$ surface) $\quad P = 0.9460, A_4 = 0.57808 \times 10^{-5}$,
$\quad A_6 = 0.10384 \times 10^{-6}, A_8 = 0.49381 \times 10^{-9}$,
$\quad A_{10} = 0.80171 \times 10^{-11}$
($r_9$ surface) $\quad P = 1.6587, A_4 = -0.91883 \times 10^{-4}$,
$\quad A_6 = -0.44647 \times 10^{-6}, A_8 = -0.14988 \times 10^{-7}$,
$\quad A_{10} = 0.11064 \times 10^{-9}$

| f | 35 | 56.1 | 90 |
|---|---|---|---|

-continued

| | | | |
|---|---|---|---|
| D | 27.720 | 11.696 | 1.685 |

|f₁|/f_W = 1.21, f₂/f_W = 1.01,
Δ_RN/φ_RN = 4.90 (y = 5.204) r₉ surface, ν_RP = 98.53,
Δ_P/φ_P = 3.61 (y = 10.296) r₂ surface,
f_R1/f₂ = 0.81

Embodiment 5 f = 28~41~60 mm, F/4.6~F/5.48~F/6.78,
2ω = 75.30°~55.56°~39.60°, f_B = 37.7~46.5~59.5 mm
r₁ = 122.7820 (aspherical surface)
    d₁ = 1.8000    n₁ = 1.70154    ν₁ = 41.24
r₂ = 16.3020 (aspherical surface)
    d₂ = 6.7800
r₃ = 22.2110
    d₃ = 3.4000    n₂ = 1.80518    ν₂ = 25.43
r₄ = 34.0820
    d₄ = D (variable)
r₅ = ∞ (stop)
    d₅ = 1.0000
r₆ = 11.7020 (aspherical surface)
    d₆ = 11.9900    n₃ = 1.49700    ν₃ = 81.61
r₇ = −141.3070
    d₇ = 1.1200
r₈ = −67.2250 (aspherical surface)
    d₈ = 1.7500    n₄ = 1.72151    ν₄ = 29.24
r₉ = 54.9190
aspherical surface coefficients (r₁ surface)  P = 0.9773, A₄ = 0.89503 × 10⁻⁵,
    A₆ = −0.22491 × 10⁻⁷, A₈ = 0.22777 × 10⁻¹⁰, A₁₀ = 0
(r₂ surface)  P = 0.8460, A₄ = 0.59062 × 10⁻⁵,
    A₆ = 0.21591 × 10⁻⁷, A₈ = −0.22459 × 10⁻⁹, A₁₀ = 0
(r₆ surface)  P = 1.2248, A₄ = −0.26776 × 10⁻⁴,
    A₆ = 0.16761 × 10⁻⁶, A₈ = −0.79024 × 10⁻⁸,
    A₁₀ = 0.64742 × 10⁻¹⁰
(r₈ surface)  P = 1.6355, A₄ = −0.13223 × 10⁻³,
    A₆ = −0.11823 × 10⁻⁵, A₈ = 0.30622 × 10⁻⁸,
    A₁₀ = −0.35826 × 10⁻⁹

| f | 28 | 41 | 60 |
|---|---|---|---|
| D | 34.863 | 17.308 | 5.335 |

|f₁|/f_W = 1.70, f₂/f_W = 1.16,
Δ_RN/φ_RN = 12.30 (y = 5.271) r₈ surface, ν_RP = 81.61,
Δ_P/φ_P = 72.11 (y = 17.791) r₁ surface,
9.50 (y = 13.905) r₂ surface, f_R1/f₂ = 0.69

Embodiment 6 f = 28~47.3~80 mm, F/5~F/6.50~F/9.05,
2ω = 75.30°~49.09°~30.22°, f_B = 40.1~54.7~79.4 mm
r₁ = 249.5410
    d₁ = 2.0000    n₁ = 1.72000    ν₁ = 43.70
r₂ = 15.6930 (aspherical surface)
    d₂ = 6.8000
r₃ = 26.8560
    d₃ = 3.5000    n₂ = 1.80518    ν₂ = 25.43
r₄ = 57.2890
    d₄ = D (variable)
r₅ = ∞ (stop)
    d₅ = 1.0000
r₆ = 10.7530 (aspherical surface)
    d₆ = 9.9900    n₃ = 1.49700    ν₃ = 81.61
r₇ = −23.7700
    d₇ = 2.0000    n₄ = 1.74950    ν₄ = 35.27
r₈ = −112.9100
    d₈ = 1.0900
r₉ = −44.6140 (aspherical surface)
    d₉ = 2.0000    n₅ = 1.71700    ν₅ = 47.94
r₁₀ = 104.3130
aspherical surface coefficients (r₂ surface)  P = 0.6617, A₄ = −0.71044 × 10⁻⁵,
    A₆ = 0.52999 × 10⁻⁸, A₈ = −0.14357 × 10⁻⁹,
    A₁₀ = 0
(r₆ surface)  P = 1.2229, A₄ = −0.23436 × 10⁻⁴,
    A₆ = −0.90880 × 10⁻⁷, A₈ = −0.12618 × 10⁻⁸,
    A₁₀ = −0.13681 × 10⁻¹¹
(r₉ surface)  P = 1.6353, A₄ = −0.17152 × 10⁻³,
    A₆ = −0.10439 × 10⁻⁵, A₈ = −0.39303 × 10⁻⁷, A₁₀ = 0

| f | 28 | 47.3 | 80 |
|---|---|---|---|
| D | 36.490 | 14.605 | 1.627 |

|f₁|/f_W = 1.59, f₂/f_W = 1.20,
Δ_RN/φ_RN = 8.21 (y = 4.938) r₉ surface, ν_RP = 116.88,
Δ_P/φ_P = 30.64 (y = 13.688) r₂ surface, f_R1/f₂ = 0.69

Embodiment 7 f = 35~49.5~70 mm, F/5.4~F/6.48~F/8.00,
2ω = 63.36°~47.15°~34.30°, f_B = 35.0~43.9~56.4 mm
r₁ = 464.3240
    d₁ = 1.8200    n₁ = 1.83400    ν₁ = 37.16
r₂ = 19.3530 (aspherical surface)
    d₂ = 4.5100
r₃ = 25.8360
    d₃ = 2.8900    n₂ = 1.78472    ν₂ = 25.68
r₄ = 64.4360
    d₄ = D (variable)
r₅ = ∞ (stop)
    d₅ = 1.0000
r₆ = 10.2900 (aspherical surface)
    d₆ = 7.1200    n₃ = 1.56873    ν₃ = 63.16
r₇ = −13.4020
    d₇ = 1.5000    n₄ = 1.72342    ν₄ = 37.95
r₈ = 453.9560
    d₈ = 5.2600
r₉ = −19.6390 (aspherical surface)
    d₉ = 1.8000    n₅ = 1.72916    ν₅ = 54.68
r₁₀ = −75.2090 (aspherical surface)

(r₂ surface)  P = 1.2759, A₄ = −0.85380 × 10⁻⁵,
    A₆ = −0.95837 × 10⁻⁸, A₈ = −0.17605 × 10⁻⁹, A₁₀ = 0
(r₆ surface)  P = 0.4009, A₄ = 0.73404 × 10⁻⁴,
    A₆ = 0.60455 × 10⁻⁶, A₈ = 0.52059 × 10⁻⁸,
    A₁₀ = 0.65724 × 10⁻¹⁰
(r₉ surface)  P = 1.9469, A₄ = −0.57999 × 10⁻³,
    A₆ = −0.41946 × 10⁻⁵, A₈ = 0.81235 × 10⁻⁷,
    A₁₀ = −0.35585 × 10⁻⁸
(r₁₀ surface)  P = 1.4468, A₄ = −0.33489 × 10⁻³,
    A₆ = 0.16171 × 10⁻⁵, A₈ = 0.86077 × 10⁻⁸, A₁₀ = 0

| f | 35 | 49.5 | 70 |
|---|---|---|---|
| D | 25.089 | 12.004 | 2.755 |

|f₁|/f_W = 1.44, f₂/f_W = 0.88,
Δ_RN/φ_RN = 10.83 (y = 4.895) r₉ surface,
−28.98 (y = 5.659) r₁₀ surface, ν_RP = 101.11,
Δ_P/φ_P = 1.21 (y = 10.315) r₂ surface, f_R1/f₂ = 0.71

Embodiment 8 f = 28~44.3~70 mm, F/4.6~F/5.75~F/7.56,
2ω = 75.30°~51.99°~34.30°, f_B = 35.0~46.3~64.0 mm
r₁ = 154.9070
    d₁ = 1.8000    n₁ = 1.80440    ν₁ = 39.58
r₂ = 15.7480 (aspherical surface)
    d₂ = 5.0000
r₃ = 24.0530
    d₃ = 4.2000    n₂ = 1.78472    ν₂ = 25.68
r₄ = 61.3550
    d₄ = D (variable)
r₅ = ∞ (stop)

-continued $d_5 = 1.0000$
$r_6 = 13.4590$ (aspherical surface)
$d_6 = 5.9200$   $n_3 = 1.58913$   $\nu_3 = 61.18$
$r_7 = -15.0400$
$d_7 = 1.5000$   $n_4 = 1.66680$   $\nu_4 = 33.04$
$r_8 = -204.7310$
$d_8 = 6.6500$
$r_9 = -38.7950$ (aspherical surface)
$d_9 = 1.8000$   $n_5 = 1.67790$   $\nu_5 = 55.33$
$r_{10} = 182.5170$ aspherical surface coefficients ($r_2$ surface)   $P = 0.6337$, $A_4 = -0.11938 \times 10^{-5}$,
$A_6 = 0.65110 \times 10^{-8}$, $A_8 = -0.86380 \times 10^{-10}$,
$A_{10} = 0$
($r_6$ surface)   $P = 0.9233$, $A_4 = 0.41782 \times 10^{-5}$,
$A_6 = 0.16006 \times 10^{-6}$, $A_8 = -0.23806 \times 10^{-8}$,
$A_{10} = 0.36353 \times 10^{-10}$
($r_9$ surface)   $P = 19.6285$, $A_4 = -0.87703 \times 10^{-4}$,
$A_6 = -0.50475 \times 10^{-6}$, $A_8 = -0.99444 \times 10^{-8}$, $A_{10} = 0$

| f | 28 | 44.3 | 70 |
|---|---|---|---|
| D | 34.954 | 15.359 | 3.001 |

$|f_1|/f_W = 1.66$, $f_2/f_W = 1.15$,
$\Delta_{RN}/\phi_{RN} = 9.90$ ($y = 5.681$) $r_9$ surface, $\nu_{RP} = 94.22$,
$\Delta_P/\phi_P = 20.36$ ($y = 13.483$) $r_2$ surface, $f_{R1}/f_2 = 0.74$.

Embodiment 9

$f = 28\sim44.3\sim70$ mm, $F/4.6\sim F/5.78\sim F/7.64$,
$f_B = 34.3\sim47.0\sim67.1$ mm, $2\omega = 75.30°\sim51.99°\sim34.30°$
$r_1 = 67.7540$
$d_1 = 1.8000$   $n_1 = 1.79952$   $\nu_1 = 42.24$
$r_2 = 14.1700$ (aspherical surface)
$d_2 = 6.0000$
$r_3 = 20.7220$
$d_3 = 4.0000$   $n_2 = 1.84666$   $\nu_2 = 23.78$
$r_4 = 32.6080$
$d_4 = D$ (variable)
$r_5 = \infty$ (stop)
$d_5 = 1.0000$
$r_6 = 14.8240$ (aspherical surface)
$d_6 = 5.4700$   $n_3 = 1.58913$   $\nu_3 = 61.18$
$r_7 = -21.3360$
$d_7 = 1.5000$   $n_4 = 1.74077$   $\nu_4 = 27.79$
$r_8 = -110.5550$
$d_8 = 7.2300$
$r_9 = -51.8190$
$d_9 = 1.8000$   $n_5 = 1.69680$   $\nu_5 = 55.52$
$r_{10} = -239.2890$
$d_{10} = 2.5600$
$r_{11} = -34.0540$ (aspherical surface)
$d_{11} = 1.8000$   $n_6 = 1.49241$   $\nu_6 = 57.66$
$r_{12} = -40.2100$ (aspherical surface)

aspherical surface coefficients ($r_2$ surface)   $P = 0.6360$, $A_4 = 0.22340 \times 10^{-5}$,
$A_6 = 0.15985 \times 10^{-7}$, $A_8 = -0.89313 \times 10^{-10}$,
$A_{10} = 0$
($r_6$ surface)   $P = 1.0000$, $A_4 = -0.25333 \times 10^{-5}$,
$A_6 = 0.28475 \times 10^{-7}$, $A_8 = -0.11140 \times 10^{-8}$,
$A_{10} = 0.14457 \times 10^{-10}$
($r_{11}$ surface)  $P = 0.9989$, $A_4 = -0.34820 \times 10^{-3}$,
$A_6 = -0.25868 \times 10^{-5}$, $A_8 = 0.51062 \times 10^{-8}$,
$A_{10} = 0$
($r_{12}$ surface)  $P = 1.0000$, $A_4 = -0.21561 \times 10^{-3}$,
$A_6 = -0.13920 \times 10^{-5}$, $A_8 = 0.18243 \times 10^{-7}$,
$A_{10} = 0$

| f | 28 | 44.3 | 70 |
|---|---|---|---|
| D | 29.574 | 13.056 | 2.638 |

$|f_1|/f_W = 1.43$, $f_2/f_W = 1.12$,
$\Delta_{RN}/\phi_{RN} = 58.034$ ($y = 6.570$) $r_{11}$ surface,
$-56.242$ ($y = 7.337$) $r_{12}$ surface, $f_{R1}/f_2 = 0.82$,
$\nu_{RP} = 88.97$, $\Delta_P/\phi_P = 15.802$ ($y = 12.334$) $r_2$ surface,
$d_{R1}/f_2 = 0.22$, $f_{BW}/IH = 0.80$

Embodiment 10

$f = 28\sim44.3\sim70$ mm, $F/4.6\sim F/5.78\sim F/7.65$,
$f_B = 28.0\sim39.4\sim57.3$ mm, $2\omega = 75.30°\sim51.99°\sim34.30°$
$r_1 = 102.0380$
$d_1 = 1.8000$   $n_1 = 1.80610$   $\nu_1 = 40.95$
$r_2 = 15.4510$ (aspherical surface)
$d_2 = 5.5100$
$r_3 = 22.9950$
$d_3 = 4.1000$   $n_2 = 1.80518$   $\nu_2 = 25.43$
$r_4 = 45.5240$
$d_4 = D$ (variable)
$r_5 = \infty$ (stop)
$d_5 = 1.0000$
$r_6 = 12.5750$ (aspherical surface)
$d_6 = 5.5000$   $n_3 = 1.58313$   $\nu_3 = 59.36$
$r_7 = -23.9680$
$d_7 = 1.5000$   $n_4 = 1.74077$   $\nu_4 = 27.79$
$r_8 = \infty$
$d_8 = 7.5700$
$r_9 = -56.8360$ (aspherical surface)
$d_9 = 1.8000$   $n_5 = 1.72916$   $\nu_5 = 54.68$
$r_{10} = 635.4610$
$d_{10} = 4.5600$
$r_{11} = -41.4020$
$d_{11} = 1.8000$   $n_6 = 1.69680$   $\nu_6 = 55.52$
$r_{12} = -56.3110$ (aspherical surface)

aspherical surface coefficients ($r_2$ surface)   $P = 0.6289$, $A_4 = 0.27458 \times 10^{-6}$,
$A_6 = 0.89015 \times 10^{-8}$, $A_8 = -0.71846 \times 10^{-10}$,
$A_{10} = 0$
($r_6$ surface)   $P = 1.0000$, $A_4 = -0.44084 \times 10^{-5}$,
$A_6 = -0.43704 \times 10^{-7}$, $A_8 = 0.75813 \times 10^{-9}$,
$A_{10} = 0$
($r_9$ surface)   $P = 0.9982$, $A_4 = -0.15417 \times 10^{-3}$,
$A_6 = -0.86017 \times 10^{-6}$, $A_8 = -0.21284 \times 10^{-7}$,
$A_{10} = 0$
($r_{12}$ surface)  $P = 1.0000$, $A_4 = -0.18827 \times 10^{-4}$,
$A_6 = -0.13806 \times 10^{-6}$, $A_8 = 0.21554 \times 10^{-9}$,
$A_{10} = 0$

| f | 28 | 44.3 | 70 |
|---|---|---|---|
| D | 32.290 | 14.188 | 2.771 |

$|f_1|/f_W = 1.59$, $f_2/f_W = 1.11$,
$\Delta_{RN}/\phi_{RN} = 18.353$ ($y = 5.805$) $r_9$ surface,
$-11.181$ ($y = 8.420$) $r_{12}$ surface, $f_{R1}/f_2 = 0.79$,
$\nu_{RP} = 87.15$, $\Delta_P/\phi_P = 16.876$ ($y = 13.090$) $r_2$ surface,
$d_{R1}/f_2 = 0.23$, $f_{BW}/IH = 0.65$

Embodiment 11

$f = 35\sim49.5\sim70$ mm, $F/4.6\sim F/5.42\sim F/6.58$,
$f_B = 36.5\sim45.6\sim58.4$ mm, $2\omega = 63.36°\sim47.15°\sim34.30°$
$r_1 = 240.6810$
$d_1 = 1.8000$   $n_1 = 1.80610$   $\nu_1 = 40.95$
$r_2 = 21.5360$ (aspherical surface)
$d_2 = 6.9200$
$r_3 = 31.2160$
$d_3 = 3.9200$   $n_2 = 1.80518$   $\nu_2 = 25.43$
$r_4 = 65.5500$
$d_4 = D$ (variable)
$r_5 = \infty$ (stop)
$d_5 = 1.0000$
$r_6 = 15.0920$ (aspherical surface)
$d_6 = 6.0700$   $n_3 = 1.58313$   $\nu_3 = 59.36$
$r_7 = -24.3260$
$d_7 = 1.5000$   $n_4 = 1.74077$   $\nu_4 = 27.79$
$r_8 = -168.6280$
$d_8 = 5.6800$
$r_9 = -53.2690$
$d_9 = 1.8000$   $n_5 = 1.72916$   $\nu_5 = 54.68$
$r_{10} = -120.3020$
$d_{10} = 4.5600$
$r_{11} = -113.6740$ (aspherical surface)
$d_{11} = 1.8000$   $n_6 = 1.49241$   $\nu_6 = 57.66$
$r_{12} = 88.9710$ (aspherical surface)

-continued aspherical surface coefficients ($r_2$ surface) $P = 0.7823$, $A_4 = -0.12430 \times 10^{-5}$,
$A_6 = 0.20857 \times 10^{-8}$, $A_8 = -0.19934 \times 10^{-10}$,
$A_{10} = 0$ ($r_6$ surface) $P = 1.0000$, $A_4 = -0.22122 \times 10^{-5}$,
$A_6 = -0.74253 \times 10^{-8}$, $A_8 = 0.24774 \times 10^{-9}$,
$A_{10} = 0$ ($r_{11}$ surface) $P = 1.0000$, $A_4 = -0.37379 \times 10^{-3}$,
$A_6 = -0.33626 \times 10^{-6}$, $A_8 = -0.47026 \times 10^{-8}$,
$A_{10} = 0$ ($r_{12}$ surface) $P = 1.0000$, $A_4 = -0.26163 \times 10^{-3}$,
$A_6 = 0.57877 \times 10^{-6}$, $A_8 = 0.35854 \times 10^{-8}$,
$A_{10} = 0$

| f | 35 | 49.5 | 70 |
|---|---|---|---|
| D | 32.119 | 14.747 | 2.466 |

$|f_1|/f_W = 1.64$, $f_2/f_W = 1.03$,
$\Delta_{RN}/\phi_{RN} = 179.199$ (y = 6.646) $r_{11}$ surface,
116.475 (y = 7.359) $r_{12}$ surface, $f_{R1}/f_2 = 0.76$,
$\nu_{RP} = 87.15$, $\Delta_P/\phi_F = 3.591$ (y = 12.613) $r_2$ surface
$d_{R1}/f_2 = 0.21$, $f_{BW}/IH = 0.85$

Embodiment 12

$f = 28\sim44.3\sim70$ mm, F/4.6~F/5.79~F/7.68,
$f_B = 40.0\sim53.5\sim74.8$ mm, $2\omega = 75.30°\sim51.99°\sim34.30°$
$r_1 = 64.9860$ (aspherical surface)
$\quad d_1 = 1.8000 \quad n_1 = 1.78590 \quad \nu_1 = 44.18$
$r_2 = 13.6870$
(aspherical surface)
$\quad d_2 = 6.6000$
$r_3 = 21.6840$
$\quad d_3 = 4.1000 \quad n_2 = 1.80518 \quad \nu_2 = 25.43$
$r_4 = 35.7490$
$\quad d_4 = D$ (variable)
$r_5 = \infty$ (stop)
$\quad d_5 = 1.0000$
$r_6 = 13.2490$ (aspherical surface)
$\quad d_6 = 9.4600 \quad n_3 = 1.49700 \quad \nu_3 = 81.61$
$r_7 = -81.0620$
$\quad d_7 = 1.0800$
$r_8 = -60.2680$
$\quad d_8 = 1.8000 \quad n_4 = 1.75520 \quad \nu_4 = 27.51$
$r_9 = 87.0610$
$\quad d_9 = 2.9900 \quad n_5 = 1.64000 \quad \nu_5 = 60.09$
$r_{10} = -63.0520$
$\quad d_{10} = 1.9400$
$r_{11} = -33.4450$ (aspherical surface)
$\quad d_{11} = 1.8000 \quad n_6 = 1.69350 \quad \nu_6 = 50.81$
$r_{12} = -94.4320$ aspherical surface coefficients ($r_1$ surface) $P = 1.0000$, $A_4 = -0.60799 \times 10^{-5}$,
$A_6 = 0.95516 \times 10^{-8}$, $A_8 = -0.39330 \times 10^{-11}$,
$A_{10} = 0$ ($r_2$ surface) $P = 0.6280$, $A_4 = -0.86532 \times 10^{-5}$,
$A_6 = -0.87852 \times 10^{-8}$, $A_8 = -0.14244 \times 10^{-9}$,
$A_{10} = 0$ ($r_6$ surface) $P = 1.0000$, $A_4 = -0.908394 \times 10^{-5}$,
$A_6 = -0.66957 \times 10^{-7}$, $A_8 = 0.86781 \times 10^{-9}$,
$A_{10} = -0.52146 \times 10^{-11}$ ($r_{11}$ surface) $P = 0.8618$, $A_4 = -0.85415 \times 10^{-4}$,
$A_6 = -0.42285 \times 10^{-6}$, $A_8 = -0.72431 \times 10^{-8}$,
$A_{10} = 0$

| f | 28 | 44.3 | 70 |
|---|---|---|---|
| D | 29.964 | 13.528 | 3.163 |

$|f_1|/f_W = 1.39$, $f_2/f_W = 1.15$,
$\Delta_{RN}/\phi_{RN} = 7.128$ (y = 6.052) $r_{11}$ surface
$f_{R1}/f_2 = 0.74$, $\nu_{RP} = 81.61$,
$\Delta_F/\phi_F = -19.342$ (y = 15.551) $r_1$ surface,
26.995 (y = 12.363) $r_2$ surface, $d_{R1}/f_2 = 0.29$,
$f_{BW}/IH = 0.93$

Embodiment 13

$f = 28\sim44.3\sim70$ mm, F/4.6~F/5.91~F/7.97,
$f_B = 25.5\sim35.6\sim51.6$ mm, $2\omega = 75.30°\sim51.99°\sim34.30°$
$r_1 = 138.8200$
$\quad d_1 = 1.8000 \quad n_1 = 1.83481 \quad \nu_1 = 42.72$
$r_2 = 17.2270$ (aspherical surface)
$\quad d_2 = 5.8100$
$r_3 = 24.9720$
$\quad d_3 = 3.8000 \quad n_2 = 1.80518 \quad \nu_2 = 25.43$
$r_4 = 49.7390$
$\quad d_4 = D$ (variable)
$r_5 = \infty$ (stop)
$\quad d_5 = 1.0000$
$r_6 = 11.4130$ (aspherical surface)
$\quad d_6 = 6.3500 \quad n_3 = 1.51633 \quad \nu_3 = 64.15$
$r_7 = -24.4200$
$\quad d_7 = 1.50000 \quad n_4 = 1.80518 \quad \nu_4 = 25.43$
$r_8 = 1760.5200$
$\quad d_8 = 6.0600$
$r_9 = 23.0540$
$\quad d_9 = 3.2900 \quad n_5 = 1.59551 \quad \nu_5 = 39.21$
$r_{10} = -23.1270$
$\quad d_{10} = 2.1800$
$r_{11} = -10.7390$ (aspherical surface)
$\quad d_{11} = 1.8000 \quad n_6 = 1.80400 \quad \nu_6 = 46.57$
$r_{12} = 185.9930$ aspherical surface coefficients ($r_2$ surface) $P = 0.9025$, $A_4 = -0.55651 \times 10^{-5}$,
$A_6 = 0.29336 \times 10^{-8}$, $A_8 = -0.15492 \times 10^{-9}$,
$A_{10} = 0$ ($r_6$ surface) $P = 1.0000$, $A_4 = -0.25480 \times 10^{-4}$,
$A_6 = -0.12811 \times 10^{-6}$, $A_8 = -0.11762 \times 10^{-8}$,
$A_{10} = -0.69714 \times 10^{-11}$ ($r_{11}$ surface) $P = 1.0242$, $A_4 = -0.51143 \times 10^{-4}$,
$A_6 = -0.20170 \times 10^{-6}$, $A_8 = 0.44978 \times 10^{-8}$,
$A_{10} = 0$

| f | 28 | 44.3 | 70 |
|---|---|---|---|
| D | 30.264 | 13.921 | 3.614 |

$|f_1|/f_W = 1.60$, $f_2/f_W = 0.99$,
$\Delta_{RN}/\phi_{RN} = 1.02$ (y = 6.080) $r_{11}$ surface,
$f_{R1}/f_2 = 1.02$, $\nu_{RP} = 128.79$,
$\Delta_F/\phi_F = 7.52$ (y = 12.717) $r_2$ surface, $f_{BW}/IH = 0.59$

Embodiment 14

$f = 28\sim44.3\sim70$ mm, F/4.6~F/5.79~F/7.67,
$f_B = 32.6\sim43.8\sim61.5$ mm, $2\omega = 75.30°\sim51.99°\sim34.30°$
$r_1 = 88.0280$
$\quad d_1 = 1.8000 \quad n_1 = 1.79500 \quad \nu_1 = 45.29$
$r_2 = 16.5470$ (aspherical surface)
$\quad d_2 = 7.0700$
$r_3 = 24.0930$
$\quad d_3 = 3.8000 \quad n_2 = 1.78470 \quad \nu_2 = 26.30$
$r_4 = 39.8210$
$\quad d_4 = D$ (variable)
$r_5 = \infty$ (stop)
$\quad d_5 = 1.0000$
$r_6 = 12.8150$ (aspherical surface)
$\quad d_6 = 4.5300 \quad n_3 = 1.58267 \quad \nu_3 = 46.33$
$r_7 = -19.4740$
$\quad d_7 = 1.5000 \quad n_4 = 1.76180 \quad \nu_4 = 27.11$
$r_8 = 112.8110$
$\quad d_8 = 1.6800$
$r_9 = 63.2360$
$\quad d_9 = 6.1000 \quad n_5 = 1.60311 \quad \nu_5 = 60.70$
$r_{10} = -40.2590$
$\quad d_{10} = 3.5900$
$r_{11} = -16.9310$ (aspherical surface)
$\quad d_{11} = 1.8000 \quad n_6 = 1.72916 \quad \nu_6 = 54.68$
$r_{12} = -96.3880$ aspherical surface coefficients ($r_2$ surface) $P = 0.7604$, $A_4 = 0.15701 \times 10^{-5}$,
$A_6 = 0.49298 \times 10^{-8}$, $A_8 = -0.82827 \times 10^{-10}$,
$A_{10} = 0$ ($r_6$ surface) $P = 1.0000$, $A_4 = 0.60138 \times 10^{-6}$, -continued $A_6 = 0.36793 \times 10^{-7}$, $A_8 = 0.72518 \times 10^{-10}$,
$A_{10} = 0.13366 \times 10^{-10}$
($r_{11}$ surface)   $P = 1.0000$, $A_4 = 0.11990 \times 10^{-3}$,
$A_6 = -0.71125 \times 10^{-6}$, $A_8 = -0.17743 \times 10^{-7}$,
$A_{10} = 0$

| f | 28 | 44.3 | 70 |
|---|---|---|---|
| D | 32.167 | 13.825 | 2.257 |

$|f_1|/f_W = 1.61$, $f_2/f_W = 1.11$,
$\Delta_{RN}/\phi_{RN} = 4.12$ (y = 5.745) $r_{11}$ surface, $f_{R1}/f_2 = 1.01$,
$\nu_{RP} = 134.14$, $\Delta_P/\phi_P = 12.118$ (y = 13.359) $r_2$ surface,
$f_{BW}/IH = 0.76$

Embodiment 15

$f = 28\sim44.3\sim70$ mm, F/4.6–F/5.79–F/7.67,
$f_B = 34.6\sim45.7\sim63.1$ mm, $2\omega = 75.30°\sim51.99°\sim34.30°$
$r_1 = 106.2840$
    $d_1 = 1.8000$    $n_1 = 1.83400$    $\nu_1 = 37.16$
$r_2 = 17.3550$ (aspherical surface)
    $d_2 = 6.8500$
$r_3 = 26.6580$
    $d_3 = 3.8000$    $n_2 = 1.84666$    $\nu_2 = 23.78$
$r_4 = 50.8790$
    $d_4 = D$ (variable)
$r_5 = 12.1870$
    $d_5 = 3.0000$    $n_3 = 1.49700$    $\nu_3 = 81.61$
$r_6 = 53.1900$
    $d_6 = 1.4000$ $r_7 = \infty$ (stop)
    $d_7 = 1.0000$
$r_8 = 26.7210$ (aspherical surface)
    $d_8 = 5.0700$    $n_4 = 1.56384$    $\nu_4 = 60.69$
$r_9 = -48.1090$
    $d_9 = 1.5000$    $n_5 = 1.75520$    $\nu_5 = 27.51$
$r_{10} = 63.6920$
    $d_{10} = 3.4500$
$r_{11} = -23.3610$ (aspherical surface)
    $d_{11} = 1.8000$    $n_6 = 1.72916$    $\nu_6 = 54.68$
$r_{12} = -53.6020$
aspherical surface coefficients ($r_2$ surface)   $P = 0.6798$, $A_4 = 0.11404 \times 10^{-5}$,
$A_6 = 0.48004 \times 10^{-8}$, $A_8 = -0.48534 \times 10^{-10}$,
$A_{10} = 0$
($r_8$ surface)   $P = 1.0000$, $A_4 = -0.11014 \times 10^{-4}$,
$A_6 = -0.54627 \times 10^{-7}$, $A_8 = 0.16032 \times 10^{-8}$,
$A_{10} = 0$
($r_{11}$ surface)   $P = 1.0155$, $A_4 = -0.12821 \times 10^{-3}$,
$A_6 = -0.79347 \times 10^{-6}$, $A_8 = -0.21236 \times 10^{-7}$,
$A_{10} = 0$

| f | 28 | 44.3 | 70 |
|---|---|---|---|
| D | 36.207 | 15.388 | 2.258 |

$|f_1|/f_W = 1.73$, $f_2/f_W = 1.17$
$\Delta_{RN}/\phi_{RN} = 2.859$ (y = 4.867) $r_{11}$ surface, $f_{R1}/f_2 = 0.95$,
$\nu_{RP} = 169.81$, $\Delta_P/\phi_P = 19.902$ (y = 14.641) $r_2$ surface,
$f_{BW}/IH = 0.80$

Embodiment 16

$f = 28 \sim 44.3 \sim 70$ mm, F/4.6 – F/5.75 – F/7.58,
$f_B = 34.0 \sim 45.6 \sim 63.8$ mm, $2\omega = 75.30° \sim 51.99° \sim 34.30°$
$r_1 = 88.7980$   $d_1 = 1.8000$   $n_1 = 1.77250$   $\nu_1 = 49.66$
$r_2 = 15.7070$ (aspherical surface)   $d_2 = 6.6000$
$r_3 = 23.5870$   $d_3 = 3.8000$   $n_2 = 1.75520$   $\nu_2 = 27.51$
$r_4 = 42.5950$ (aspherical surface)   $d_4 = D$ (variable)
$r_5 = \infty$ (stop)   $d_5 = 1.0000$
$r_6 = 14.3710$   $d_6 = 4.2300$   $n_3 = 1.57444$   $\nu_3 = 56.47$
$r_7 = -26.5330$   $d_7 = 1.5000$   $n_4 = 1.71736$   $\nu_4 = 29.51$
$r_8 = 68.2860$   $d_8 = 2.3700$
$r_9 = 34.9930$   $d_9 = 6.7600$   $n_5 = 1.62230$   $\nu_5 = 53.20$
$r_{10} = -163.7100$   $d_{10} = 3.8300$
$r_{11} = -25.2910$ (aspherical surface)   $d_{11} = 1.8000$   $n_6 = 1.72916$   $\nu_6 = 54.68$
$r_{12} = -170.7210$
aspherical surface coeefficients
($r_2$ surface)   $P = 0.5612$          $A_4 = 0.015423 \times 10^{-5}$,
    $A_6 = 0.34968 \times 10^{-7}$,     $A_8 = -0.91410 \times 10^{-11}$,
    $A_{10} = 0$
($r_4$ surface)   $P = 0.9975$,         $A_4 = 0.18902 \times 10^{-5}$,
    $A_6 = -0.37451 \times 10^{-7}$,    $A_8 = 0.83311 \times 10^{-10}$,
    $A_{10} = 0$
($r_{11}$ surface)   $P = 1.0000$,      $A_4 = -0.94980 \times 10^{-4}$,
    $A_6 = -0.50074 \times 10^{-6}$,    $A_8 = -0.62729 \times 10^{-8}$,
    $A_{10} = 0$

| f | 28 | 44.3 | 70 |
|---|---|---|---|
| D | 33.731 | 14.620 | 2.568 |

$|f_1|/f_W = 1.62$, $f_2/f_W = 1.15$, $\Delta_{RN}/\phi_{RN} = 6.126$ (y = 6.156) $r_{11}$ surface, $f_{R1}/f_2 = 1.19$,
$\nu_{RP} = 139.18$, $\Delta_P/\phi_P = 16.358$ (y = 13.392) $r_2$ surface, 2.762 (y = 12.581) $r_4$ surface,
$f_{BW}/IH = 0.79$

Embodiment 17

$f = 28 \sim 44.3 \sim 70$ mm, F/4.6 – F/5.75 – F/7.65,
$f_B = 38.6 \sim 51.5 \sim 71.7$ mm, $2\omega = 75.30° \sim 51.99° \sim 34.30°$
$r_1 = 145.3690$ (aspherical surface)   $d_1 = 1.8000$   $n_1 = 1.78590$   $\nu_1 = 44.18$
$r_2 = 16.0840$   $d_2 = 7.1100$
$r_3 = 32.9610$   $d_3 = 3.8000$   $n_2 = 1.80518$   $\nu_2 = 25.43$
$r_4 = 84.3510$ (aspherical surface)   $d_4 = D$ (variable)
$r_5 = \infty$ (stop)   $d_5 = 1.0000$ -continued

| | | | |
|---|---|---|---|
| $r_6 = 13.6480$ (aspherical surface) | $d_6 = 3.2400$ | $n_3 = 1.49700$ | $v_3 = 81.61$ |
| $r_7 = 39.7020$ | $d_7 = 0.8100$ | | |
| $r_8 = 28.9790$ | $d_8 = 5.0300$ | $n_4 = 1.58904$ | $v_4 = 53.20$ |
| $r_9 = -34.5580$ | $d_9 = 1.5000$ | $n_5 = 1.78472$ | $v_5 = 25.68$ |
| $r_{10} = 516.1740$ | $d_{10} = 5.1900$ | | |
| $r_{11} = -53.5800$ (aspherical surface) | $d_{11} = 1.8000$ | $n_6 = 1.72000$ | $v_6 = 50.25$ |
| $r_{12} = 4857.6410$ | | | | aspherical surface
coefficients ($r_2$ surface)    $P = 1.0000$      $A_4 = 0.78586 \times 10^{-5}$,
                $A_6 = -0.17455 \times 10^{-7}$,     $A_8 = 0.22810 \times 10^{-10}$,
                $A_{10} = 0$ ($r_4$ surface)    $P = 1.0000$,      $A_4 = -0.47697 \times 10^{-5}$,
                $A_6 = -0.36401 \times 10^{-7}$,     $A_8 = -0.49533 \times 10^{-10}$,
                $A_{10} = 0$ ($r_6$ surface)    $P = 1.0000$,      $A_4 = -0.19816 \times 10^{-5}$,
                $A_6 = -032131 \times 10^{-7}$,     $A_8 = 0.40585 \times 10^{-9}$,
                $A_{10} = 0$ ($r_{11}$ surface)    $P = 1.0000$,      $A_4 = 0.95797 \times 10^{-4}$,
                $A_6 = -0.46194 \times 10^{-6}$,     $A_8 = 0.76050 \times 10^{-8}$,
                $A_{10} = 0$

| | f | 28 | 44.3 | 70 |
|---|---|---|---|---|
| | D | 31.169 | 13.244 | 1.939 |

$|f_1|/f_W = 1.49$, $f_2/f_W = 1.17$, $\Delta_{RN}/\phi_{RN} = 11.390$ (y = 5.955) $r_{11}$ surface, $f_{R1}/f_2 = 1.23$,
$f_{R1}/f_2 = 1.23$, $v_{RP} = 160.49$, $\Delta_F/\phi_F = 52.295$ (y = 15.423) $r_1$ surface, 22,201 (y = 11.827)
$r_4$ surface, $f_{BW}/IH = 0.89$ Embodiment 18

$f = 35 \sim 49.5 \sim 70$ mm, F/4.6 $\sim$ F/5.45 $\sim$ F/6.66,
$f_B = 38.2 \sim 48.0 \sim 61.8$ mm, $2\omega = 63.36° \sim 47.15° \sim 34.30°$

| | | | |
|---|---|---|---|
| $r_1 = 160.7450$ | $d_1 = 1.8000$ | $n_1 = 1.78800$ | $v_1 = 47.38$ |
| $r_2 = 20.2400$ (aspherical surface) | $d_2 = 8.0000$ | | |
| $r_3 = 29.7010$ | $d_3 = 4.5000$ | $n_2 = 1.78472$ | $v_2 = 25.68$ |
| $r_4 = 54.0920$ | $d_4 = D$ (variable) | | |
| $r_5 = \infty$ (stop) | $d_5 = 1.0000$ | | |
| $r_6 = 17.6890$ (aspherical surface) | $d_6 = 5.8500$ | $n_3 = 1.62041$ | $v_3 = 60.27$ |
| $r_7 = -35.8910$ | $d_7 = 1.8000$ | $n_4 = 1.76182$ | $v_4 = 26.55$ |
| $r_8 = 134.7830$ | $d_8 = 3.1200$ | | |
| $r_9 = 62.7030$ | $d_9 = 7.8700$ | $n_5 = 1.60323$ | $v_5 = 42.32$ |
| $r_{10} = -174.8290$ | $d_{10} = 4.4300$ | | |
| $r_{11} = -26.4500$ (aspherical surface) | $d_{11} = 1.8000$ | $n_6 = 1.72916$ | $v_6 = 54.68$ |
| $r_{12} = -85.9630$ | | | | aspherical surface
coefficients ($r_2$ surface)    $P = 0.8199$      $A_4 = -0.22312 \times 10^{-5}$,
                $A_6 = 0.28316 \times 10^{-8}$,     $A_8 = -0.34474 \times 10^{-10}$,
                $A_{10} = 0$ ($r_6$ surface)    $P = 1.0000$,      $A_4 = -0.29867 \times 10^{-5}$,
                $A_6 = 0.88538 \times 10^{-8}$,     $A_8 = -0.26890 \times 10^{-9}$,
                $A_{10} = 0.25190 \times 10^{-11}$ ($r_{11}$ surface)    $P = 1.0000$,      $A_4 = -0.54593 \times 10^{-4}$,
                $A_6 = -0.21302 \times 10^{-6}$,     $A_8 = -0.18024 \times 10^{-8}$,
                $A_{10} = 0$

| | f | 35 | 49.5 | 70 |
|---|---|---|---|---|
| | D | 30.459 | 14.417 | 3.078 |

$|f_1|/f_W = 1.52$, $f_2/f_W = 1.03$, $\Delta_{RN}/\phi_{RN} = 5.116$ (y = 6.748) $r_{11}$ surface, $f_{R1}/f_2 = 1.03$,
$v_{RP} = 129.14$, $\Delta_F/\phi_F = 3.893$ (y = 12.293) $r_2$ surface, $f_{BW}/IH = 0.88$ wherein the reference symbols $r_1, r_2, \ldots$ represent radii of curvature on surfaces of respective lens elements, the reference symbols $d_1, d_2, \ldots$ designate thicknesses of the respective lens elements and airspaces reserved therebetween, the reference symbols $n_1, n_2, \ldots$ denote refractive indices of the respective lens elements, and the reference symbols $v_1, v_2, \ldots$ represent Abbe's number of the respective lens element.

In each of the preferred embodiments, the front lens unit consists of two lens components, i.e., a positive lens component and a negative lens component disposed in order from the object side, and has one or two aspherical surfaces.

In the preferred embodiments, the rear lens unit is composed as described below:

In each of the first embodiment through the eighth embodiment, the rear lens unit consists of a positive lens component and a negative lens component; the positive lens component being composed of a single lens element or configured as a cemented doublet, whereas the negative lens component consisting of a single lens element. The rear lens unit uses one, two or three aspherical surfaces.

In each of the ninth embodiment through the fourteenth embodiment, the rear lens unit is composed of a positive lens component, a positive lens component and a negative lens component. Out of these two positive lens components, one consists of a single lens element and the other is configured as a cemented doublet. The negative lens component consists of a single lens element. The rear lens unit uses one or two aspherical surfaces.

In each of the fifteenth embodiment through the eighteenth embodiment, the rear lens unit consists of a positive lens component, a first negative lens component and a second lens component. The positive lens component is composed of a single lens element or configured as a cemented doublet, the first negative lens component is composed of a single lens element or configured as a cemented doublet, and the second negative lens component consists of a single lens element. The rear lens unit has two or three aspherical surfaces.

No problem will be posed for accomplishing the primary object of the present invention even when each of the cemented doublets used in the embodiments of the present invention is separated into a positive lens element and a negative lens element which are disposed with a very narrow airspace reserved therebetween. Further, the lens components and lens elements used in the embodiments of the present invention can be made of glass materials or plastic materials. In case of the third embodiment and the fifteenth embodiment, in particular, lens components and lens elements which have weak refractive power are free from remarkable influences due to variations in temperature and humidity even when these lens components and lens elements are made of plastic materials.

The aspherical surfaces used in the embodiments of the present invention have shapes which are expressed by the formula shown below:

$$z = \frac{y^2/r}{1 + \sqrt{1 - p(y/r)^2}} + A_4 y^4 + A_6 y^6 + A_8 y^8 + A_{10} y^{10}$$

wherein a direction of the optical axis or light travelling direction is taken as the z axis, a direction perpendicular to the optical axis is taken as the y axis, the reference symbol r represents a paraxial radius of curvature, and the reference symbols p, $A_4$, $A_6$, $A_8$ and $A_{10}$ designate aspherical surface coefficients. Further, the reference symbol y listed in the numerical data of the preferred embodiments represents values of effective diameters which are used for calculation departures from reference spheres $\Delta_{R3}$ and $\Delta_F$.

The zoom lens system according to the present invention consists of a lens unit having a negative refractive power and another lens unit having a positive refractive power, comprises a small number of lens elements, and has a compact size and a high optical performance.

I claim:

1. A zoom lens system consisting of, in order from an object side:

a front lens unit having a negative refractive power; and a rear lens unit having a positive refractive power, said rear lens unit comprising:

a positive lens component disposed at a most object side location of said rear lens unit, and a negative lens component disposed at a most image side location of said rear lens unit;

said rear lens unit consisting of no more than four lens components;

at least one surface in said rear lens unit being an aspherical surface;

said zoom lens system being capable of changes of magnification thereof by varying only an airspace reserved between said front lens unit and said rear lens unit; and said zoom lens system satisfying the following conditions (2) and (3):

(2) $0.88 \leq f_2/f_W < 1.4$ (3) $75 < \nu_{RP}$ wherein said reference symbol $f_2$ represents a focal length of said rear lens unit, said reference symbol $f_W$ designates a focal length of said zoom lens system as a whole at a wide position thereof, and said reference symbol $\nu_{RP}$ denotes a total sum of Abbe's numbers of all lens elements included in said positive lens component disposed in said rear lens unit.

2. A zoom lens system according to claim 1, wherein said rear lens unit consists, in order from said object side, of:

a positive lens component; and a negative lens component.

3. A zoom lens system according to claim 1, wherein said rear lens unit consists, in order from said object side, of:

a positive lens component;

a positive lens component; and a negative lens component.

4. A zoom lens system according to claim 1, wherein said rear lens unit consists, in order from said object side, of:

a positive lens component;

a negative lens component; and a negative lens component.

5. A zoom lens system comprising, in order from an object side:

a front lens unit having a negative refractive power; and a rear lens unit having a positive refractive power, said rear lens unit consisting of, in order from an object side thereof:

a positive lens component, a positive lens component, and a negative lens component;

at least one surface in said rear lens unit being an aspherical surface; and said zoom lens system being capable of changes of magnification thereof by varying only an airspace disposed between said front lens unit and said rear lens unit.

6. A zoom lens system comprising, in order from an object side:

a front lens unit having a negative refractive power; and a rear lens unit having a positive refractive power, said rear lens unit consisting of, in order from said object side:

a positive lens component, a negative lens component, and a negative lens component;

at least one surface in said rear lens unit being an aspherical surface; and said zoom lens system being capable of changes of magnification thereof by varying only an airspace reserved between said front lens unit and said rear lens unit.

7. A zoom lens system as claimed in claim 5 or 6, wherein: said at least one aspherical surface:

(5) $0 < \Delta_{RN}/\Phi_{RN}$ $\Phi_{RN} = (n'_{RN} - n_{RN})/r_{RN}$ wherein said reference symbol $r_{RN}$ represents a paraxial radius of curvature on said at least one aspherical surface, said reference symbol $n_{RN}$ and $n'_{RN}$ designate refractive indices of media located on an object side and an image side of said at least one aspherical surface, said reference symbol $\Delta_{RN}$ denotes a deviation of said at least one aspherical surface, which is measured from an arbitrary point to a reference sphere on said at least one aspherical surface in a direction parallel to an optical axis, and said reference symbol $\Phi_{RN}$ represents a refractive power of said reference sphere on said at least one aspherical surface.

8. A zoom lens system according to claim 5 or 6, wherein: said zoom lens system satisfies the following conditions (1) and (2):

(1) $1.0 < |f_1|/f_W < 2.0$ (2) $0.7 < f_2/f_W < 1.4$ wherein said reference symbols $f_1$ and $f_2$ represent focal lengths of said front lens unit and said rear lens unit, respectively, and said reference symbol $f_W$ designates a focal length of said zoom lens system as a whole at a wide position thereof.

9. A zoom lens system comprising, in order from an object side:
- a front lens unit having a negative refractive power, said front lens unit consisting of:
  - a negative lens component, a most object side surface of said negative lens component being convex toward said object side, and
  - a positive lens component; and
- a rear lens unit having a positive refractive power, said rear lens unit comprising:
  - a positive lens component disposed at a most object side position of said rear lens unit,
  - a negative lens component, and
  - a negative lens component disposed at a most image side position of said rear lens unit;
- said rear lens unit consisting of no more than four lens elements;
- at least one surface in said rear lens unit being an aspherical surface; and
- said zoom lens system being capable of changes of magnification thereof by varying only an airspace reserved between said front lens unit and said rear lens unit; and said zoom lens system satisfying the following condition (3):

(3) $75 < \nu_{RP}$ wherein said reference symbol $\nu_{RP}$ represents a total sum of Abbe's numbers of all lens elements included in said positive lens component disposed in said rear lens unit.

10. A zoom lens system comprising, in order from an object side:
- a front lens unit having a negative refractive power, said front lens unit consisting of, in order from the object side:
  - a negative lens component, a most object side surface of said negative lens component being convex toward said object side, and
  - a positive lens component; and
- a rear lens unit having a positive refractive power, said rear lens unit consisting of, in order from said object side:
  - a positive lens component, and
  - a negative lens component;
- at least one surface in said rear lens unit being an aspherical surface;
- said zoom lens system being capable of changes of magnification thereof by varying only an airspace reserved between said front lens unit and said rear lens unit; and
- wherein said zoom lens system satisfies the following condition (3):

(3) $75 < \nu_{RP}$ wherein said reference symbol $\nu_{RP}$ represents a total sum of Abbe's numbers of all lens elements included in said positive lens component disposed in said rear lens unit.

* * * * *